(12) United States Patent
Zediker et al.

(10) Patent No.: US 12,134,140 B2
(45) Date of Patent: Nov. 5, 2024

(54) HIGH POWER LASER OFFSHORE DECOMMISSIONING TOOL, SYSTEM AND METHODS OF USE

(71) Applicant: Foro Energy, Inc., Houston, TX (US)

(72) Inventors: Mark S. Zediker, Castle Rock, CO (US); Daryl L. Grubb, Houston, TX (US); Ronald A. De Witt, Katy, TX (US); Paul D. Deutch, Houston, TX (US); Joel F. Moxley, Highlands Ranch, CO (US); Scott A. Marshall, Houston, TX (US); Eugence J. Linyaev, Magnolia, TX (US); Sam N. Schroit, Littleton, CO (US); Sharath K. Kolachalam, Sugar Land, TX (US)

(73) Assignee: Foro Energy, Inc., Houston, TX (US)

( * ) Notice: Subject to any disclaimer, the term of this patent is extended or adjusted under 35 U.S.C. 154(b) by 343 days.

(21) Appl. No.: 17/209,105

(22) Filed: Mar. 22, 2021

(65) Prior Publication Data
US 2022/0105592 A1 Apr. 7, 2022

Related U.S. Application Data

(60) Continuation of application No. 15/349,914, filed on Nov. 11, 2016, now Pat. No. 10,953,491, which is a
(Continued)

(51) Int. Cl.
*B23K 26/146* (2014.01)
*B23K 26/00* (2014.01)
(Continued)

(52) U.S. Cl.
CPC ........ *B23K 26/146* (2015.10); *B23K 26/0096* (2013.01); *B23K 26/03* (2013.01);
(Continued)

(58) Field of Classification Search
CPC ............. B23K 26/146; B23K 26/0622; B23K 26/1224; B23K 26/0096; B23K 26/03;
(Continued)

(56) References Cited

U.S. PATENT DOCUMENTS 5,435,395 A * 7/1995 Connell ................. E21B 23/14
166/77.2
2008/0166132 A1* 7/2008 Lynde .................. E21B 47/002
398/142
(Continued)

*Primary Examiner* — Brian W Jennison
(74) *Attorney, Agent, or Firm* — Glen P. Belvis; Belvis Law, LLC.

(57) ABSTRACT

There is provided high power laser systems, high power laser tools, and methods of using these tools and systems for cutting, sectioning and removing structures objects, and materials, and in particular, for doing so in difficult to access locations and environments, such as offshore, underwater, or in hazardous environments, such as nuclear and chemical facilities. Thus, there is also provided high power laser systems, high power laser tools, and methods of using these systems and tools for removing structures, objects, and materials located offshore, under bodies of water and under the seafloor.

6 Claims, 53 Drawing Sheets

Related U.S. Application Data division of application No. 14/803,228, filed on Jul. 20, 2015, now Pat. No. 9,492,885, which is a division of application No. 13/565,345, filed on Aug. 2, 2012, now Pat. No. 9,089,928, which is a continuation-in-part of application No. 13/403,741, filed on Feb. 23, 2012, now abandoned, and a continuation-in-part of application No. 13/366,882, filed on Feb. 6, 2012, now Pat. No. 9,138,786, and a continuation-in-part of application No. 13/347,445, filed on Jan. 10, 2012, now Pat. No. 9,080,425, and a continuation-in-part of application No. 13/222,931, filed on Aug. 31, 2011, now abandoned, and a continuation-in-part of application No. 13/211,729, filed on Aug. 17, 2011, now abandoned, and a continuation-in-part of application No. 13/210,581, filed on Aug. 16, 2011, now Pat. No. 8,662,160.

(60) Provisional application No. 61/605,434, filed on Mar. 1, 2012, provisional application No. 61/605,422, filed on Mar. 1, 2012, provisional application No. 61/514,391, filed on Aug. 2, 2011, provisional application No. 61/446,312, filed on Feb. 24, 2011, provisional application No. 61/439,970, filed on Feb. 7, 2011, provisional application No. 61/431,830, filed on Feb. 7, 2011, provisional application No. 61/431,827, filed on Jan. 11, 2011, provisional application No. 61/378,910, filed on Aug. 31, 2010, provisional application No. 61/374,594, filed on Aug. 17, 2010.

(51) Int. Cl.

| | | |
|---|---|---|
| *B23K 26/03* | (2006.01) | |
| *B23K 26/04* | (2014.01) | |
| *B23K 26/06* | (2014.01) | |
| *B23K 26/0622* | (2014.01) | |
| *B23K 26/10* | (2006.01) | |
| *B23K 26/12* | (2014.01) | |
| *B23K 26/14* | (2014.01) | |
| *B23K 26/38* | (2014.01) | |
| *B23K 37/02* | (2006.01) | |
| *B23K 101/06* | (2006.01) | |
| *B23K 103/04* | (2006.01) | |
| *E02B 17/00* | (2006.01) | |
| *E02B 17/02* | (2006.01) | |
| *E02D 17/00* | (2006.01) | |
| *E21B 29/02* | (2006.01) | |

(52) U.S. Cl.
CPC .......... *B23K 26/04* (2013.01); *B23K 26/0622* (2015.10); *B23K 26/0652* (2013.01); *B23K 26/106* (2013.01); *B23K 26/1224* (2015.10); *B23K 26/127* (2013.01); *B23K 26/14* (2013.01); *B23K 26/1476* (2013.01); *B23K 26/38* (2013.01); *B23K 37/02* (2013.01); *E02B 17/027* (2013.01); *E02D 17/00* (2013.01); *E21B 29/02* (2013.01); *B23K 2101/06* (2018.08); *B23K 2103/04* (2018.08); *E02B 2017/0052* (2013.01)

(58) Field of Classification Search
CPC .. B23K 26/04; B23K 26/0652; B23K 26/127; B23K 26/14; B23K 26/1476; B23K 26/38
See application file for complete search history.

(56) References Cited

U.S. PATENT DOCUMENTS

| | | | |
|---|---|---|---|
| 2012/0068086 A1* | 3/2012 | DeWitt | E21B 37/00 250/492.1 |
| 2012/0074110 A1* | 3/2012 | Zediker | E21B 10/60 219/121.72 |
| 2012/0267168 A1* | 10/2012 | Grubb | B23K 26/0093 250/492.1 |
| 2013/0011102 A1* | 1/2013 | Rinzler | G02B 6/262 385/94 |
| 2014/0022810 A1* | 1/2014 | Ito | G02B 23/2476 362/277 |
| 2014/0146559 A1* | 5/2014 | Ito | A61B 1/0653 362/583 |

* cited by examiner

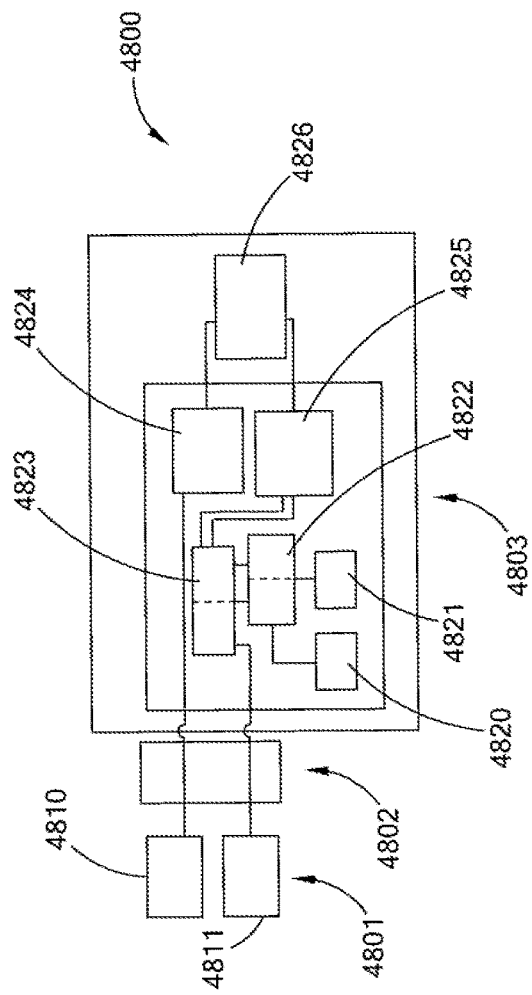
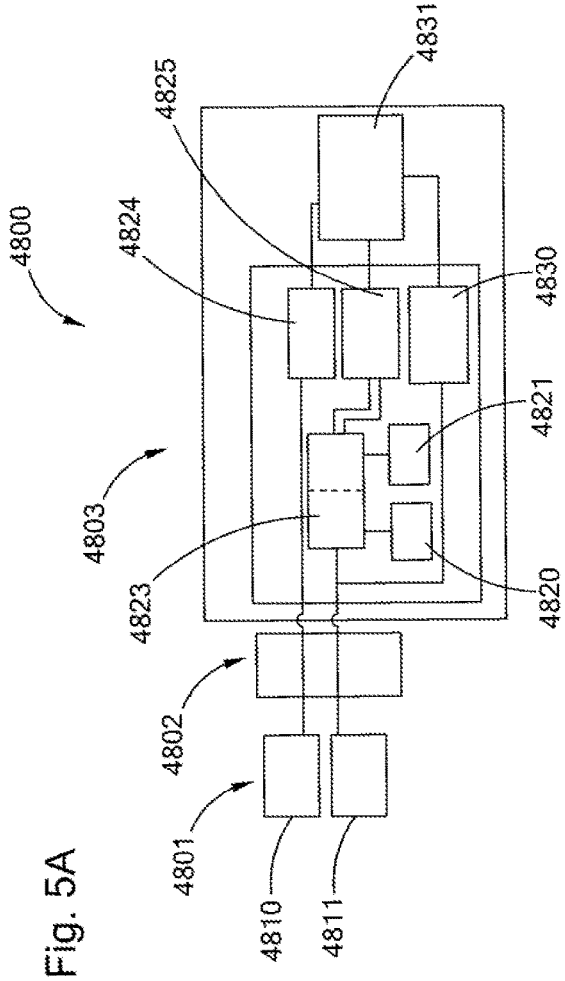
Fig. 5A
Fig. 5B

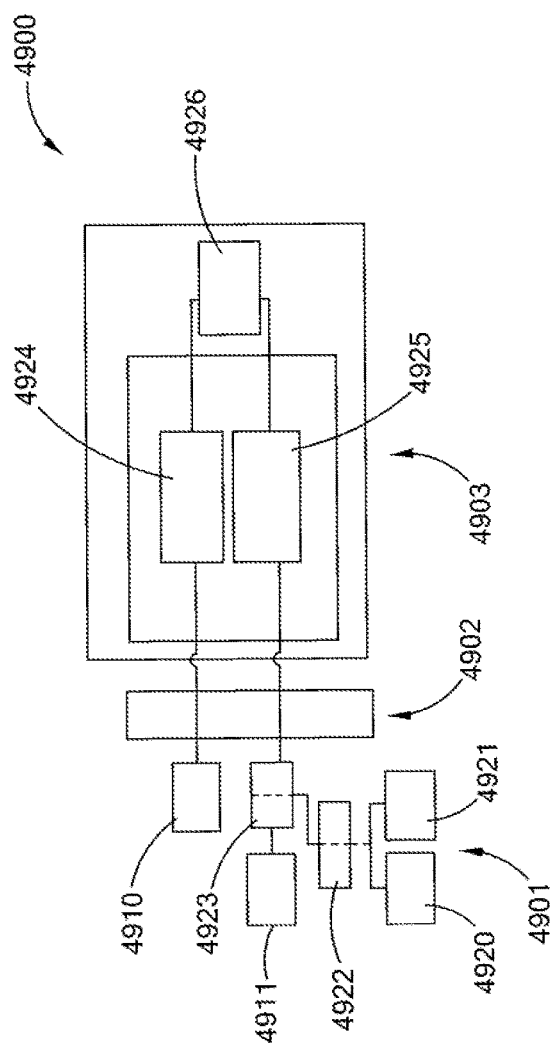
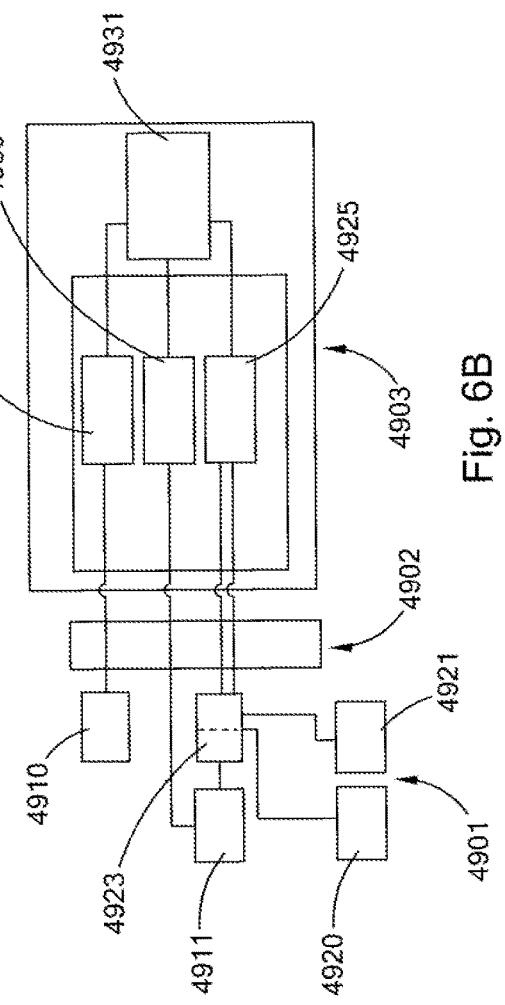

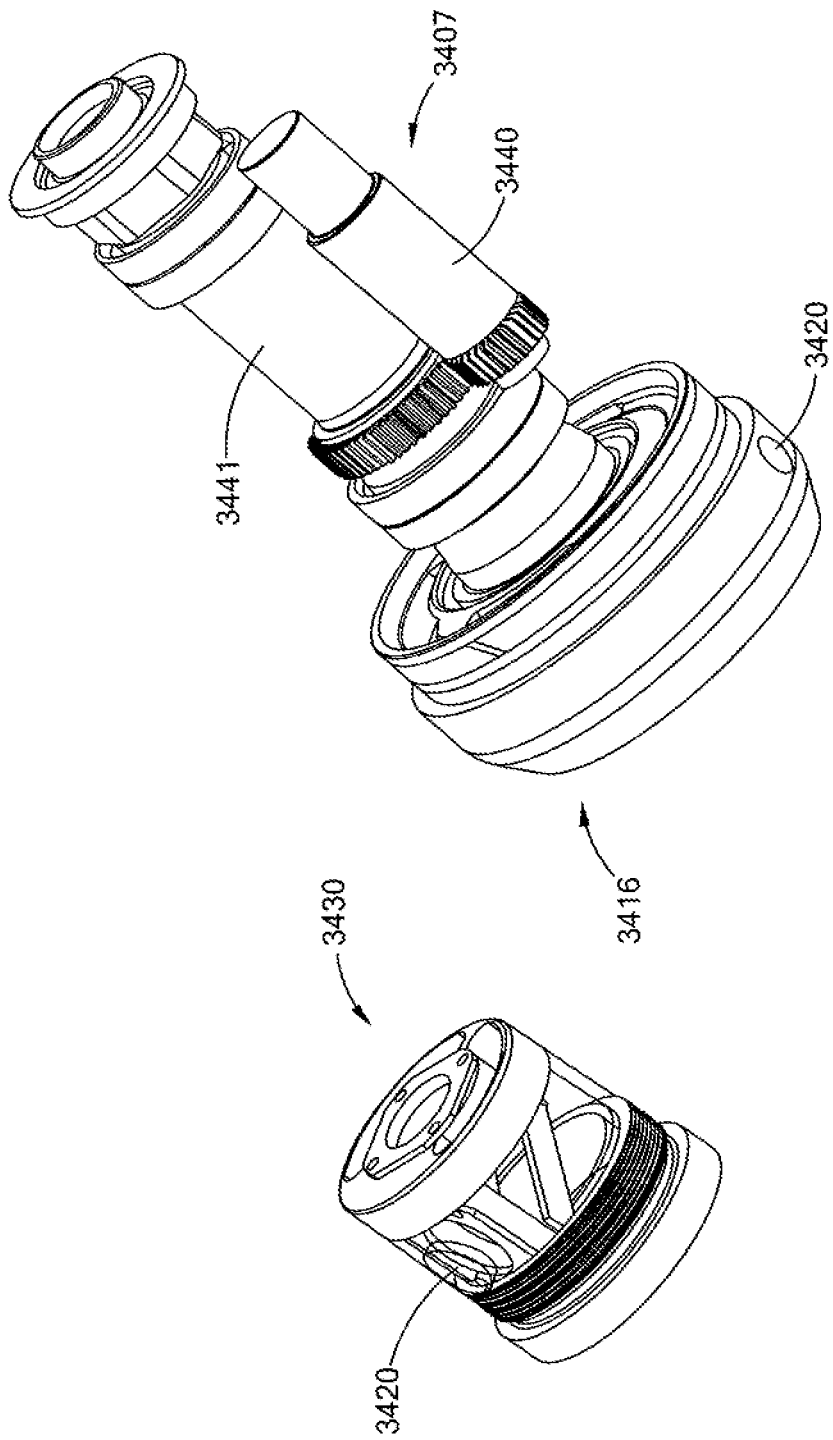

HIGH POWER LASER OFFSHORE DECOMMISSIONING TOOL, SYSTEM AND METHODS OF USE

This application is a continuation of Ser. No. 15/349,914 filed Sep. 7, 2017, which is a divisional of Ser. No. 14/803,228 filed Jul. 20, 2015, which is a divisional of Ser. No. 13/565,345 filed Aug. 2, 2012, which: (i) claims, under 35 U.S.C. § 119(e)(1), the benefit of the filing date of Aug. 2, 2011 of provisional application Ser. No. 61/514,391; (ii) claims, under 35 U.S.C. § 119(e)(1), the benefit of the filing date of Mar. 1, 2012 of provisional application Ser. No. 61/605,422; (iii) claims, under 35 U.S.C. § 119(e)(1), the benefit of the filing date of Mar. 1, 2012 of provisional application Ser. No. 61/605,429; (iv) claims, under 35 U.S.C. § 119(e)(1), the benefit of the filing date of Mar. 1, 2012 of provisional application Ser. No. 61/605,434; (v) is a continuation-in-part of U.S. patent application Ser. No. 13/222,931, filed Aug. 31, 2011, which claims, under 35 U.S.C. § 119(e)(1), the benefit of the filing date of Aug. 31, 2010 of provisional application number Ser. No. 61/378,910; (vi) is a continuation-in-part of U.S. patent application Ser. No. 13/211,729, filed Aug. 17, 2011, which claims, under 35 U.S.C. § 119(e)(1), the benefit of the filing date of Aug. 17, 2010 of provisional application number Ser. No. 61/374,594; (vii) is a continuation-in-part of U.S. patent application Ser. No. 13/347,445, filed Jan. 10, 2012, which claims, under 35 U.S.C. § 119(e)(1), the benefit of the filing date of Jan. 11, 2011 of provisional application number Ser. No. 61/431,827 and the benefit of the filing date of Feb. 7, 2011 of provisional application Ser. No. 61/431,830; (viii) is a continuation-in-part of U.S. patent application Ser. No. 13/210,581, filed Aug. 16, 2011; (ix) is a continuation-in-part of U.S. patent application Ser. No. 13/403,741, filed Feb. 23, 2012, which claims, under 35 U.S.C. § 119(e)(1), the benefit of the filing date of Feb. 24, 2011 of provisional application Ser. No. 61/446,312; and, (x) is a continuation-in-part of U.S. patent application Ser. No. 13/366,882 filed Feb. 6, 2012, which claims, under 35 U.S.C. § 119(e)(1), the benefit of the filing date of Feb. 7, 2011 of provisional application Ser. No. 61/439,970, the entire disclosures of each of which are incorporated herein by reference.

BACKGROUND OF THE INVENTION

Field of the Invention

The present inventions relate to high power laser systems, high power laser tools, and methods of using these systems and tools for removing structures objects, and materials, and in particular, structures, objects, and materials in difficult to access locations and environments, such as offshore, underwater, or in hazardous environments, such as nuclear and chemical facilities. Thus, the present inventions relate to high power laser systems, high power laser tools, and methods of using these systems and tools for removing structures, objects, and materials located offshore, on an offshore coastal shelf, on a continental shelf, in coastal waters, above the surface of a body of water, below the surface of a body of water, below and above the surface of a body of water, on the bottom of a body of water, e.g., the seafloor, below the bottom of a body of water, e.g., below the seafloor, and combinations and variations of these. In particular, the present inventions relate to the removal of offshore structures, such as: platforms used for the exploration and production of hydrocarbons; oil and gas wells; oil and gas fields; platforms used to support windmills; structures used to support bridges, causeways or piers; pipelines; and power cables.

As used herein, unless specified otherwise "offshore," "offshore activities" and "offshore drilling activities" and similar such terms are used in their broadest sense and would include drilling and other activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed platforms, tenders, platforms, barges, dynamically positioned multiservice vessels, lift boats, jack-ups, floating platforms, drill ships, dynamically positioned drill ships, semi-submersibles and dynamically positioned semi-submersibles.

As used herein, unless specified otherwise the term "fixed platform," would include any structure that has at least a portion of its weight supported by the seafloor. Fixed platforms would include structures such as: free-standing caissons, monopiles, well-protector jackets, pylons, braced caissons, piled-jackets, skirted piled-jackets, compliant towers, gravity structures, gravity based structures, skirted gravity structures, concrete gravity structures, concrete deep water structures and other combinations and variations of these. Fixed platforms extend from at or below the seafloor to and above the surface of the body of water, e.g., sea level. Deck structures are positioned above the surface of the body of water on top of vertical support members that extend down into the water to the seafloor and into the seabed. Fixed platforms may have a single vertical support, or multiple vertical supports, or vertical diagonal supports, e.g., pylons, legs, braced caissons, etc., such as a three, four, or more support members, which may be made from steel, such as large hollow tubular structures, concrete, such as concrete reinforced with metal such as rebar, and combinations and variations of these. These vertical support members are joined together by horizontal, diagonal and other support members. In a piled-jacket platform the jacket is a derrick like structure having hollow essentially vertical members near its bottom. Piles extend out from these hollow bottom members into the seabed to anchor the platform to the seabed.

The construction and configuration of fixed platforms can vary greatly depending upon several factors, including the intended use for the platform, load and weight requirements, seafloor conditions and geology, location and sea conditions, such as currents, storms, and wave heights. Various types of fixed platforms can be used over a great range of depths from a few feet to several thousands of feet. For example, they may be used in water depths that are very shallow, i.e., less than 50 feet, a few hundred feet, e.g., 100 to 300 feet, and a few thousand feet, e.g., up to about 3,000 feet or even greater depths may be obtained. These structures can be extremely complex and heavy, having a total assembled weight of more than 100,000 tons. They can extend many feet into the seafloor, as deep as 100 feet or more below the seafloor.

Examples of fixed platforms are provided in FIGS. 20 A-C. Where a triangular-pile-jacket, a rectangular-pile-jacket, and a gravity structure are illustrated, respectively. The conductors 2001 are shown within the structure of pile jacket platforms. To the extent utilized in the gravity structure, the conductors would be contained within the vertical support members 2002 of the gravity structure, and thus, are not shown in FIG. 20C. The conductors extend from the deck structures of the platform, 2005*a*, *b*, *c* above the surface 2006 of the body of water 2007, to and into the seabed 2008. The conductors contain, e.g., hose, tubulars, which are used for among other things recovery of hydrocarbons from the formations below the seafloor. The size, weight, and variability of fixed platforms, associated conductors, and other structures and materials at, on, or within the seabed make their removal difficult.

As used herein, unless specified otherwise the terms "seafloor," "seabed" and similar terms are to be given their broadest possible meaning and would include any surface of the earth, including for example the mud line, that lies under, or is at the bottom of, any body of water, whether fresh or salt water, whether manmade or naturally occurring.

As used herein, unless specified otherwise the terms "well" and "borehole" are to be given their broadest possible meaning and include any hole that is bored or otherwise made into the earth's surface, e.g., the seafloor or seabed, and would further include exploratory, production, abandoned, reentered, reworked, and injection wells.

As used herein the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms are to be given their broadest possible meaning and include two, three or four sections of drill pipe that have been connected, e.g., joined together, typically by joints having threaded connections. As used herein the terms "drill string," "string," "string of drill pipe," string of pipe" and similar type terms are to be given their broadest definition and would include a stand or stands joined together for the purpose of being employed in a borehole. Thus, a drill string could include many stands and many hundreds of sections of drill pipe.

As used herein the term "tubular" is to be given its broadest possible meaning and includes conductor, drill pipe, casing, riser, coiled tube, composite tube, vacuum insulated tube ("VIT"), production tubing, piles, jacket components, offshore platform components, production liners, pipeline, and any similar structures having at least one channel therein that are, or could be used, in the drilling, production, refining, hydrocarbon, hydroelectric, water processing, chemical and related industries. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of a tubular is the thickness of the material between the internal diameter of the tubular and the external diameter of the tubular.

As used herein the term "pipeline" should be given its broadest possible meaning, and includes any structure that contains a channel having a length that is many orders of magnitude greater than its cross-sectional area and which is for, or capable of, transporting a material along at least a portion of the length of the channel. Pipelines may be many miles long and may be many hundreds of miles long or they may be shorter. Pipelines may be located below the earth, above the earth, under water, within a structure, or combinations of these and other locations. Pipelines may be made from metal, steel, plastics, ceramics, composite materials, or other materials and compositions know to the pipeline arts and may have external and internal coatings, known to the pipeline arts. In general, pipelines may have internal diameters that range from about 2 to about 60 inches although larger and smaller diameters may be utilized. In general natural gas pipelines may have internal diameters ranging from about 2 to 60 inches and oil pipelines have internal diameters ranging from about 4 to 48 inches. Pipelines may be used to transmit numerous types of materials, in the form of a liquid, gas, fluidized solid, slurry or combinations thereof. Thus, for example pipelines may carry hydrocarbons; chemicals; oil; petroleum products; gasoline; ethanol; biofuels; water; drinking water; irrigation water; cooling water; water for hydroelectric power generation; water, or other fluids for geothermal power generation; natural gas; paints; slurries, such as mineral slurries, coal slurries, pulp slurries; and ore slurries; gases, such as nitrogen and hydrogen; cosmetics; pharmaceuticals; and food products, such as beer.

Pipelines may be, in part, characterized as gathering pipelines, transportation pipelines and distribution pipelines, although these characterizations may be blurred and may not cover all potential types of pipelines. Gathering pipelines are a number of smaller interconnected pipelines that form a network of pipelines for bringing together a number of sources, such as for example bringing together hydrocarbons being produced from a number of wells. Transportation pipelines are what can be considered as a traditional pipeline for moving products over longer distances for example between two cities, two countries, and a production location and a shipping, storage or distribution location. The Alaskan oil pipeline is an example of a transportation pipeline. Distribution pipelines can be small pipelines that are made up of several interconnected pipelines and are used for the distribution to, for example, an end user, of the material that is being delivered by the pipeline, such as for example the feeder lines used to provide natural gas to individual homes. Pipelines would also include, for example, j-tubes that interconnect subsea pipelines with producing structures, pipeline end manifolds (PLEM), and similar sub-sea structures; and would also include flowlines connecting to, for example, wellheads. As used herein, the term pipeline includes all of these and other characterizations of pipelines that are known to or used in the pipeline arts.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

Discussion of Related Arts

Sub-Sea Drilling

Typically, and by way of general illustration, in drilling a subsea well an initial borehole is made into the seabed and then subsequent and smaller diameter boreholes are drilled to extend the overall depth of the borehole. Thus, as the overall borehole gets deeper its diameter becomes smaller; resulting in what can be envisioned as a telescoping assembly of holes with the largest diameter hole being at the top of the borehole closest to the surface of the earth. As the borehole is being extended, in this telescoping fashion, casing may be inserted into the borehole, and also may be cemented in place. Smaller and smaller diameter casing will be used as the depth of the borehole increases.

Thus, by way of example, the starting phases of a subsea drill process may be explained in general as follows. In the case of a floating rig, once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead, or casing head, secured to it. (In other operations an additional smaller diameter borehole may be drilled, and a smaller diameter casing inserted into that borehole with the wellhead being secured to that smaller diameter casing.) The wellhead, or casing head, would be located at the seafloor. A blowout preventer ("BOP") is then secured to a riser and lowered by the riser to the sea floor; where the BOP is secured to the wellhead, or casing head. From this point forward, in general, all drilling activity in the borehole takes place through the riser and the BOP.

In the case of a fixed platform rig, once the drilling rig is positioned on the seafloor over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity, are returned to the seafloor. In the case of a fixed platform, the conductor extends from below the seafloor to above the surface of the water, and generally to the platform decking. Next, a 26" diameter borehole is drilled within the 30" casing, extending the depth of the borehole to about 1,000-1,500 ft. This drilling operation is conducted within the conductor. A 20" casing is then inserted into the 30" conductor and 26" borehole. This 20" casing is cemented into place and extends from below the seafloor to the above the surface of the sea. The 20" casing has a wellhead, or casing head, secured to it. (In other operations, an additional smaller diameter borehole may be drilled, and a smaller diameter casing inserted into that borehole with the wellhead being secured to that smaller diameter casing.) With a fixed platform, the wellhead or casing head, is located above the surface of the body of water and generally in the decking area of the platform. A BOP is then secured to the wellhead or casing head. From this point forward, in general, all drilling activity in the borehole takes place through the BOP.

During completion of the well a production liner and within the production liner a production pipe are inserted into the borehole. These tubulars extend from deep within the borehole to a structure referred to as a Christmas tree, which is secured to the wellhead or casing head. (Other structures, in addition to, including, or encompassed by a Christmas tree, such as a tree, production tree, manifold and similar types of devices may be secured to or associated with the wellhead, casing head or conductor.) In sub-sea completions, the Christmas tree is located on the sea floor. In completions using a fixed platform, the Christmas tree is located above the surface of the body of water, in the platforms deck, atop the conductor. During production, hydrocarbons flow into and up the production pipe to the Christmas tree and from the Christmas tree flow to collection points where they are stored, processed, transferred and combinations of these. Depending upon the particular well, a conductor may have many concentric tubulars within it and may have multiple production pipes. These concentric tubulars may or may not be on the same axis. Further, these concentric tubulars may have the annulus between them filled with cement. A single platform may have many conductors and for example may have as many as 60 or more, which extend from the deck to and into the seafloor.

The forgoing illustrative examples have been greatly simplified. Many additional steps, procedures, tubulars and equipment (including additional equipment, power lines and pipelines on or below the seafloor) may be utilized to proceed from the initial exploratory drilling of a well to the actual production of hydrocarbons from a field. At some point in time, a well or a collection of wells, will no longer be economically producing hydrocarbons. At which point in time the decision may be made to plug and abandon the well, several wells, and to additionally decommission the structures associated with such wells. As with the steps to drill for and produce hydrocarbons, the steps for plugging, abandoning and decommissioning are complex and varied.

Prior Methodologies to Remove Subsea Structures

There are generally several methodologies that have been used to remove structures from the seafloor. These methodologies may general be categorized as: complex saws, such as diamond saws: large mechanical cutters or shears; oxygen-arc or torch cutters; abrasive water jets; and explosives. Additionally, there may be other methodologies, including the use of divers and ROVs to physically scrap, chip, cut or otherwise remove material. All of these methodologies have health, safety, environmental, and reliability drawbacks.

A key and critical factor for any methodology that is used for the removal of subsea structures is that when subsea structures are cut-up for lifting out of the sea, these cuts must be complete. Thus, A. Culwell, Removal and Disposal of Deck and Jacket Structures, p. 52 (contained in "The Process of Decommissioning and Removing Offshore and Associated Onshore Oil and Gas Facilities", 1997)("A. Culwell"), notes that: "[i]t is crucial to the safety of the heavy lifts that these cuts be complete and reliable because they could not be examined for verification," Culwell, at page 52, further notes that "abrasive water jet methodology . . . does not have guaranteed success and many cuts were repeated or completed with divers working inside the caisson legs after [abrasive water jet] cuts proved to be incomplete."

Diamond saws and mechanical cutters have similar reliability failings. Diamond saws, as well as, abrasive water jets, are also slow in making their cuts, and thus, can be time consuming, which along with other factors, greatly adds to the overall removal costs. Oxygen-arc or torch cutters are similarly slow, may require divers, and thus, subject the divers to hazardous conditions, such as being inside of a caisson. Additionally, these cutters will not cut all types of material, for example concrete, which may require for example a diver to chip the cement away.

Explosives, although reliable are dangerous to both humans and marine life, and in particular, to marine mammals. The use of explosives above the sea floor is being greatly restricted, and to protect marine life, these restrictions may extend to activities just below the sea floor, ag, about 15 feet down or less. The abrasives used in abrasive water jets also have environmental concerns, although the study of this has only recently been started. The abrasive material used may prove dangerous to marine life and harmful to the environment.

High Power Laser Transmission

Prior to the recent breakthroughs of Foro Energy co-inventors it was believed that the transmission of high power laser energy over great distances without substantial loss of power was unobtainable. Their breakthroughs in the transmission of high power laser energy, in particular power levels greater than 5 kW, are set forth, in part, in the novel and innovative teachings contained in the following US patent application Publications: Publication No. 2010/0044106; Publication No, 2010/0044104; Publication No, 2010/0044103; Publication No. 2010/0215326; and, Publication No. 2012/0020631, the entire disclosure of each of which is incorporated herein by reference.

SUMMARY

In the removal, repair, cleaning and decommissioning of structures located in difficult to access, harsh or hazardous environments, such as offshore structures and nuclear facilities, it has long been desirable to have the ability to reliably and safely cut or section these structures for removal and to do so in a controlled and predetermined manner. The present invention, among other things, solves this need by providing the articles of manufacture, devices and processes taught herein.

Thus, there is provided a method of and system for removing a section of a member from an offshore structure, the method and system including: operably associating a high power laser system with the offshore structure, the high power laser system including a high power laser and a high power laser cutting tool; the high power laser cutting tool defining a laser beam delivery path for delivery of a high power laser beam along the beam path; positioning the laser cutting tool adjacent a member of the offshore structure, whereby the laser beam path extends from the cutting tool to the member; propagating a high power laser beam along the beam path and moving the beam path and laser beam thereby cutting the member, whereby a section of the member is formed in a predetermined manner; and, removing the section from the structure.

Further, there are provided such laser methods and systems that include methods and systems in which the member is located below a surface of a body of water, the member is a tubular and the cut is an inside-to-outside cut, the member is a tubular and the cut is an outside-to-inside cut, at least a portion of the member is located above the surface of a body of water, at least a portion of the member is located below a sea floor, at least a portion of the member is in the sea floor, the laser beam path is positioned in the body of water, the laser beam path is positioned below a sea floor, the laser beam propagated along the beam path is at least about 5 kW, the laser beam propagated along the beam path is at least about 10 kW, the laser beam propagated along the beam path is at least about 15 kW, the high power laser system has a laser cutting platform and positioning the laser cutting platform above a surface of a body of water the laser cutting platform, including an operably associated device for hoisting an operably associated laser cutting device for cutting and, an operably associated device for holding; wherein the operably associated laser cutting device defines a second beam path; and, propagating a laser beam along the second beam path, the laser beam propagated along the cutting tool beam path is at least 5 kW and the laser beam propagated along the second beam path is at least 5 kW.

Yet additionally, there are provided laser systems and cut verification systems and verification methods in which the cut verification is passive, the cut verification is real-time and based at least in part on monitoring the laser beam, and the cut verification is based at least in part on laser range finding.

Moreover there is provided an offshore method of cutting material associated with an offshore structure including: positioning a high power laser system over a body of water and proximate to the location of the offshore structure, the high power laser system including a high power laser and a high power laser cutter assembly; the high power laser cutter assembly defining a laser beam delivery path for delivery of a high power laser beam along the beam path; propagating a high power laser beam along the beam path, the laser beam having a power of at least 5 kW; and, changing the relative position of the material to be sectioned and the laser beam path in a predetermined laser beam delivery pattern, whereby the laser beam cuts the material in a predetermined cut.

Yet additionally, there are provided such laser methods including a method in which the predetermined delivery pattern is a continuous ring around the circumference of a tubular, the predetermined cut is a pair of openings for affixing a lifting device, the laser beam propagated along the beam path strikes a platform jacket member, the laser beam propagated along the beam path strikes a platform jacket member in a circular pattern, the laser beam propagated along the beam path strikes a platform pylon in a circular pattern, the predetermined pattern or manner has a land area and a cut area, the laser beam is delivered in a predetermined including a single pass pattern of beam delivery, wherein the laser beam completely severs the material in a single pass of the laser beam, the laser beam is delivered in a beam pattern including a substantially vertical beam path, the laser beam is delivered in a beam pattern including a substantially horizontal beam path, the laser beam is delivered in a pattern including a substantially vertical beam path and a substantially horizontal beam path, the laser beam is delivered in a beam pattern including a substantially axial beam path, the laser beam is delivered in a beam pattern including a substantially radial beam path, the laser beam is delivered in a pattern including a substantially axial beam path and a substantially radial beam path.

Yet further, there is provided a method of cutting material associated with an offshore structure including: positioning a high power laser system proximate to the offshore structure in a body of water, the high power laser system including a high power laser optically associated by means of an umbilical with a high power laser cutter assembly; the high power laser cutter assembly defining a laser beam delivery path for delivery of a high power laser beam along the beam path; positioning the beam path below the surface of the body of water; propagating a high power laser beam along the beam path below the surface of the body of water; and, changing the relative position of a member to be cut and the laser beam path, whereby the laser beam strikes the member below the surface of the body of water and thereby cuts the member below the surface of the body of water.

Moreover, there are provided laser methods including methods in which the laser beam is propagated along the beam path is positioned below a seafloor of the body of water, the laser beam path when the laser beam is propagated along the beam path is positioned in a mudline of the body of water, the laser beam path when the laser beam is propagated along the beam path is positioned below a mudline of the body of water, the structure is an oil platform, the structure is a jacket and pile structure, the structure is a monopile structure, the structure is a pipeline, the structure is a bridge support, the member has an inner steel tubular, and an outer steel tubular, the inner steel tubular and the outer steel tubular define an annulus, the annulus is at least partially filled with air, the annulus is at least partially filled with a solid material, the solid material is cement, the laser beam propagated along the beam path strikes an inner tubular positioned within an outer tubular and whereby upon completion of the cutting the inner tubular is severed and the outer tubular is not cut by the laser beam, and the laser beam propagated along the beam path strikes an inner tubular positioned within an outer tubular and whereby upon completion of the cutting the inner tubular is severed and the outer tubular is severed.

Furthermore, there is provided a method of plugging and abandoning a well using a high power laser system, the method including: selecting a well, the well having tubulars contained within the well and at least one tubular extending from a location within the well below the surface of the earth to location above the surface of the earth; determining the configuration of at least some of the tubulars; formulating a plugging and abandonment plan for the well based in part upon the configuration of at least some of the tubulars; the plugging and abandonment plan including the steps of: cutting a tubular at a predetermined location within the well and removing the tubular above the cut from the well; placing a plug within the well; cutting and removing all tubulars from the well at least about three feet below the surface of the earth; and, performing at least one of the planned cuts with a high power laser beam. Moreover, such cuts may also include cuts in which a plurality of the planned cuts are performed with a high power laser beam, substantially all of the planned cuts are performed with a high power laser beam, and the surface of the earth is a sea floor.

Yet still further, there is provided a method of plugging and abandoning a well using a high power laser system, the method including: selecting a borehole in the surface of the earth forming a well, the borehole having a tubular contained therein, the tubular extending below the surface of the earth; placing a first plug within the borehole; cutting the tubular at a location within the borehole and removing at least a some of the cut tubular from the borehole; placing a second plug within the borehole, the second plug being located closer to the surface of the earth than the first plug; delivering a high power laser beam along a beam path to cut all tubulars within the borehole at a second location above the second plug, wherein the delivery of the laser beam completely severs all tubulars at the location within the borehole; and, removing all of the severed tubulars from the borehole above the second location, wherein the borehole above the second location is free from tubulars. Yet further there are provided such laser methods in which the second location to be cut is at least about 3 feet below the surface of the earth and the surface of the earth is a sea floor, the second location is at least about 5 feet below the surface of the earth and the surface of the earth is a sea floor, the second location is at least about 10 feet below the surface of the earth and the surface of the earth is a sea floor, the second location is at least about 15 feet below the surface of the earth and the surface of the earth is a sea floor.

Still furthermore, there is provided a method of removing a conductor from a body of water using a high power laser system, the method including: positioning a high power laser cutting tool proximate a location on the conductor below a surface of the body of water; directing a high power laser beam along a beam path from the laser cutting tool to the first location, wherein the laser beam severs the conductor at about the first location, thereby creating a severed section of the conductor above the first location; and raising the severed section of the conductor above the surface of the body of water.

Moreover, there is provided a method of removing contamination from an offshore structure to lessen the weight of the structure, the method including: positioning a high power laser system over a body of water and proximate to the location of the offshore structure, the high power laser system including a high power laser optically associated with a high power laser delivery assembly; the high power laser delivery assembly defining a laser beam delivery path for delivery of a high power laser beam along the beam path; positioning the beam path between the delivery assembly and a location of the structure; propagating a high power laser beam along the beam path, the laser beam having a beam property; scanning the high power laser beam from the location on the structure to a second location on the structure at a rate, whereby the beam property and scan rate are such that contamination is removed from the structure without substantial damage to the structure. Yet further such methods may include methods in which the beam property is a power of the beam, the beam property is a pulse rate of the beam, the beam is pulsed, and the beam property is a duty cycle.

Additionally, there is provided a method of removing large heavy offshore structures from a body of water, without the need for heaving hoisting equipment, the method including: positioning a high power laser system over a body of water and proximate to the location of the offshore structure, the high power laser system including a high power laser optically associated with a high power laser delivery assembly; determining a laser cutting plan for cutting the structure into sections of a predetermined size and weight; laser cutting the structure below a surface of the body of water into a predetermined section; and, removing the predetermined section from the body of water. Such methods may also include methods in which the majority of the predetermined sections are less than about 500 tons, the majority of the predetermined sections are less than about 200 tons, the majority of the predetermined sections are less than about 100 tons, the majority of the predetermined sections are less than about 50 tons, and include a laser beam having a wavelength of greater than about 1000 nm to about 1550 nm.

Yet still additionally, there is provided a laser decommissioning, plugging and abandoning vessel including: a vessel; a high power laser having at least about 10 kW of power; a means for high power laser cutting; and, a means for optically associating the laser and the means for cutting. Such vessels may also include at least a vessel in which the laser cutting means has a means for positioning a laser beam path between the laser cutting tool and a member to be cut for making an inside-to-outside cut, the laser cutting tool has a means for positioning a laser beam path between the laser cutting tool and a member to be cut for making a outside-to-inside cut, the laser propagates a laser beam having a wavelength of about 1060 nm to about 2100 nm, the laser cutting means has a fluid laser jet nozzle, the laser cutting means has a total internal reflection prism, the laser cutting means has an anchoring means, a laser cutting head, and a means for extending the laser cutting head from the anchoring means, a laser radar cut verification means in association with the laser cutting means, a passive cut verification means, a real-time cut verification means, the laser cutting means has a means for passive cut verification, the laser cutting means has a means for laser radar cut verification, the vessel is a barge, the vessel is a ship.

Moreover, there is provided a mobile laser removal system, capable of being placed on a vehicle, vessel, platform, or offshore structure, the system including: a high power laser having at least 5 kW of power; and, a subsea high power laser cutting tool; and, an umbilical for optically associating the high power laser with the subsea high power laser cutting tool.

Yet further, there is provided an underwater laser cutting tool, including; a laser tool body defining a longitudinal axis and including a conveyance termination section and an anchoring section; a stand-off distance setting device, whereby the laser tool body axis may be positioned in a predetermined location relative to an axis of a tubular to be cut; a motor section; a laser cutting head section, including a laser beam exit; and a laser optics defining an axis.

There are further provided such underwater laser cutting tools in which the optics axis and the laser tool body axis are coaxial, the predetermined stand off distance provides for the tool body axis to be coaxial with the tubular axis, the predetermined stand off distance provides for the optics axis to be coaxial with the tubular axis, and the predetermined stand off distance provides for the tool body axis and the optics axis to be coaxial with the tubular axis.

Moreover, there are provided such underwater laser cutting tools including at least a packer, a passage for handling returns, a gas laser jet nozzle, an extending section between the laser cutting head section and the anchoring section, whereby the laser cutting head section is capable of being advance through mud, without the need for dredging.

Still further, there is provided an offshore laser services system, capable of providing offshore laser decommissioning, plugging, abandonment, cleaning, or cutting services, the system including a remote operated vehicle; a laser module; an umbilical; and, a laser cutting tool; which in this manner the system is capable of laser cutting offshore materials selected from the group consisting of mooring chains, subsea pipelines, jacket structures, piles, conductors, tubulars, and control umbilicals. There is further provided such system including a second laser cutting tool, including a means for fixedly associating the laser cutting tool with a structure to be laser cut.

BRIEF DESCRIPTION OF THE DRAWINGS

FIG. 5A is a schematic of an embodiment of a laser cutting system in accordance with the present invention.

FIG. 5B is a schematic of an embodiment of a laser cutting system in accordance with the present invention.

FIG. 6A is a schematic of an embodiment of a laser cutting system in accordance with the present invention.

FIG. 6B is a schematic of an embodiment of a laser cutting system in accordance with the present invention.

FIG. 34A is a perspective view of the prism assembly of the laser cutting tool of the embodiment of FIG. 34.

FIG. 34B is a perspective view of the motor section of the laser cutting tool of the embodiment of FIG. 34.

DESCRIPTION OF THE PREFERRED EMBODIMENTS

In general, the present inventions relate to the removal of objects, structures, and materials in difficult to access, hazardous or harsh environments using high power laser energy to cut or section items into sizes that are removable, or more easily removed. The ability to quickly and reliably cut such items into predetermined sizes provides many advantages, including environmental and safety, as well as, providing cost benefits. Although not limited to the plugging, abandonment and decommissioning of offshore oil wells and platforms, the present inventions provide particular advantages, and solve long-standing needs, in such applications.

In about 1946 the first exploratory oil well was drilled in the Gulf of Mexico. From that point forward, through the present time, there has been considerable activity to explore, develop and produce hydrocarbons from offshore fields in the Gulf of Mexico and in other offshore areas of the world. These efforts have resulted in many thousands of fixed platforms being constructed over the last fifty years. A large number of these platforms are reaching the end of their useful lives, and more will be doing so in the future. Although some of these platforms are left to form reefs, in general they are required to be removed, for various environmental, navigation, and aesthetic reasons, among others. Thus, the present inventions find significant use and provide significant benefits to the plugging, abandonment and decommissioning of offshore hydrocarbon producing platforms and facilities.

Figure 1A:
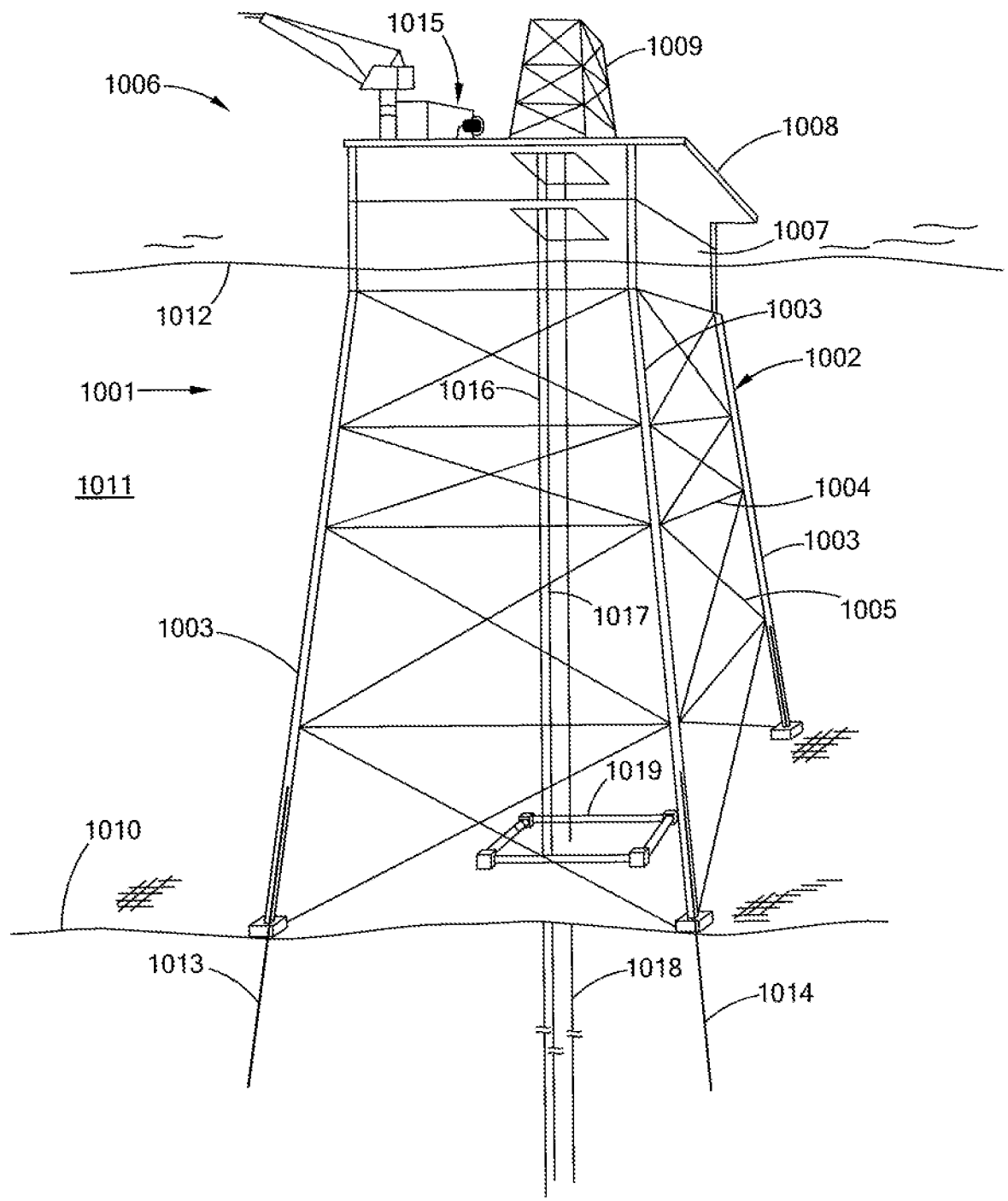
FIGS. 1A to 1F are illustrations of an embodiment of a laser decommissioning, plugging and abandonment process and system in accordance with the present invention.
Figure 1B:
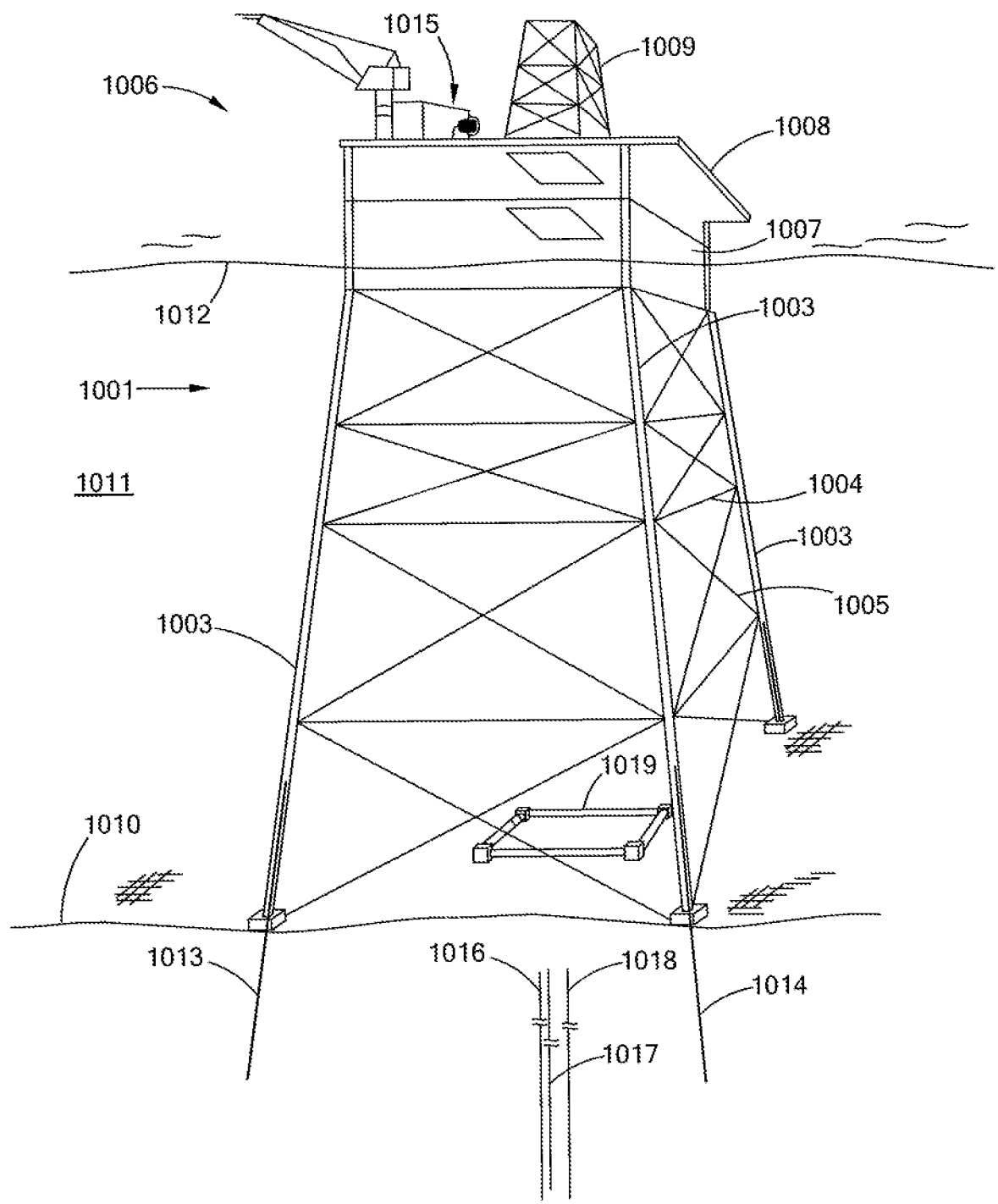

Turning to FIGS. 1A and 1B, there is shown a fixed platform that has gone through an embodiment of the laser plugging and abandonment methods of the present invention for the platform and its associated wells. In FIGS. 1A-B, there is provided a fixed platform 1001. The fixed platform has a jacket, or jacket structure, 1002, which has four vertical support members, or legs, 1003. (Only three of the four legs 1003 are shown in the view of FIG. 1.) The legs 1003 are connected together by horizontal members, e.g., 1004 and tie members, e.g., 1005. It being understood by those of skill in the offshore platform arts that jacket structures may be substantially more complex, larger, and have more, less, or different legs, horizontal members and tie members.

The jacket 1002 extends from the seafloor 1010 through the body of water, or water column, 1011 and extends above the surface 1012 of the body of water 1011. The jacket supports a deck structure 1006 above the surface 1012 of the body of water 1011. The deck structure has a lower deck 1007 and an upper deck 1008. It being understood by those of skill in the offshore platform arts that the deck structures may be more or less complex and that more or less decks may be present. The upper deck may have a derrick 1009 that has associated with it, for example, a drawworks, top drive, iron rough neck and rig floor. A mast or other hoisting and supporting structure may be present, or no such structure may be present. The upper deck has a high power laser module 1015.

The high power laser module 1015 may have a high power laser room, spool, which may be hydraulically operated, electrically operated, or other means of providing mechanical motion and rotation, and control system, for example of the types taught and disclosed the following U.S. patent applications: Ser. No. 13/403,741; Ser. No. 13/403,723; Ser. No. 13/403,692; Ser. No. 13/347,445; and Ser. No. 13/210,581, the entire disclosures of each of which are incorporated herein by reference.

The laser module 1015 may be a permanent installation on the platform, having been used for drilling work over and completion activities during the life of the platform. It may also be a mobile unit that was placed on the deck 1008 for another purpose, such as the removal of equipment and activities such as plugging abandonment and decommissioning. The laser module, or components thereof, may also be located on a separate vessel or structure, such as a jack-up rig, barge, lift boat, dynamically positioned vessel, or work boat, positioned near the platform.

The lower end of the jacket 1002 rests on, or in, the seafloor 1010. The jacket 1002 is secured to the seafloor 1010 by piles 1013, 1014. The piles are located within hollow portions, or cavities, of the legs 1003. Although not seen in FIG. 1, each leg has a pile associated with it. These piles may be, and generally are, hollow tubulars that for example, may range in diameter from about 20" to about 214" and have wall thickness ranging from about ¼" to about 3". There are many and varied manners of associating piles with legs, of securing piles into the sea floor, and of securing or otherwise fixing a pile-jacket type platform in place, which are known by those of skill in the offshore platform arts. The piles extend into the seafloor many feet, (in the range of hundreds of feet) and typically extend much deeper than 20 feet, below the seafloor. The piles may be filled with, or otherwise contain, mud, sand earth and other materials. Although shown as ending well below the surface 1012 of the water 1011, the piles may extend up to and above the surface 1012.

The platform 1001 has conductors 1016, 1017, 1018 that extend from the deck structure 1006 into the body of water 1011 to, and into, the seafloor 1010. The conductors 1016, 1017, 1018 extend through a frame, guide, or template 1019 that is placed on the seafloor 1010. Each conductor would be associated with at least one well, or borehole. Although not shown in FIGS. 1A-B, the conductors typically pass through several sleeves or stabilizing devices as they extend through decks and the jacket, as they pass into and through a body of water. Although, only three conductors are shown in the embodiment of FIGS. 1A-B, there may be from none, to 1, to 10, to 20, to 50, or more conductors associated with a single fixed platform. Typically the conductors extend about 100 to 300 feet into the earth below the seafloor. The conductors house, or contain, other tubulars, such as casing, production liner and production tubing. These other tubulars extend deep into the earth potentially many thousands of feet deeper than the conductor. Some of the annular spaces formed by the conductor and the tubulars within it, may be filled with concrete, or other material. The material may be located in the area that is at or near the seafloor, and would extend down from the seafloor to more than 5, more than 15, more than 20 feet below the seafloor, and potentially hundreds, if not thousands, of feet below the seafloor.

Once it has been determined that a well is not going to be used, the well will be plugged, and if there is no intention to return to the well, abandoned. By way of example, a laser plugging and abandonment procedure may generally involve some or all, of the following activities and equipment, as well as other and additional activities and equipment. Further laser plugging and abandonment procedures and activities would include, by way of example, the use of high power laser tools, systems, cutters and cleaners to perform any and all of the type of activities that are set forth in BOEMRE 30 CFR 250, subpart Q, and including by way of example, activities such as permanent abandonment, temporary abandonment, plug back to sidetrack, bypass, site clearance and combinations and variations of these. Such activities would further include, without limitation the cutting, removal and/or modification of any structures (below or above the surface of the earth and/or the sea floor) for the purpose of temporarily or permanently ceasing and/or idling activities. Examples of high power laser tools, systems, cutters and cleaners that may be utilized for, or in, laser plugging and abandonment procedures and activities for example are disclosed and taught in the following U.S. patent applications and U.S. patent application Publications: Ser. No. 13/403,741; Ser. No. 13/403,723; Ser. No. 13/403,692; Ser. No. 13/347,445; Ser. No. 13/210,581; Ser. No. 13/211,720; Ser. No. 13/366,882; Publication No. 2012/0020631; Publication No. US 2010/0215326; US 2010/0044106; and, Publication No. US 2010/0044103, the entire disclosures of each of which are incorporated herein by reference. Laser plugging and abandonment activities would also include: new activities that were unable to be performed prior to the development of high power laser systems, equipment and procedures taught and disclosed in the foregoing patent applications and publications; existing procedures that prior to the development of the high power laser systems, equipment and procedures taught and disclosed in the foregoing patent applications would have been unable to be performed in an economically, safely and/or environmentally viable manner; and combinations and variations of these.

After the valves on the wellhead and tree have been checked to ensure proper operability, an inspection unit, such as a wireline unit, slick line/electric line unit, slick line unit, or similar type of unit, may be used to check, inspect and measure, the borehole depth, gauge the internal diameter of the tubulars in the borehole and determine other needed information about the borehole. To the extent that there are any tools, valves, or other downhole equipment, that are required or desirable to be removed, but which are stuck downhole, the unit may be used to lower a laser cutting tool and laser tool umbilical (or the umbilical may be used without the need for a separate or additional line, e.g., a wireline, depending upon the umbilical and laser module), to the location of the stuck downhole equipment. The laser tool will deliver a high power laser beam to the stuck downhole equipment, cutting the equipment to sufficiently free it for recovery, by the laser tool or the line, completely melting or vaporizing the stuck equipment, and thus, eliminating it as an obstruction, or combinations and variations of these. The well is then pressure tested and any fluid communication between tubular annular spaces is evaluated.

The laser module and laser cutting tool, or tools, may then be used in conjunction with the platforms existing hoisting equipment, e.g., the derrick 1009, and cementing, circulating and pumping equipment, to plug and abandon the well. If such equipment is not present on the platform, or for some other reason, other hoisting, circulating or pumping equipment may be used, as needed, in conjunction with, for example, a coil tubing rig having a laser unit (e.g., the laser coil tubing system described in US patent applications: Ser. No. 61/446,312 and Ser. No. 14/403,741), or a laser work over and completion unit (e.g., the mobile laser unit described in US patent applications: Ser. No. 61/446,312 and Ser. No. 13/403,741) may be used. Additionally, a rig-less abandonment and decommissioning system may have a laser removal system of the present invention integrated into, or located on it. The laser removal system may be configured to have a very small foot print, and thus, take up only a small amount of deck space. The laser removal system may substantially enhance, or expand, the capabilities of the rig-less abandonment and decommissioning system by enabling it to perform decommissioning projects that it otherwise could not without the laser system's ability to cut and section materials.

In general, and by way of example, plugging and abandonment activities may involve the following activities, among others. A cement plug is placed at the deepest perforation zone and extends above that zone a predetermined distance, for example about 100 feet. After the plug has been placed and tested, the laser tool is lowered into the well and the production tubing and liner, if present, are cut above the plug and pulled. If there are other production zones, whether perforated or not, cement plugs may also be installed at those locations.

As the production tubing is pulled, it may be cut into segments by a laser cutting device, or it may have been removed before the decommissioning project began, and if jointed, its segments may be unscrewed by pipe handling equipment and laid down. The laser cutting device may be positioned on the rig floor, in which instance the pipe handling equipment associated with the rig floor can be used to raise and hold the tubing, while the laser cutting device cuts it, remove the upper section of the cut tubing, hold the lower section from falling, and then pull the lower section of tubing into position for the next laser cut. In general, for this type of pulling and cutting operation the laser cutting tool may be located above a clamping device to hold the pipe and below a hoisting device, such as a crane, top drive and drawworks, to lift the pipe. The laser cutting device may be movably positioned on the rig floor, for example in the manner in which an iron rough neck is positioned.

A second, or intermediate, cement plug is installed a location above the first plug and in the general area of a shoe of an intermediate and surface casing. Additional intermediate plugs may also be installed. During the installation of these cement plugs, or other cement plugs or activities, to the extent that circulation is needed to be established, or the annulus between tubulars is required to be filled with cement, the laser tool may be used to cut windows or perforations, at predetermined intervals and to predetermined radial depths to establish circulation or provide the ability to selectively fill an annulus with cement. It being understood that these various steps and procedures generally will be based at least in part on the well casing program.

Thus, for example, the laser tool may cut an opening through an 11¾ inch casing, at a depth of 10,000 feet, and expose the annulus between the 11¾ inch casing and a 13⅝ inch casing. The laser tool may then cut a second opening at a depth of 10,300 feet exposing the same annulus. This ability to selectively open tubulars and expose various annular spaces in a predetermined and controlled manner may find application in various cleaning, circulating, plugging and other activities required to safely and properly plug and abandoned a well. This ability may also provide benefits to meet future cleaning and plugging regulations or safety requirements. For example, the ability to selectively expose annular space, using the laser tool, and then fill it with cement provides the ability to insure that no open annular space that extends to the sea floor is left open to the borehole. The ability to selectively expose annular space additionally provides the ability to open or cut windows and perforations in a single piece of casing or multiple pieces of casing at precise sizes and shapes.

In general, any remaining uncemented casing strings, that are located above the top most intermediate plug, may be cut by the laser tool (using internal, external and combinations of both, cuts) and then pulled from the well. (These strings may be segmented by a laser cutting device, at the rig floor as they are being pulled). A top cement plug starting at a fixed depth below the sea floor (e.g., 50 to 100 feet) and extending down into the borehole (e.g., an additional 200-300 feet) is then placed in the well. In being recognized that the cement plug may be added (filled) by flowing from the lower position up, or the upper end position down.

The conductor, and any casings or tubulars, or other materials, that may be remaining in the borehole, are cut at a predetermined depth below the seafloor (e.g., from 5 to 20 feet, and preferably 15 feet) by the laser cutting tool. Once cut, the conductor, e.g., 1018, and any internal tubulars, are pulled from the seafloor 1010 and hoisted out of the body of water 1011, where they may be cut into smaller segments by a laser cutting device at the rig floor, vessel deck, work platform, or an off-shore laser processing facility. Additionally, biological material, or other surface contamination or debris that may reduce the value of any scrap, or be undesirable for other reasons, may be removed by the laser system before cutting and removal, after cutting and removal or during those steps at the various locations that are provided in this specification for performing laser operations. Holes may be cut in the conductor (and its internal cemented tubulars) by a laser tool, large pins may then be inserted into these holes and the pins used as a lifting and attachment assembly for attachment to a hoist for pulling the conductor from the seafloor and out of the body of water. As the conductor is segmented on the surface additional hole and pin arrangements may be needed.

This process may then be repeated, or carried out in parallel, with other wells that are to be plugged and abandoned. Thus, as seen in FIG. 1B, using a laser plugging and abandonment process, the conductors 1016, 1017, 1018 (and all internal tubulars) have been cut about 15 feet below the seafloor, removed, segmented and cleared from the platform site. In this example only three conductors are shown, it being understood that there could be 50 or more conductors associated with a single platform and that some, most or all of them may be removed and their associated wells plugged and abandoned using laser plugging and abandonment procedures. The laser cutting tool may cut at any depth below the sea floor, and may cut any predetermined number of tubulars that are concentric, eccentric, irregular shape from for example damage, and combinations and variations of these. The depth of the cut will be determined among other things by the regulations governing the decommissioning project, the seafloor conditions, and the lifting capacity of the hoisting equipment.

It is contemplated that internal, external and combinations of both types of cuts be made on multi-tubular configurations, e.g., one tubular located within the other. The tubulars in these multi-tubular configurations may be concentric, eccentric, concentrically touching, eccentrically touching at an area, have grout or cement partially or completely between them, have mud, water, or other materials partially or completely between them, and combinations and variations of these.

Additionally, the laser systems provide an advantage in crowded and tightly spaced conductor configurations, in that the precision and control of the laser cutting process permits the removal, or repair, of a single conductor, without damaging or effecting the adjacent conductors.

The forgoing example of high power laser plugging and abandonment activities is meant for illustration purposes only and is not limiting, as to either the sequence or general types of activities. Those of skill in the plugging and abandonment arts, will recognize that there are many more and varied steps that may occur and which may occur in different sequences during a plugging and abandonment process. For example, the borehole between cement plugs may be filled with appropriately weighted fluids or drilling muds. Many of these other activities, as well as, the cutting, segmenting, and plugging activities of the forgoing example, are dictated by the particular and unique casing and cement profile of each well, seafloor conditions, regulations, and how the various tubulars have aged, degraded, or changed over the life of the well, which could be 10, 20, or more years old.

The high power laser systems, methods, down hole tools and cutting devices, provide improved abilities to quickly, safely and cost effectively address such varied and changing cutting, cleaning, and plugging requirements that may arise during the plugging and abandonment of a well. These high power laser systems, methods, down hole tools and cutting devices, provide improved reliability, safety and flexibility over existing methodologies such as explosives, abrasive water jets, milling techniques or diamond band saws, in the laser's systems ability to meet and address the various cutting conditions and requirements that may arise during a plugging and abandonment project. In particular, and by way of example, unlike these existing methodologies, high power laser systems and processes, will not be harmful to marine life, and they will ensure a complete and rapid cut through all types of material. Unlike an explosive charge, which sound and shock waves, may travel many miles, the laser beam for specific wavelengths, even a very high power beam of 20 kW or more, has a very short distance, e.g., only a few feet, through which it can travel unaided through open water. Unlike abrasive water jets, which need abrasives that may be left on the sea floor, or dispersed in the water, the laser beam, even a very high power beam of 20 kW or more, is still only light; and uses no abrasives and needs no particles to cut with or that may be left on the sea floor or dispersed in the water.

Figure 1C:
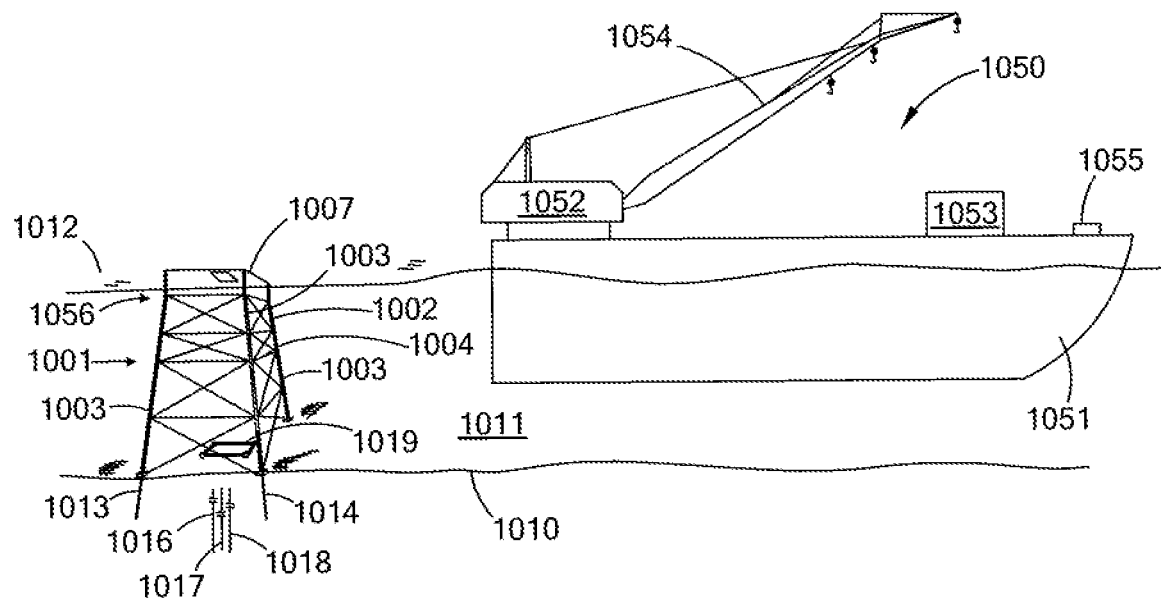

If the hydrocarbon field has reached the end of its useful life, if the platform itself has reached the end of its useful life, or if the platform has been irreparably damaged by, for example a storm, then a laser decommissioning system may be utilized to remove, e.g., decommission the platform. FIGS. 1C to 1F provide snap shot illustrations of an embodiment of a method for the laser removal of a fixed offshore platform that has already had its wells plugged and abandoned. Thus, the jacket-pile platform 1001, in which all wells have been plugged and abandoned, is shown in FIG. 1C with a laser decommissioning system 1050 being on station.

The laser decommissioning system 1050, in the embodiment of FIGS. 1C to 1F, has a vessel 1051, which in this embodiment may be a barge, with a heavy lifting crane 1052, having for example multiple hoists, with a main hoist having a lifting capacity of at least about 100 tons, from about 100 tons to about 500 tons, and greater than about 500 tons. The laser decommissioning system 1050, however, by providing greater flexibility in the positioning of cuts and in the speed of cutting, provides the ability to use a substantially smaller crane than would be needed if existing decommissioning methodologies were to be employed. The crane 1052, has a boom 1054 that preferably has sufficient reach to assist in the handling and movement of tubulars, structural components and other material, as they are being cut, segmented or otherwise processed in the laser cutting shop 1053. The laser decommissioning system also has a high power laser module 1055, which may, for example, have a high power laser room, spool, which may be hydraulically operated, electrically operated, or other means of providing mechanical motion and rotation, and control system. The laser module 1055 may be a mobile laser unit or system or a laser work over and completion unit or system, for example, of the types taught and disclosed the following US patent applications: Ser. No. 13/403,741; Ser. No. 13/403,723; Ser. No. 13/403,692; Ser. No. 13/347,445; and Ser. No. 13/210,581, the entire disclosures of each of which are incorporated herein by reference, and variations and combinations of those units and systems.

The laser module 1055 may be a permanent installation on the decommissioning vessel, or it may be the module 1015, which had been used on the platform 1001, and which is then relocated to the vessel 1051. The laser module 1055, the laser cutting shop 1053, or components thereof, may also be located on a separate vessel or structure, such as a jack-up rig, barge or work boat, positioned near the platform and a crane vessel or a hauling vessel (for transporting the segmented platform sections, pulled tubulars and other removed materials away from the site). Thus, the laser decommissioning system may have a single structure (floating or fixed) or many have multiple structures (floating or fixed) that function together in the removal of the platform or other offshore structure. The ability to transmit high power laser beams using high power laser cables provides the ability to have many varied configurations of vessels, structures, laser tools and laser modules to customize or tailor a laser decommissioning system to the particular requirements of a decommissioning project.

Turning to FIG. 1C, the upper deck 1008 of platform 1001 has been removed, exposing the interior of the vertical members 1003 of the jacket 1002. A laser cutting tool is then lowered down the length of a vertical member 1003, a predetermined distance, to sever a vertical member. This process is repeated for each of the four vertical members. The predetermined distance is based upon one, some, or all of several factors, including for example, the configuration of the jacket, the hoisting capacity of the crane, the holding capacity (both weight and deck space) of any transport vessel, the dimensions of the section to be lifted, and the weight of the section to be lifted.

In this manner the jacket is segmented into a section 1056 that is disconnected from the jacket. (it being recognized that any horizontal members 1004, tie members 1005, or other structures that could hold the section 1056 to the rest of the platform 1001 should also be cut.) Crane 1052 may hold the section, during the cutting of the vertical members, or other hoisting or positioning devices may support it. Thus, the laser cutter cuts all vertical members 1003 of the platform 1001 completely through and creates section 1056 of the jacket 1002 for removal. The laser cutter's ability to repeatedly and reliably provide a complete cut, and preferably with only a single pass of the laser, provides a significant benefit in assuring the reliability of the process. After all vertical and any other connecting or tie members have been cut, the laser tool is repositioned to an appropriate location, to avoid interference with, or being damaged by, the lifting of the section 1056 out of the body of water 1011.

Figure 1D:
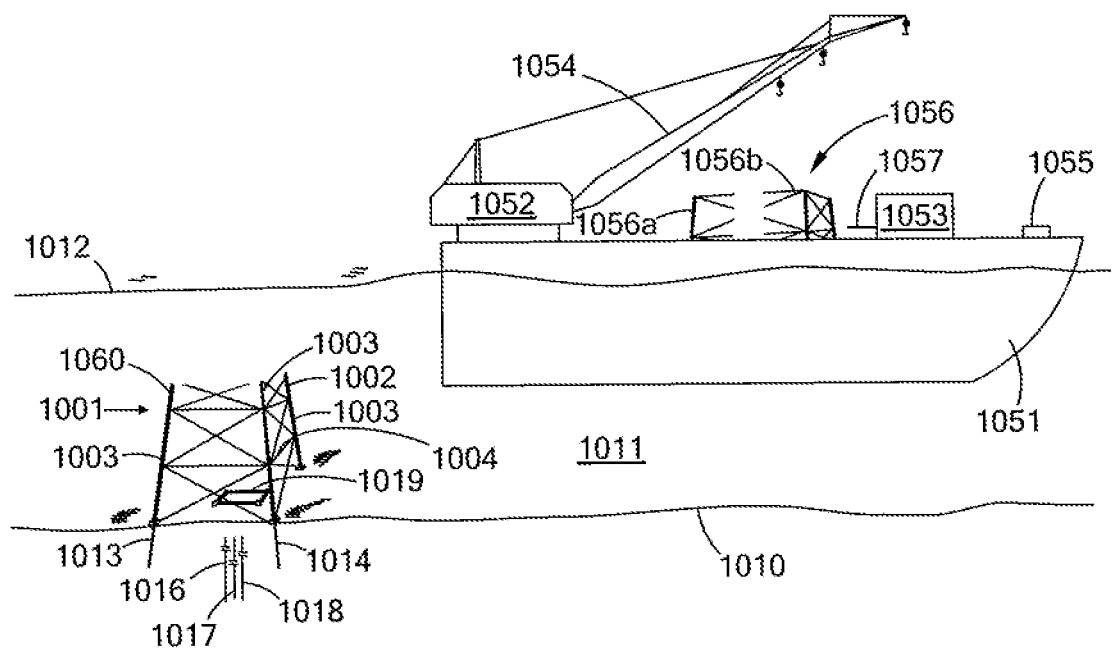

Turning to FIG. 1D, the section 1056 has been hoisted out of the body of water 1011, positioned on the work area, e.g., the deck, of the barge 1051. The section 1056 has been cut, preferably by a laser cutter, into two sections 1056a, 1056b. FIG. 1D further shows a tubular member 1057 being feed into the laser shop 1053 for sectioning.

The laser cuts to the vertical members of the jacket may be made from the inside of the vertical members to the outside, or from the outside of the vertical member to the inside. In the inside-to-outside cut, the laser beam follows a laser beam path starting from inside the vertical member, to the member's inner surface, through the member, and toward the body of water or seabed. For the outside-to-inside cut, the laser beam follows a laser beam path starting from the outside of the vertical member, i.e., in the laser tool, going toward the outer surface of the vertical member, through the vertical member, and into its interior. For the inside-to-outside cut the laser cutting tool will be positioned inside of the vertical member, below the seafloor, in the water column, above the body of water and combinations and variations of these. For the outside to inside cut, the laser cutting tool will be positioned adjacent to the outer surface of the vertical member. In creating a section 1056 for removal from the body of water 1011, only inside-out cuts, only outside-in cuts, and combinations of these cuts may be used. Thus, for example, because of wave action in the area of the intended cuts, all cuts may be performed using the inside-outside beam path. Multiple laser cutting tools may be used, laser cutting tools having multiple laser cutting heads may be used, laser cutting tools or heads having multiple laser beam delivery paths may be used, and combinations of these. The sequence of the laser cuts to the vertical members preferably should be predetermined. They may be done consecutively, simultaneously, and in combinations and various of these timing sequences, e.g., three vertical members may be cut at the same time, followed by the cutting of a fourth, fifth and sixth member cut one after the other.

While it is preferable to have the cuts of the vertical members be clean and complete, and be made with just one pass of the laser, the precision and control of the laser, laser cutting tools, and laser delivery heads, provides the ability to obtain types of predetermined cuts. These complete laser cuts provide the ability to assure and to precisely determine and know the lifting requirements for, and the structural properties of the section being removed, as well as any remaining portions of the structure. Such predetermined cuts may have benefits for particular lifting and removal scenarios, and may create the opportunity for such scenarios that were desirable or cost effective, but which could not be obtained with existing removal methodologies. For example, the vertical member may be cut in a manner that leaves predetermined "land" section remaining. This could be envisioned as a perforation with cuts (removed) areas and lands (areas with material remaining). There may be a single cut and a single land area, multiple cuts and lands and the land areas may make collectively or individually, at least about 5%, at least about 10%, at least about 20%, at least about 50% of the circumference or exterior area of the vertical member. The land areas could provide added safety and stability as the vertical members are being cut. The size and locations of the lands would be known and predetermined, thus their load bearing capabilities and strength would be determinable. Thus, for example, once all the perforation cuts have been made, the heavy lifting crane may be attached to the jacket section to be removed, a predetermined lifting force applied by the crane to the section, and the lands cut freeing the section for removal. The lands may also be configured to be a predetermined size and strength that the crane is used to mechanically break them as the section is lifted away from the remaining portion of the jacket. This ability to provide predetermined cutting patterns or cuts, provides many new and beneficial opportunities for the use of the laser cutting system in the removal of offshore structures and other structures.

The lands of a laser perforation cut, are distinguishable and quite different from the missed cuts that occur with abrasive water jet cutters. The location, size, consistency, and frequency of the abrasive water jet cutter's missed cuts are not known, planned or predetermined. As such, the abrasive water jet's missed cuts are a significant problem, detriment and safety concern. On the other hand, the laser perforated cuts, or other predetermined custom laser cutting profiles, that may be obtained by the laser removal system of the present inventions, are precise and predetermined. In this manner, the laser perforation, or other predetermined, cuts may enhance safety and provide the ability to precisely know where the cuts and lands are located, to know and predetermine the structural properties and dynamics of the member that is being cut, and thus, to generally know and predetermine the overall structural properties and dynamics of the offshore structure being removed.

The ability to make precise and predetermined cuts that structurally weaken support members, the platform, the jacket, or an offshore structure, in a predetermined manner, provide the ability for new and innovative ways to rig, handle and remove offshore structure. For example, the structure may be cut in a predetermined manner that enables it to be toppled and pulled using a winching and flotation mechanism, and thus in essence be cut, tipped and drag onto a vessel for further cutting and sectioning. Persons of skill in the offshore platform and decommissioning arts, upon reviewing the teachings of this specification, may develop many new and innovative techniques for rigging, handling and removing structures based upon the capabilities of the present laser cutting tools, devices, systems and methods, which techniques will fall within the scope of protection for the present inventions.

Figure 1E:
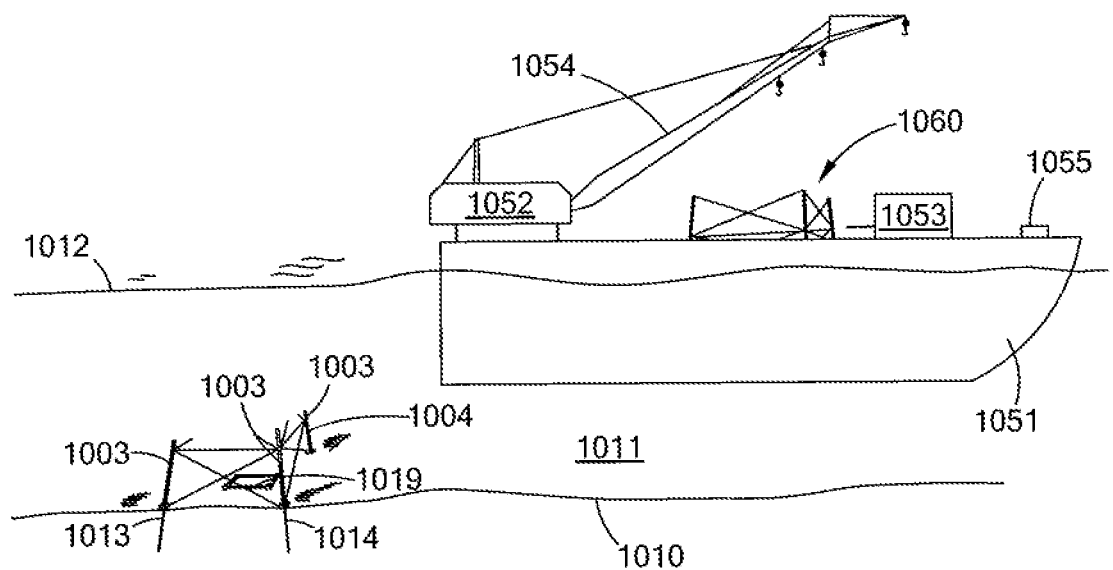

Turning to FIG. 1E, a further section 1060 of the jacket 1002 has been cut by a laser cutter and hoisted to the work area of the vessel 1051. Section 1060 may then be further cutup by laser tools, the laser shop 1053 and combinations of these, to be reduced to sections of an appropriate weight and size for disposal or recycle, as scrap metal.

The laser cutting shop 1053, and high power laser cutters, provides the ability to quickly and efficiently reduce larger pieces of material, such as conductors or vertical members of a jacket, into much smaller and more readily manageable components. The high power laser further provides the ability to remove biological growth, debris and other materials that have accumulated on the material. In particular, one of many advantages of the laser shop 1053 being associated with the vessel is that it may be able to reduce, or eliminate, the need for any further processing or special handling requirements for the removed platform material, structures or components. The laser system decommissioning system has the ability to process the removed material offshore rendering it to a size and form that has substantially increased value as scrap metal for recycling and reuse.

Figure 1F:
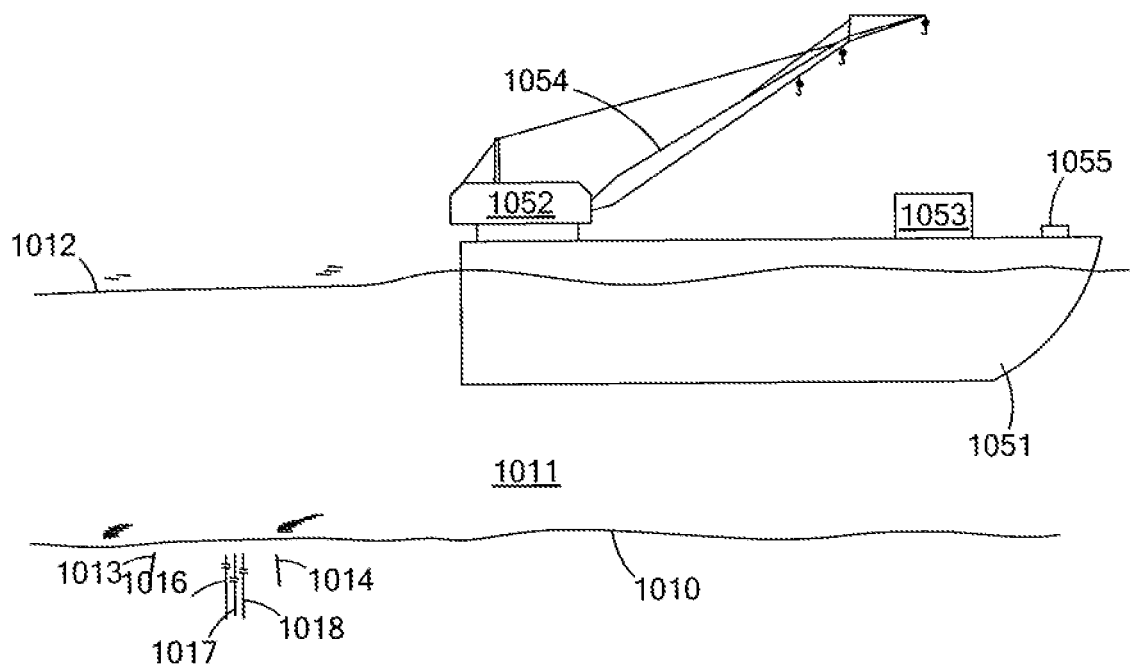

Turning now to FIG. 1F, the final structures of the platform have been removed, sectioned, and hauled away from the site. Thus, the jacket 1002 has been hoisted from the seafloor 1010. The template 1019 has been removed. The piles 1013, 1014 (and the other two piles not seen in the FIGS) have been cut at a predetermined depth below the seafloor (e.g., from 5 to 20 feet, and preferably 15 feet) by the laser cutting tool. The upper sections of the cut piles are then removed from the seafloor. In this manner the laser removal system and method of the present invention has provided for the sectioning, hoisting, and removal of all material associated with the platform and wells from above the surface of the water, in the body of water, and to a predetermined depth below the seafloor. Generally, the piles will be removed first before the jacket structure if the annulus is not grouted.

Generally, the piles are hollow structures, or at least have an internal cavity that extends from the jacket interface to at least the predetermined depth below the seafloor for cutting and removal of the pile. Thus, either or both of the inside-to-outside cutting method and beam path or the outside-to-inside cutting method and beam path may be employed. If the outside-to-inside cutting method and beam path are used, the earth below the seafloor and surrounding the pile should be removed to just below the predetermined cutting depth to enable the laser cutting tool to have access to the pile.

If the piles are solid structures (including for example a tubular partially filled or completely filled with cement), in the area or depth below seafloor cuts are intended to be made, then the outside-to-inside method and beam path may be utilized. The earth below the seafloor in this area should be removed to provide access for the laser cutting tool. In solid-pile situations, variations of the inside-to-outside method and beam path may still be utilized. For example, the jacket, caisson, or other outer structure to the pile may have an annulus that provides access for the laser cutting tool. In this manner, the laser cutting tool may be used to cut the pile from within the annulus, as well as, cut the outer structure from within the annulus. If the annulus is filled with grout, cement, or is too small or restrictive for the placement of the laser tool within the annulus, then the laser tool may be used to cut, remove, enlarge or otherwise open up the annulus, for the laser cutting tool to obtain access into the annulus down to the predetermined depth below the seafloor.

For piles, as well as for other solid structures that need to be removed from above the seafloor, below the seafloor, or both, a boring, radially cutting and, sectioning method may be employed. In this method, the laser beam path is first directed along the length, and preferably along the axis, of the structure to be removed, e.g., the laser beam would be directed downwardly at the center of a vertical member. The laser would bore a hole, preferably along the axis of the structure, and the laser cutting tool would move into and down this axial hole. At a point where the axial hole was of sufficient depth, the tool would perform a radial cut of the structure, i.e., an inside-to-outside cut with the laser beam path traveling from inside the axial hole, to the interior surface of the axial hole, through the structure, and through the outer surface of the structure. This radial cut would sever (or partially sever in a predetermined manner as discussed above) the structure. The laser tool would be removed to a safe position and the severed section of the structure removed. The depth of the axial hole may be used to determine the size of the severed section that will be removed. Thus, in general, longer axial holes will give rise to larger and heavier severed sections. Preferably, the radial cut does not occur at precisely the bottom of the axial hole. Instead, if the radial cut is performed slightly above, or above, the bottom of the axial hole, the remaining portion of the hole, after the severed section is removed, may be used as a pilot hole to continue the axial hole for the removal at the next section of the structure.

It is noted that the laser removal system, methods, tools and devices of the present inventions may be used in whole, or in part, in conjunction with, in addition to, or as an alternative, in whole, or in part, to existing methodologies for the removal of offshore structures without departing from the spirit and scope of the present inventions. Further, it is noted that the laser removal system, methods, tools and devices of the present inventions may be used in whole, or in part, in conjunction with, in addition to, or as an alternative, in whole or in part, to existing methodologies to remove or repair only a portion of an offshore structure without departing from the spirit and scope of the present inventions. Additionally, it is noted that the sequence or time of the various steps, activities and methods or removal (whether solely based on the laser removal system, methods, tools and devices or in conjunction with existing methodologies) may be varied, repeated, sequential, consecutive and combinations and variations of these, without departing from the spirit and scope of the present inventions.

It is preferable that the assemblies, conduits, support cables, laser cutters and other subsea components associated with the operation of the laser cutters, should be constructed to meet the pressure and environmental requirements for the intended use. The laser cutter head and optical related components, if they do not meet the pressure requirements for a particular use, or if redundant protection is desired, may be contained in or enclosed by a structure that does meet these requirements. For deep and ultra-deep water uses, the laser cutter and optics related components should preferably be capable of operating under pressures of 1,000 psi, 2,000 psi, 4,500 psi, 5,000 psi or greater. The materials, fittings, assemblies, useful to meet these pressure requirements are known to those of ordinary skill in the offshore drilling arts, related sub-sea Remote Operated Vehicle ("ROV") arts, and in the high power laser art.

The laser cutting tools may also have monitoring and sensing equipment and apparatus associated with them. Such monitoring and sensing equipment and apparatus may be a component of the tool, a section of the tool, integral with the tool, or a separate component from the tool but which still may be operationally associated with the tool, and combinations and variations of these. Such monitoring and sensing equipment and apparatus may be used to monitor and detect, the conditions and operating parameters of the tool, the high power laser fiber, the optics, any fluid conveyance systems, the laser cutting head, the cut, and combinations of these and other parameters and conditions. Such monitoring and sensing equipment and apparatus may also be integrated into or associated with a control system or control loop to provide real time control of the operation of the tool. Such monitoring and sensing equipment may include by way of example: the use of an optical pulse, train of pulses, or continuous signal, that are continuously monitored that reflect from the distal end of the fiber and are used to determine the continuity of the fiber; the use of the fluorescence and black body radiation from the illuminated surface as a means to determine the continuity of the optical fiber; monitoring the emitted light as a means to determine the characteristics, e.g., completeness, of a cut; the use of ultrasound to determine the characteristics, e.g., completeness, of the cut; the use of a separate fiber to send a probe signal for the analysis of the characteristics, e.g., of the cut; and a small fiber optic video camera may be used to monitor, determine and confirm that a cut is complete. These monitoring signals may transmit at wavelengths substantially different from the high power signal such that a wavelength selective filter may be placed in the beam path uphole or downhole to direct the monitoring signals into equipment for analysis.

To facilitate some of these monitoring activities an Optical Spectrum Analyzer or Optical Time Domain Reflectometer or combinations thereof may be used. For example, an AnaritsuMS9710C Optical Spectrum Analyzer having: a wavelength range of 600 nm-1.7 microns; a noise floor of 90 dBm @ 10 Hz, −40 dBm @ 1 MHz; a 70 dB dynamic range at 1 nm resolution; and a maximum sweep width: 1200 nm and an Anaritsu CMA 4500 OTDR may be used.

The efficiency of the laser's cutting action, as well as the completion of the cut, can also be determined by monitoring the ratio of emitted light to the reflected light. Materials undergoing melting, spallation, thermal dissociation, or vaporization will reflect and absorb different ratios of light. The ratio of emitted to reflected light may vary by material further allowing analysis of material type by this method. Thus, by monitoring the ratio of emitted to reflected light material type, cutting efficiency, completeness of cut, and combinations and variation of these may be determined. This monitoring may be performed uphole, downhole, or a combination thereof. Further, a system monitoring the reflected light, the emitted light and combinations thereof may be used to determine the completeness of the laser cut. These, and the other monitoring systems, may be utilized real-time as the cut is being made, or may be utilized shortly after the cut has been made, for example during a return, or second rotation of the laser tool, or may be utilized later in time, such as for example with a separate tool.

A preferable embodiment of a system for monitoring and confirming that the laser cut is complete and, thus, that the laser beam has severed the member, is a system that utilizes the color of the light returned from the cut can be monitored using a collinear camera system or fiber collection system to determine what material is being cut. In the offshore environment it is likely that this may not be a clean signal. Thus, and preferably, a set of filters or a spectrometer may be used to separate out the spectrum collected by the downhole sensor. This spectra can be used to determine in real-time, if the laser is cutting metal, concrete or rock; and thus provide information that the laser beam has penetrated the member, that the cut is in progress, that the cut is complete and thus that the member has been severed.

The conveyance structure may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain or have associated with the fiber a support structure which may be integral with or releasable or fixedly attached to optical fiber (e.g., a shielded optical fiber is clipped to the exterior of a metal cable and lowered by the cable into a borehole); it may contain other conduits such as a conduit to carry materials to assist a laser cutter, for example gas, air, nitrogen, oxygen, inert gases; it may have other optical or metal fiber for the transmission of data and control information and signals; it may be any of the combinations and variations thereof.

The conveyance structure transmits high power laser energy from the laser to a location where high power laser energy is to be utilized or a high power laser activity is to be performed by, for example, a high power laser tool. The conveyance structure may, and preferably in some applications does, also serve as a conveyance device for the high power laser tool. The conveyance structure's design or configuration may range from a single optical fiber, to a simple to complex arrangement of fibers, support cables, shielding on other structures, depending upon such factors as the environmental conditions of use, performance requirements for the laser process, safety requirements, tool requirements both laser and non-laser support materials, tool function(s), power requirements, information and data gathering and transmitting requirements, control requirements, and combinations and variations of these.

The conveyance structure may be, for example, coiled tubing, a tube within the coiled tubing, wire in a pipe, fiber in a metal tube, jointed drill pipe, jointed drill pipe having a pipe within a pipe, or may be any other type of line structure, that has a high power optical fiber associated with it. As used herein the term "line structure" should be given its broadest meaning, unless specifically stated otherwise, and would include without limitation: wireline; coiled tubing; slick line; logging cable; cable structures used for completion, workover, drilling, seismic, sensing, and logging; cable structures used for subsea completion and other subsea activities; umbilicals; cables structures used for scale removal, wax removal, pipe cleaning, casing cleaning, cleaning of other tubulars; cables used for ROV control power and data transmission; lines structures made from steel, wire and composite materials, such as carbon fiber, wire and mesh; line structures used for monitoring and evaluating pipeline and boreholes; and would include without limitation such structures as Power & Data Composite Coiled Tubing (PDT-COIL) and structures such as those sold under the trademarks Smart. Pipe® and FLATpak®.

High powered conveyance structures and handling apparatus are disclosed and taught in US Patent Application Publications 2010/0044106, 2010/0044103, 2010/0044105 and 2010/0215326 and in pending U.S. patent application Ser. No. 12/840,978, and U.S. patent application Ser. No. 13/210,581, the entire disclosures, of each, of which are incorporated herein by reference.

High power long distance laser fibers, which are disclosed in detail in US Patent Application Publications 2010/0044106, 2010/0044103, 2010/0044105 and 2010/0215326 and in pending U.S. patent application Ser. No. 12/840,978, the entire disclosures of each of which are incorporated herein by reference, break the length-power-paradigm, and advance the art of high power laser delivery beyond this paradigm, by providing optical fibers and optical fiber cables (which terms are used interchangeably herein and should be given their broadest possible meanings, unless specified otherwise), which may be used as, in association with, or as a part of conveyance structures, that overcome these and other losses, brought about by nonlinear effects, macro-bending losses, micro-bending losses, stress, strain, and environmental factors and provides for the transmission of high power laser energy over great distances without substantial power loss.

Embodiments and teachings regarding high power optical fiber cable, fibers and the systems and components for delivering high power laser energy, separately or in conjunction with other materials, e.g., fluids, data or control information, over great distances from the laser to a remote location for use by a tool are disclosed and taught in the following US patent applications and US patent application Publications: Publication No. 2010/0044106, Publication No. 2010/0044014, Publication No. 2010/0044103, Publication No. 2010/0215326, Publication No. 2012/0020631 and Ser. No. 13/210,581, the entire disclosures of each of which are incorporated herein by reference. These and other embodiments may be used as umbilicals, tethers, conveyance devices, deployment and retrieval devices, devices to transmit work fluids and returns of waste materials, devices to transmit the high power laser beam, devices to send and receive data and information including control information, and combinations and variations of these in relation to or conjunction with the laser tool.

Laser Cutting Tools and Devices

The laser cutting tools and devices that may be utilized for the present removal methods and with, or as a part of, the present removal systems, in general, may have a section for receiving the high power laser energy, such as for example, from a high power connector on a high power fiber, or from an umbilical having a fluid path and a high power fiber. Embodiments of high power laser connectors and couplers are disclosed and taught in U.S. patent application Ser. No. 13/486,795, the entire disclosure of which is incorporated herein by reference. Although single fiber tools and devices are described herein, it should be understood that a cutting tool or device may receive high power laser energy from multiple fibers. In general, the laser cutting tools and devices may have one, or more, optics package or optics assemblies, which shape, focus, direct, re-direct and provide for other properties of the laser beam, which are desirable or intended for a cutting process. Embodiments of high power laser optics packages are disclosed and taught in U.S. patent application Ser. No. 13/403,132, the entire disclosure of which is incorporated herein by reference. In general, the laser cutting tools and devices may also have one or more laser cutting heads, having for example a fluid jet, or jets, associated with the laser beam path that laser beam takes upon leaving the tool and traveling toward the material to be cut, e.g., the inside of a conductor. Embodiments of high power laser cutting tools, devices and cutting heads are disclosed and taught in the following US patent applications: Publication No, 2012/0074110: Ser. No. 61/605,429; and, Ser. No. 61/605,434, the entire disclosures of each of which are incorporated herein by reference.

In general, these associated fluid jets in the laser cutting heads find greater applicability and benefit in cutting applications that are being conducted in, or through, a liquid or debris filled environment, such as e.g., an outside-to-inside cut where sea water is present, or an inside-to-outside cut where drilling mud is present. The fluid jets may be a liquid, a gas, a combination of annular jets, where the inner annular jet is a gas and the outer is a fluid, where the inner annular jet and outer annular jets are liquids having predetermined and preferably different indices of refraction. The fluid jets may be a series of discrete jets that are substantially parallel, or converging fluid jets and combinations and variations of these.

Thus, for example an annular gas jet, using either air, oxygen, nitrogen or another cutting gas, may have a high power laser beam path within the jet. As this jet is used to perform a linear cut or kerf, a second jet, which trails just behind the gas jet having the laser beam, is used. The paths of these jets may be essentially parallel, or they may slightly converge or diverge depending upon their pressures, laser power, the nature of the material to be cut, the stand off distance for the cut, and other factors.

For applications above the surface of the body of water, and in particular in the laser shop that is associated with the vessel, commercially available high power laser cutters may be used, provided that they are, or have been sufficiently protected, to withstand the offshore environment and conditions.

Additionally, it may be desirable for the laser cutting tools, and especially subsea tools, and preferably in particular tools that may be used in the interior of a jacket member, inside of tubulars, or inside of a conductor, or in other similarly confined and difficult to observe spaces, to have other mechanical, measuring and monitoring components, such as a centralizer, packers, valves for directing cement, valves for pressure testing, a locking device, and sensing devices to determined for example, the conditions of a cut or position of the tool.

Figure 2:
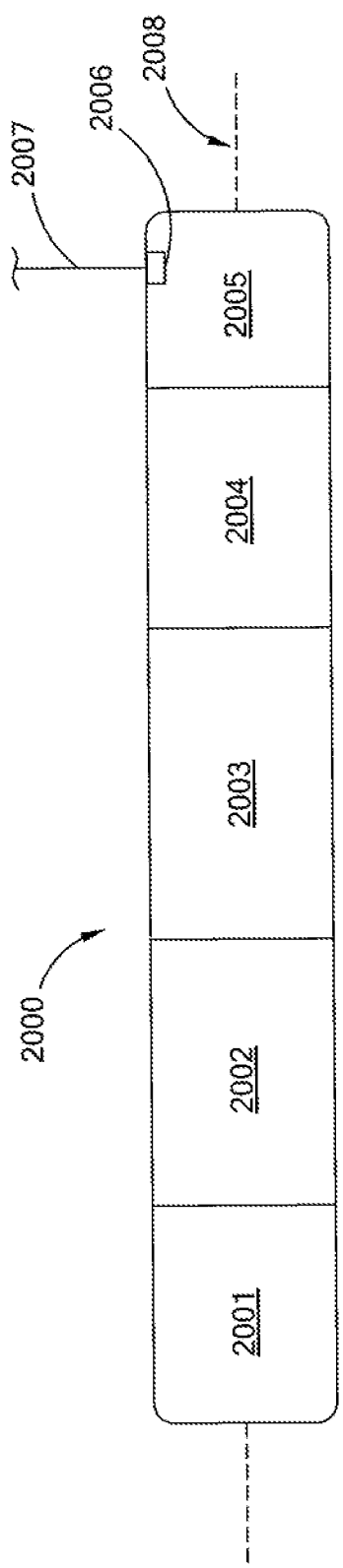
FIG. 2 is a schematic of an embodiment of a laser cutting tool in accordance with the present invention.

Turning to FIG. 2 there is provided a schematic of an embodiment of a laser cutting tool 2000 having a longitudinal axis shown by dashed line 2008. The laser cutting tool 2000 has a conveyance termination section 2001. The conveyance termination section 2001 would receive and hold, for example, a composite high power laser umbilical, a coil tube having for example a high power laser fiber and a channel for transmitting a fluid for the laser cutting head, a wireline having a high power fiber, or a slick line and high power fiber. The laser tool 2000 has an anchor and positioning section 2002. The anchor and positioning section 2002 may have a centralizer, a packer, or shoe and piston or other mechanical, electrical, magnetic or hydraulic device that can hold the tool in a fixed and predetermined position longitudinally, axially or both. The section may also be used to adjust and set the stand off distance that the laser head is from the surface to be cut. The laser tool 2000 has a motor section 2003, which may be an electric motor, a step motor, a motor driven by a fluid, or other device to rotate the laser cutter head, or cause the laser beam path to rotate. In this configuration the laser fiber, and fluid path, if a fluid is used in the laser head, must pass by or through the motor section 2003. Motor, optic assemblies, and beam and fluid paths of the types that are disclosed and taught in the following US patent applications: Ser. No. 13/403,509; Ser. No. 61/403,287; Publication No. 2012/0074110; Ser. No. 61/605,429; Ser. No. 61/605,434; and, Ser. No. 13/403,132, may be utilized, the entire disclosures of each of which are incorporated herein by reference. There is provided an optics section 2004, which for example, may shape and direct the beam and have optical components such as a collimating element or lens and a focusing element or lens. Optics assemblies, packages and optical elements disclosed and taught in the following US patent applications: Ser. No. 13/403,132; and, Ser. No. 61/446,040 may be utilized, the entire disclosure of each of which is incorporated herein by reference. There is provided a laser cutting head section 2005, which directs and moves the laser beam along a laser beam path 2007. In this embodiment the laser cutting head 2005 has a laser beam exit 2006. In operation the laser beam path may be rotated through 360 degrees to perform a complete circumferential cut of a tubular. (It is noted that the laser beam path may be, for example: rotated a single revolution in one direction, e.g., clockwise; rotated in a reciprocal manner, e.g., clockwise for a number of degrees and then counter clockwise for the same, greater or lessor degrees; rotated in multiple revolutions, e.g., 1% revolutions, 2 revolutions, 3.75 revolutions, 4 revolutions, or more; and combinations and variations of these.) The laser beam path may also be moved along the axis of the tool. The laser beam path also may be scanned or otherwise moved in a pattern during propagation or delivery of the laser beam. In this manner, circular cuts, windows and perforations may be made to a tubular, support member, or for example a conductor. In the embodiment of FIG. 2, as well as other embodiments, the laser beam path 2007 forms a 90 degree angle with the axis of the tool 2008. This angle could be greater than 90 degrees or less then 90 degrees.

Figure 3:
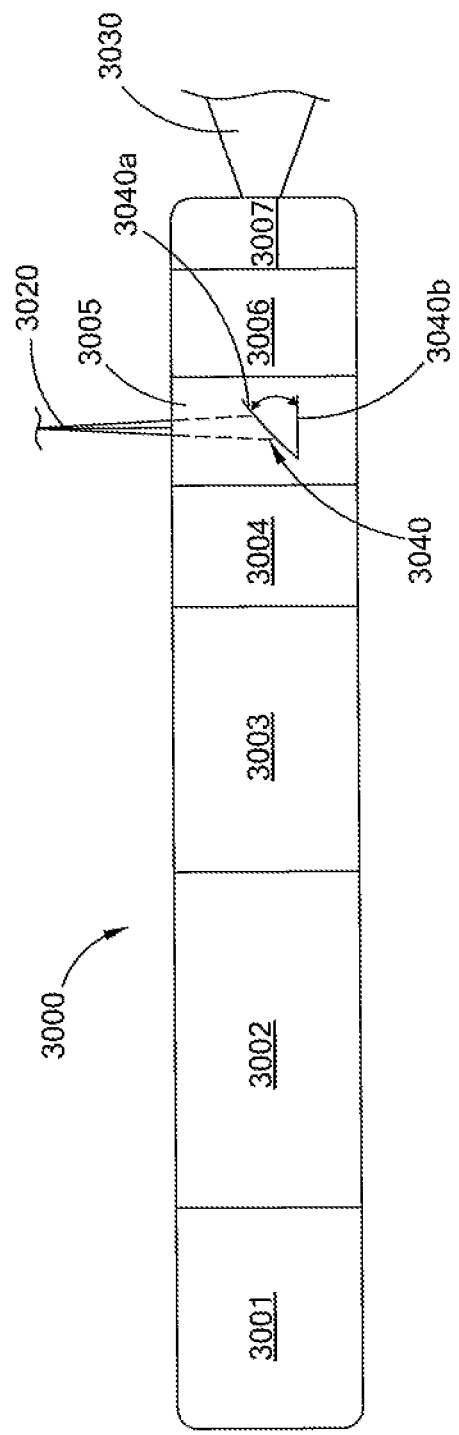
FIG. 3 is a schematic of an embodiment of a laser cutting tool in accordance with the present invention.

Turning to FIG. 3, there is shown an embodiment of a laser cutting tool 3000. The laser cutting tool 3000 has a conveyance termination section 3001, an anchoring and positioning section 3002, a motor section 3003, an optics package 3004, an optics and laser cutting head section 3005, a second optics package 3006, and a second laser cutting head section 3007. The conveyance termination section would receive and hold, for example, a composite high power laser umbilical, a coil tube having for example a high power laser fiber and a channel for transmitting a fluid for the laser cutting head, a wireline having a high power fiber, or a slick line and high power fiber. The anchor and positioning section may have a centralizer, a packer, or shoe and piston or other mechanical, electrical, magnetic or hydraulic device that can hold the tool in a fixed and predetermined position both longitudinally and axially. The section may also be used to adjust and set the stand off distance that the laser head is from the surface to be cut. The motor section may be an electric motor, a step motor, a motor driven by a fluid or other device to rotate one or both of the laser cutting heads or cause one or both of the laser beam paths to rotate. Motor, optic assemblies, and beam and fluid paths of the types that are disclosed and taught in the following US patent applications: Ser. No. 13/403,509; Ser. No. 61/403,287; Publication No. 2012/0074110; Ser. No. 61/605,429; Ser. No. 61/605,434; and, Ser. No. 13/403,132, may be utilized, the entire disclosures of each of which are incorporated herein by reference. There is provided an optics section 3004, which for example, may shape and direct the beam and have optical components such as a collimating element or lens and a focusing element or lens. Optics assemblies, packages and optical elements disclosed and taught in the following US patent applications: Ser. No. 13/403,132; and, Ser. No. 61/446,040 may be utilized, the entire disclosure of each of which is incorporated herein by reference. The optics and laser cutting head section 3005 has a mirror 3040. The mirror 3040 is movable between a first position 3040a, in the laser beam path, and a second position 3040b, outside of the laser beam path. The mirror 3040 may be a focusing element. Thus, when the mirror is in the first position 3040a, it directs and focuses the laser beam along beam path 3020. When the mirror is in the second position 3040b, the laser beam passes by the mirror and enters into the second optics section 3006, where it may be shaped into a larger circular spot (having a diameter greater than the tools diameter), a substantially linear spot, or an elongated epical pattern, as well as other spot or pattern shapes and configurations, for delivery along beam path 3030. The tool of the FIG. 3 embodiment may be used, for example, in the boring, radially cutting and, sectioning method discussed herein, wherein beam path 3030 would be used for axial boring of a structure and beam path 3020 would be used for the axial cutting and segmenting of the structure. Like the embodiment of FIG. 2, the laser beam path 3020 may be rotated and moved axially. The laser beam path 3030 may also be rotated and preferably should be rotated if the beam pattern is other than circular and the tool is being used for boring. The embodiment of FIG. 3 may also be used to clear, pierce, cut, or remove junk or other obstructions from the bore hole to, for example, facilitate the pumping and placement of cement plugs during the plugging of a bore hole.

Figure 4:
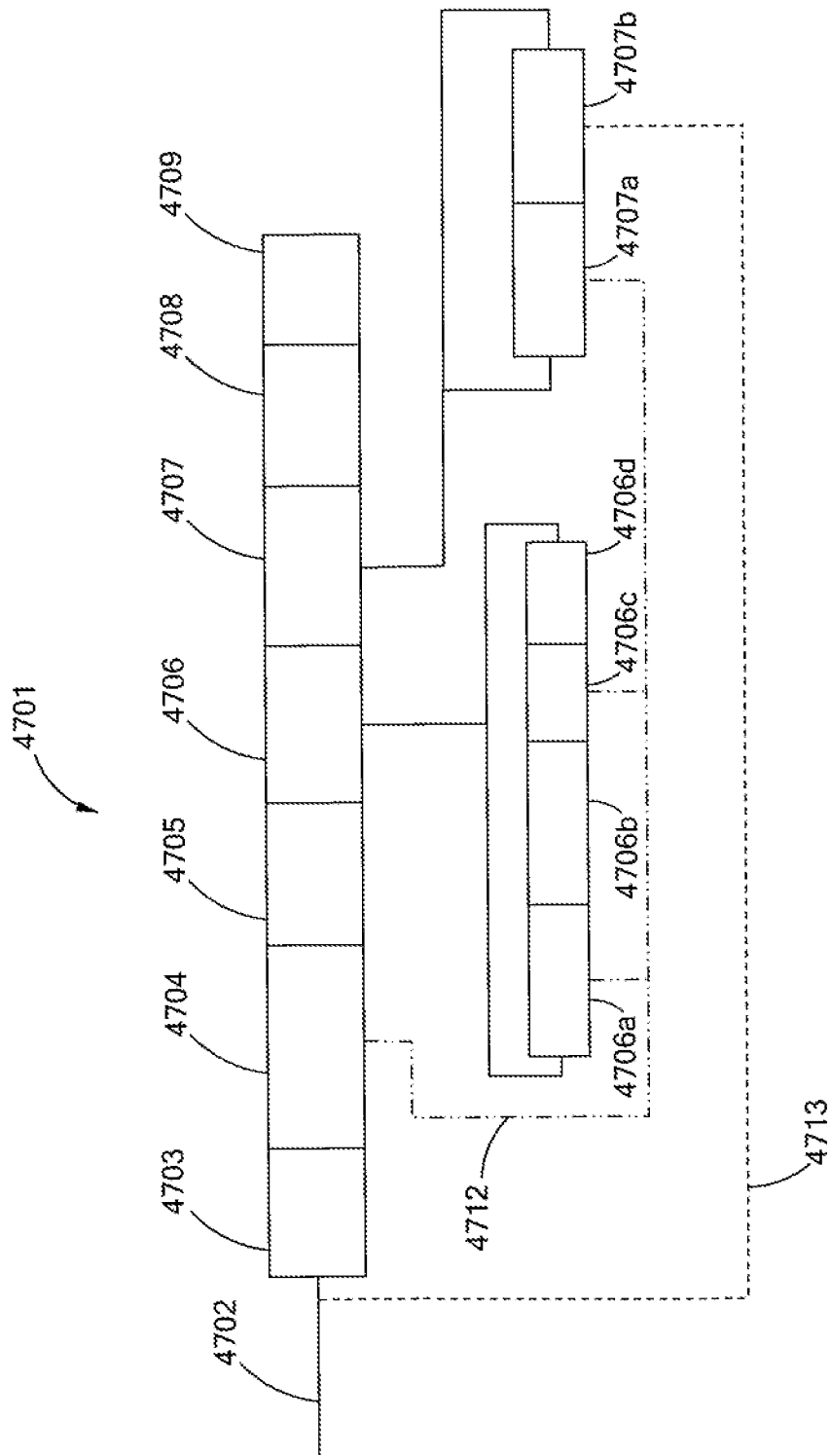
FIG. 4 is a schematic of an embodiment of a laser cutting tool in accordance with the present invention.

Turning to FIG. 4, there is provided a schematic of an embodiment of a laser cutting tool. The laser tool 4701 has a conveyance structure 4702, which may have an E-line, a high power laser fiber, and an air pathway. The conveyance structure 4702 connects to the cable/tube termination section 4703. The tool 4701 also has an electronics cartridge 4704, an anchor section 4705, a hydraulic section 4706, an optics/cutting section (e.g., optics and laser head) 4707, a second or lower anchor section 4708, and a lower head 4709. The electronics cartridge 4704 may have a communications point with the tool for providing data transmission from sensors in the tool to the surface, for data processing from sensors, from control signals or both, and for receiving control signals or control information from the surface for operating the tool or the tools components. The anchor sections 4705, 4708 may be, for example, a hydraulically activated mechanism that contacts and applies force to the borehole. The lower head section 4709 may include a junk collection device, or a sensor package or other down hole equipment. The hydraulic section 4706 has an electric motor 4706*a*, a hydraulic pump 4606*b*, a hydraulic block 4706*c*, and an anchoring reservoir 4706*d*. The optics/cutting section 4707 has a swivel motor 4707*a* and a laser head section 4707*b*. Further, the motors 4704*a* and 4706*a* may be a single motor that has power transmitted to each section by shafts, which are controlled by a switch or clutch mechanism. The flow path for the gas to form the fluid jet is schematically shown by line 4713. The path for electrical power is schematically shown by line 4712. The laser head section 4707*b* preferably may have any of the laser fluid jet heads provided in this specification, it may have a laser beam delivery head that does not use a fluid jet, and it may have combinations of these and other laser delivery heads that are known to the art.

FIGS. 5A and 5B show schematic layouts for cutting systems using a two fluid dual annular laser jet. Thus, there is an uphole section 4801 of the system 4800 that is located above the surface of the earth, or outside of the borehole. There is a conveyance section 4802, which operably associates the uphole section 4801 with the downhole section 4803. The uphole section has a high power laser unit 4810 and a power supply 4811. In this embodiment, the conveyance section 4802 is a tube, a bunched cable, or umbilical having two fluid lines and a high power optical fiber. In the embodiment of FIG. 6A, the downhole section has a first fluid source 4820, e.g., water or a mixture of oils having a predetermined index of refraction, and a second fluid source 4821, e.g., an oil having a predetermined and different index of refraction from the first fluid. The fluids are fed into a dual reservoir 4822 (the fluids are not mixed and are kept separate as indicated by the dashed line), which may be pressurized and which feeds dual pumps 4823 (the fluids are not mixed and are kept separate as indicated by the dashed line). In operation the two fluids 4820, 4821 are pumped to the dual fluid jet nozzle 4826. The high power laser beam, along a beam path enters the optics 4824, is shaped to a predetermined profile, and delivered into the nozzle 4826. In the embodiment of FIG. 5B a control head motor 4830 has been added and controlled motion laser jet 4831 has been employed in place of the laser jet 4826. Additionally, the reservoir 4822 may not be used, as shown in the embodiment of FIG. 56.

Turning to FIGS. 6A and 6B, there is shown schematic layouts for cutting systems using a two fluid dual annular laser jet. Thus, there is an uphole section 4901 of the system 4900 that is located above the surface of the earth, or outside of the borehole. There is a conveyance section 4902, which operably associates the uphole section 4901 with the downhole section 4903. The uphole section 4901 has a high power laser unit 4910 and a power supply 4911 and has a first fluid source 4920, e.g., a gas or liquid, and a second fluid source 4921, e.g., a liquid having a predetermined index of refraction. The fluids are fed into a dual reservoir 4922 (the fluids are not mixed and are kept separate as indicated by the dashed line), which may be pressurized and which feeds dual pumps 4923 (the fluids are not mixed and are kept separate as indicated by the dashed line). In operation the two fluids 4920, 4921 are pumped through the conveyance section 4902 to the downhole section 4903 and into the dual fluid jet nozzle 4926. In this embodiment, the conveyance section 4902 is a tube, a bunched cable, or umbilical. For FIG. 6A, the conveyance section 4902 would have two fluid lines and a high power optical fiber. In the embodiment of FIG. 6B, the conveyance section 4902 would have two fluid lines, an electric line and a high power optical fiber. In the embodiment of FIG. 6A, the downhole section 4903 has an optics assembly 4924 and a nozzle 4925. The high power laser beam, along a beam path enters the optics assembly 4924, where it may be shaped to a predetermined profile, and delivered into the nozzle 4926. In the embodiment of FIG. 6B, a control head motor 4930 has been added and controlled motion laser jet 4931 has been employed in place of the laser jet 4926. Additionally, the reservoir 4922 may not used as shown in the embodiment of FIG. 6B.

Downhole tractors and other types of driving or motive devices may be used with the laser tools to both advance or push the laser down into or along a member to be cut, or to pull the laser tool from the member. Thus, for example a coil tubing injector, an injector assembly having a goose neck and/or straightener, a rotating advancement and retraction device, a dog and piston type advancement and retraction device, or other means to push or pull a coil tubing, a tubular, a drill pipe, integrated umbilical or a composite tubing, which is affixed to the laser tool, may be utilized. In this manner the tool may be precisely positioned for laser cutting. Further, when performing an inside-to-outside cut, if the pile, or other structure is filled with mud, or other semi-solid material, the laser tool may be forced through, e.g., snubbed, the mud to the location where the laser cut is to be performed. For an outside-to-inside cut, this type of forcing may also be utilized when there is mud, debris or similar semi-solid materials present around the outside of the cut that the tool may be pushed through. In this manner, the laser cut could be performed without having to go through the added expense and time of removing the mud to expose the cut area. It is noted that a winch, gravity and other means of lowering or advancing the laser tool to the desired position may be employed. These devices can be used to advance the laser tool to a specific location where a laser process, e.g., a laser cut is needed, or they can be used to move the tool, and thus the laser head and beam path to deliver a particular pattern to make a particular cut. Further, these devices may be incorporated into, or otherwise associated with, platforms or structures that are attached to, either permanently or releasably to the top of the pile, well or other structure that is to be cut.

Figure 7:
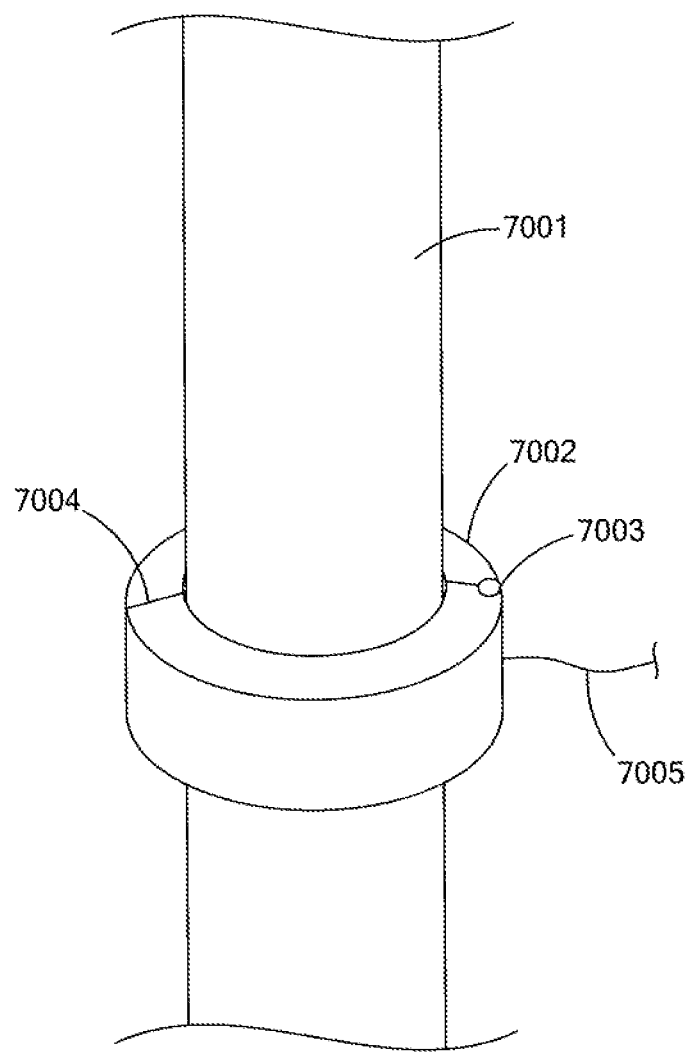
FIG. 7 is a schematic of an embodiment of a laser cutting tool in accordance with the present invention.

Turning to FIG. 7, there is provided an embodiment of a laser cutting tool 7002 that may be used for example to perform an outside-to-inside cut. The laser cutting tool 7002 is shown attached to a section of a vertical support member 7001 of a jacket of a fixed platform. The tool 7002 has a hinge device 7003 and a securing or locking means 7004. The tool 7002 has an umbilical 7005 for providing high power laser energy to the tool, as well as, any fluids, electricity or other materials or data used in the cutting operation. The tool may have one, two or more laser cutting heads, not shown in the figure, that are located within the laser tool. In operation the laser tool is closed around the vertical member and secured together. The laser cutting head(s) would then move around the interior of the tool delivering the laser beam in a circular pattern around the exterior of the vertical member. This embodiment may also be associated with a tractor, guide wires, or a lifting mechanism, which would permit it to be moved, or move, along a member that it is attached to, and thus go to a different location to perform cuts without having to be unsecured and resecured.

Figure 8:
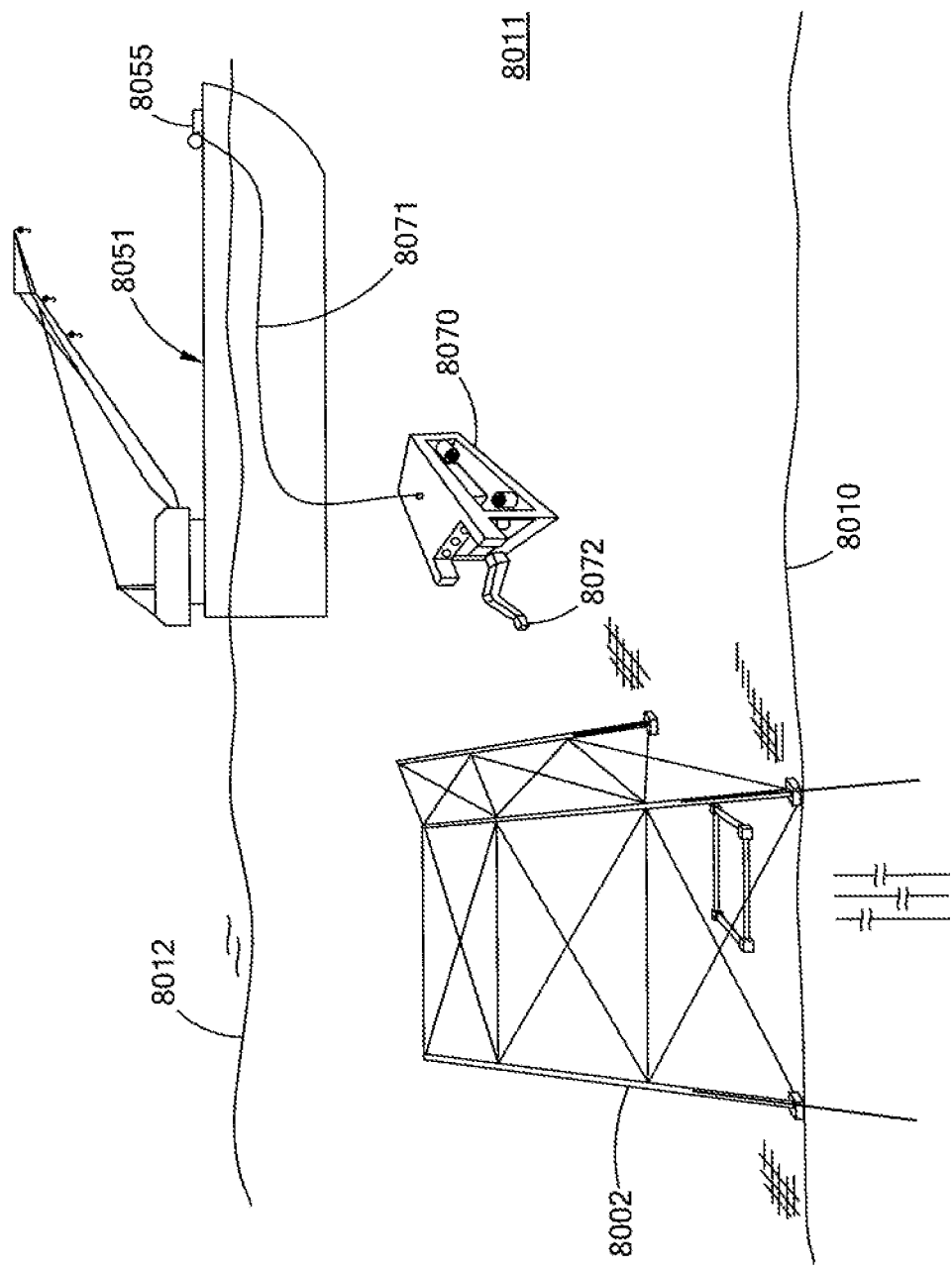
FIG. 8 is a schematic of an embodiment of a laser removal system and method in accordance with the present invention.

Turning to FIG. 8, there is provided an embodiment of a laser cutting tool 8072 that is associated with a Remote Operated Vehicle (ROV) 8070. Thus, there is provided in this embodiment a vessel 8051, a laser module 8055, an umbilical 8071 (which provides among other things an optical connection between the laser and the cutter 8072). The ROV 8070 is shown in a body of water 8011, below the surface 8012 and moving toward a jacket 8002 that is fixed to the sea floor 8010 and which has been partially removed. The laser cutting tool 8072 may be used to cut various sections and members of the jacket 8002. It being understood that, with this embodiment, as well as other embodiments provided in this specification, although sub-sea jackets and piles are illustrated, the embodiments, tools, methods and systems may be utilized to cut and remove other types and kinds of structures or materials, sub-sea, land based or otherwise, e.g., mooring chains, subsea pipelines, or control umbilicals.

Figure 9:
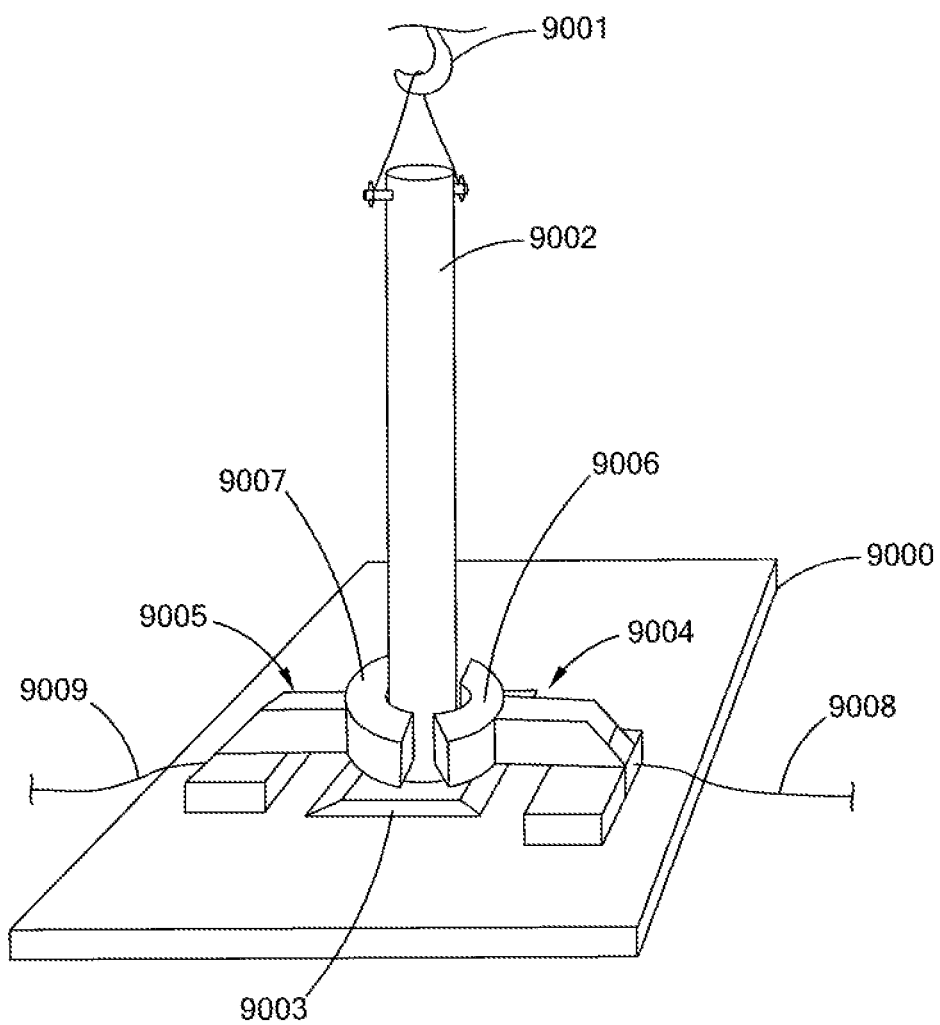
FIG. 9 is a perspective view of an embodiment of a laser cutting station in accordance with the present invention.

Turning to FIG. 9, there is provided an embodiment of a tubular cutting station that has a platform 9000. The platform 9000 may be a rig floor, or it may be attached to, or part of a vessel, such as a decommissioning vessel. The platform 9000 has a hoisting means 9001 associated with it. As shown in the figure, the hoisting means has lifted a member 9002, which for example could be a conductor. The member 9002 extends above and below (not shown) the platform and needs to be sectioned for further handling. The platform has a locking and engaging device 9003, e.g. along the lines of a spider for use with risers or other large tubulars, or a hole and pin arrangement, that holds the lower section of the member 9002 and prevents it from falling once the cut has been made. In this embodiment, there are provided two laser cutting devices 9004, 9005. These two devices 9004, 9005 each have a laser cutting assembly 9006, 9007, which have laser cutting heads (not shown), and a high power laser umbilical 9008, 9009. In operation, a tubular or member 9002 is pulled up through the platform by the hoist 9001. The tubular is then locked and held by the engagement device 9003. The laser cutting devices 9004, 9005 then move the laser cutting assemblies 9006, 9007 into engagement with the tubular. (A predetermined standoff distance may be utilized, or the assemblies may be in direct contact with the tubular.) Preferably, the cutting devices 9004, 9005 are in optical sealing contact with the tubular. In this manner the cutting environment and the system may be classified as a Class 1 system and have the safety and ease of use benefits of such a system. The entire laser cutting device 9004, 9005 or both, may for example slide toward the tubular on tracks, or the device may have a stationary base and movable arm, such a robotic arm, that moves the cutting assembly into position. The laser head(s) then deliver a laser beam(s) to cut the tubular. The upper section of the tubular is then removed by the hoist. A lifting device, e.g., holes and pins, is then associated with the remaining lower section of the tubular, the tubular is then hoisted up into position and the cutting process is repeated. For a conductor that may be as much as 2,000 or 3,000 feet, this process may have to be repeated many times, depending upon the lifting height or clearance of the hoist (e.g., about 50, 100 or 200 feet).

Figure 10:
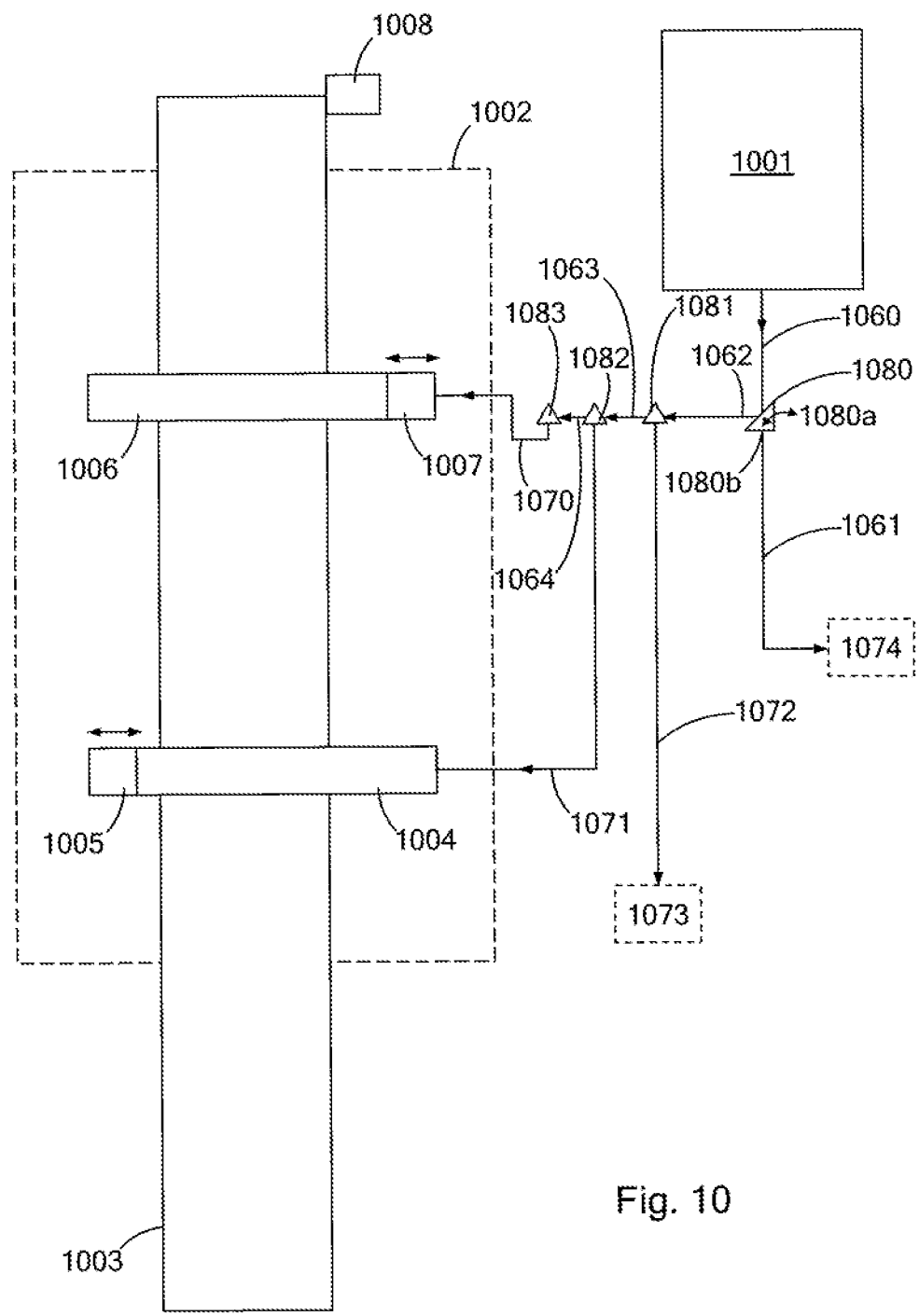
FIG. 10 is a schematic of an embodiment of a laser system in accordance with the present invention.

Turning to FIG. 10, there is shown an embodiment of a laser shop and laser beam distribution system for use on, or in conjunction with, a laser decommissioning system. In general, the laser shop and system many have a single or multiple lasers that are optically associated with cutting tools and devices. Preferably, the optical association is with the use of high power optical fibers, beam splitters, mirrors, and other such optical components to control, determine and direct the manner in which the laser beam is transported to various cutting tools and devices. There is provided, by way of example, a high power laser 1001, that has a high power optical fiber 1060 for transporting the laser beam from the laser (the arrows show the direction of travel or propagation, of the laser beam in the fibers). The optical fiber 1060 is optically associated with a movable mirror 1080 or other type of beam directing or shifting device, such as a movable beam splitter. The mirror 1080 may be moved from a first position 1080*b* to a second position 1080*a*. When the mirror 1080 is in position 1080*a* (i.e., removed from the beam path) all of the high power laser energy is transmitted to fiber 1061, which is optically associated with assembly 1074. Assembly 1074 may be for example a spool, a tool such as shown in FIGS. 2-8, or both. When the beam splitter is in position 1080*b*, (i.e., in the beam path) a portion of, or all of the laser beam is transmitted along fiber 1062 (with any remaining portion of the laser beam being transmitted along fiber 1061. (The ratios of power transmitted between fibers 1062 and 1061, when device is in position 1080*b* may be for example about 100:0, 50:50, 40:60.60:40 or other ratios of power between fiber 1062 and fiber 1061.) Fiber 1062 is optically associated with a first fixed beam splitter 1081. First fixed beam splitter 1081 is optically associated with fiber 1063 and fiber 1072. Fiber 1063 is optically associated with a second fixed beam splitter 1082, which in turn is optically associated with fiber 1071 and fiber 1064. Fiber 1064 is optically associated with a third fixed beam splitter 1083, which is optically associated with fiber 1070 and a beam dump (not shown). The fixed beam splitters 1081, 1082, 1083 may have any ratio of power transmission that is need for the tools or process that the tools associated with the respective fibers may need. Fiber 1072 is optically associated with laser device 1073, which for example may be a hand held laser cutting tool.

Optical fibers 1070 and 1071 provide high power laser energy to laser cutting devices 1004, 1006 that are shown in an associated laser shop layout 1002. The laser shop layout 1002 has a transport device 1003 that has a driver 1008. The transport device, for example, may be a conveyor system, a winch and rail system, or a tubular conveyance system along the lines of a catwalk. The laser cutting devices 1004, 1006 have laser cutting heads 1005, 1007, which move along the cutting devices as shown by the arrows. In operation, a member to be cut is moved into the laser shop layout area, under the laser cutting devices. The laser heads are then moved across the member, delivering a laser beam along a beam path to the member and severing it.

The layout of fibers, movable beam splitters, fixed beam splitters, laser and cutters may be varied and additional or other optical components may be used with out departing from the spirit and scope of this invention. Thus, for example, each tool or cutter could have a dedicated laser. The laser shop could have a dedicated laser and the other tools could operate from a second laser. In this later example only two lasers would be required, and if one should break, the other could be used to run the entire system using a configuration like the FIG. 10 embodiment. Additionally, a dedicated laser module may be used, which module may further be specifically designed and constructed for a particular application or system.

Thus, for example, the laser cutting tools, and variations and combinations of these tools, disclosed and taught in the following US patent applications and US patent application Publications: Publication No. 2010/0044104; Ser. No. 14/403,509; Ser. No. 13/366,882; Publication No. 2012/0074110; Ser. No. 61/605,429; Ser. No. 61/605,434; Publication No. 2012/0067643; Ser. No. 61/378,910; Ser. No. 611374,594; and Ser. No. 13/347,445, the entire disclosure of each of which is incorporated herein by reference, may be utilized.

The arrangement and relative positions of sections and components of the laser tools, devices and configurations of the embodiments herein may be varied, intermixed, and additional sections or components may be used and employed without departing from the scope and spirit of the inventions.

Laser Cutting Heads

Configurations of optical elements for collimating and focusing the laser beam can be employed with laser cutting heads to provide the desired beam properties for a particular application or tool configuration. A further consideration, however, is the management of the optical affects of fluids or debris that may be located within the beam path between laser tool and the work surface, e.g., the surface of the material to be cut.

Thus, it is advantageous to minimize the detrimental effects of such fluids and materials and to substantially ensure, or ensure, that such fluids do not interfere with the transmission of the laser beam, or that sufficient laser power is used to overcome any losses that may occur from transmitting the laser beam through such fluids. To this end, mechanical, pressure and jet type systems may be utilized to reduce, minimize or substantially eliminate the effect of these fluids on the laser beam.

For example, mechanical devices may be used to isolate the area where the laser operation is to be performed and the fluid removed from this area of isolation, by way of example, through the insertion of an inert gas, or an optically transmissive fluid, such as a water, brine, or water solutions. The use of a fluid in this configuration has the added advantage that it is essentially incompressible.

Preferably, if an optically transmissive fluid is employed the fluid will be flowing. In this manner, the overheating of the fluid, from the laser energy passing through it, or from it residing at the cut site, may be avoided or lessened; because the fluid is flowing and not dwelling or residing for extended times in the laser beam or at the cut site, where heating from laser and the laser cut material may occur.

The mitigation and management of back reflections when propagating a laser fluid jet through a fluid, from a cutting head of a laser tool to a work surface, may be accomplished by several methodologies, which are set forth in various embodiments herein. The methodologies to address back reflections and mitigate potential damage from them would include the use of an optical isolator, which could be placed in either collimated space or at other points along the beam path after it is launched from a fiber or connector. The focal point may be positioned such that it is a substantial distance from the laser tool; e.g., greater than 4 inches, greater than 6 inches and greater than 8 inches. Preferably, the focus point may be beyond the fluid jet coherence distance, thus, greatly reducing the likelihood that a focused beam would strike a reflective surface formed between the end of the fluid jet and the medium in which it was being propagated, e.g., a gas jet in water. The laser beam may be configured such that it has a very large depth of focus in the area where the work surface is intended to be, which depth of focus may extend into and preferably beyond the cutting tool. Additionally, the use of an active optical element (e.g., a Faraday isolator) may be employed. Methods, configurations and devices for the management and mitigation of back reflections are taught and disclosed in US Patent Applications Publication No. 2012/0074110 and Ser. No. 61/605,434, the entire disclosure of each of which is incorporated herein by reference.

Moreover, a mechanical snorkel like device, or tube, which is filled with an optically transmissive fluid (gas or liquid) may be extended between or otherwise placed in the area between the laser tool and the work surface or area. Similarly mechanical devices such as an extendable pivot arm may be used to shorten the laser beam path keeping the beam closer to the cutting surface as the cut is advanced or deepened.

A jet of high-pressure gas may be used with the laser beam. The high-pressure gas jet may be used to clear a path, or partial path for the laser beam. The gas may be inert, it may be air, nitrogen, oxygen, or other type of gas that accelerates, enhances, or controls the laser cutting processes.

The use of oxygen, air, or the use of very high power laser beams, e.g., greater than about 1 kW, greater than about 10 kW, and greater than about 20 kW, could create and maintain a plasma bubble, a vapor bubble, or a gas bubble in the laser illumination area, which could partially or completely displace the fluid in the path of the laser beam. If such a bubble is utilized, preferably the size of the bubble should be maintained as small as possible, which will avoid, or minimize the loss of power density.

A high-pressure laser liquid jet, having a single liquid stream, may be used with the laser beam. The liquid used for the jet should be transmissive, or at least substantially transmissive, to the laser beam. In this type of jet laser beam combination the laser beam may be coaxial with the jet. This configuration, however, has the disadvantage and problem that the fluid jet may not act as a wave-guide. A further disadvantage and problem with this single jet configuration is that the jet must provide both the force to keep the drilling fluid away from the laser beam and be the medium for transmitting the beam.

A compound fluid jet may be used in a laser cutting tool. The compound fluid jet has an inner core jet that is surrounded by annular outer jets. The laser beam is directed by optics into the core jet and transmitted by the core jet, which functions as a waveguide. A single annular jet can surround the core, or a plurality of nested annular jets can be employed. As such, the compound fluid jet has a core jet. This core jet is surrounded by a first annular jet. This first annular jet can also be surrounded by a second annular jet; and the second annular jet can be surrounded by a third annular jet, which can be surrounded by additional annular jets. The outer annular jets function to protect the inner core jet from the drill fluid present between the laser cutter and the structure to be cut. The core jet and the first annular jet should be made from fluids that have different indices of refraction. Further details, descriptions, and examples of such compound fluid laser jets are contained in the following US patent applications: Publication No. 2012/0074110; Ser. No. 61/605,434; and, Ser. No. 61/378,910, the entire disclosure of each of which is incorporated herein by reference.

The angle at which the laser beam contacts a surface of a work piece may be determined by the optics within the laser tool or it may be determined the positioning of the laser cutter or tool, and combinations and variations of these. The laser tools have a discharge end from which the laser beam is propagated. The laser tools also have a beam path. The beam path is defined by the path that the laser beam is intended to take, and can extend from the laser source through a fiber, optics and to the work surface, and would include as the laser path that portion that extends from the discharge end of the laser tool to the material or area to be illuminated by the laser.

In the situation where multiple annular jets are employed, the criticality of the difference in indices of refraction between the core jet and the first (inner most, i.e., closes to the core jet) annular jet is reduced, as this difference can be obtained between the annular jets themselves. However, in the multi-annular ring compound jet configuration the indices of refraction should nevertheless be selected to prevent the laser beam from entering, or otherwise being transmitted by the outermost (furthest from the core jet and adjacent the work environment medium) annular ring. Thus, for example, in a compound jet, having an inner jet with an index of refraction of $n_1$, a first annular jet adjacent the inner jet, the first annular jet having an index of refraction of $n_2$, a second annular jet adjacent to the first annular jet and forming the outer most jet of the composite jet, the second annular jet having an index of refraction of $n_3$. A waveguide is obtained when for example: (i) $n_1 > n_2$; (ii) $n_1 > n_3$; (iii) $n_1 < n_2$ and $n_2 > n_3$; and, (iv) $n_1 < n_2$ and $n_1 > n_3$ and $n_2 > n_3$.

The pressure and the speed of the various jets that make up the compound fluid jet can vary depending upon the applications and use environment. Thus, by way of example the pressure can range from about 100 psi, to about 4000 psi, to about 30,000 psi, to preferably about 70,000 psi, to greater pressures. However, lower pressures may also be used. The core jet and the annular jet(s) may be the same pressure, or different pressures, the core jet may be higher pressure or the annular jets may be higher pressure. Preferably, the core jet is at a higher pressure than the annular jet. By way of example, in a multi jet configuration the core jet could be 70,000 psi, the second annular jet (which is positioned adjacent the core and the third annular jet) could be 60,000 psi and the third (outer, which is positioned adjacent the second annular jet and is in contact with the work environment medium) annular jet could be 50,000 psi. The speed of the jets can be the same or different. Thus, the speed of the core can be greater than the speed of the annular jet, the speed of the annular jet can be greater than the speed of the core jet and the speeds of multiple annular jets can be different or the same. The speeds of the core jet and the annular jet can be selected, such that the core jet does contact the drilling fluid, or such contact is minimized. The speeds of the jet can range from relatively slow to very fast and preferably range from about 1 m/s (meters/second) to about 50 m/s, to about 200 m/s, to about 300 m/s and greater. The order in which the jets are first formed can be the core jet first, followed by the annular rings, the annular ring jet first followed by the core, or the core jet and the annular ring being formed simultaneously. To minimize, or eliminate, the interaction of the core with the drilling fluid, the annular jet is created first followed by the core jet.

In selecting the fluids for forming the jets and in determining the amount of the difference in the indices of refraction for the fluids, the wavelength of the laser beam and the power of the laser beam are factors that should be considered. Thus, for example, for a high power laser beam having a wavelength in the 1070 nm (nanometer) range the core jet can be made from an oil having an index of refraction of about 1.53 and the annular jet can be made from water having an index of refraction from about 1.33 or another fluid having an index less than 1.53. Thus, the core jet for this configuration would have an NA (numerical aperture) from about 0.12 to about 0.95, respectively.

The number of laser cutters utilized in a configuration of the present inventions can be a single cutter, two cutters, three cutters, and up to and including 12 or more cutters. As discussed above, the number of cutters depends upon several factors and the optimal number of cutters for any particular configuration and end use may be determined based upon the end use requirements and the disclosures and teachings provided in this specification. The cutters may further be positioned such that their respective laser beam paths are parallel, or at least non-intersecting within the center axis of the member to be cut.

Examples of laser power, fluence and cutting rates, based upon published data, are set forth in Table I.

TABLE I

| type | thickness (mm) | laser power (watts) | spot size (microns) | Laser fluence (MW/cc$^2$) | Gas | cutting rate (m/min) |
|---|---|---|---|---|---|---|
| mild steel | 15 | 5,000 | 300 | 7.1 | O$_2$ | 1.8 |
| stainless steel | 15 | 5,000 | 300 | 7.1 | N$_2$ | 1.6 |

Figure 12:
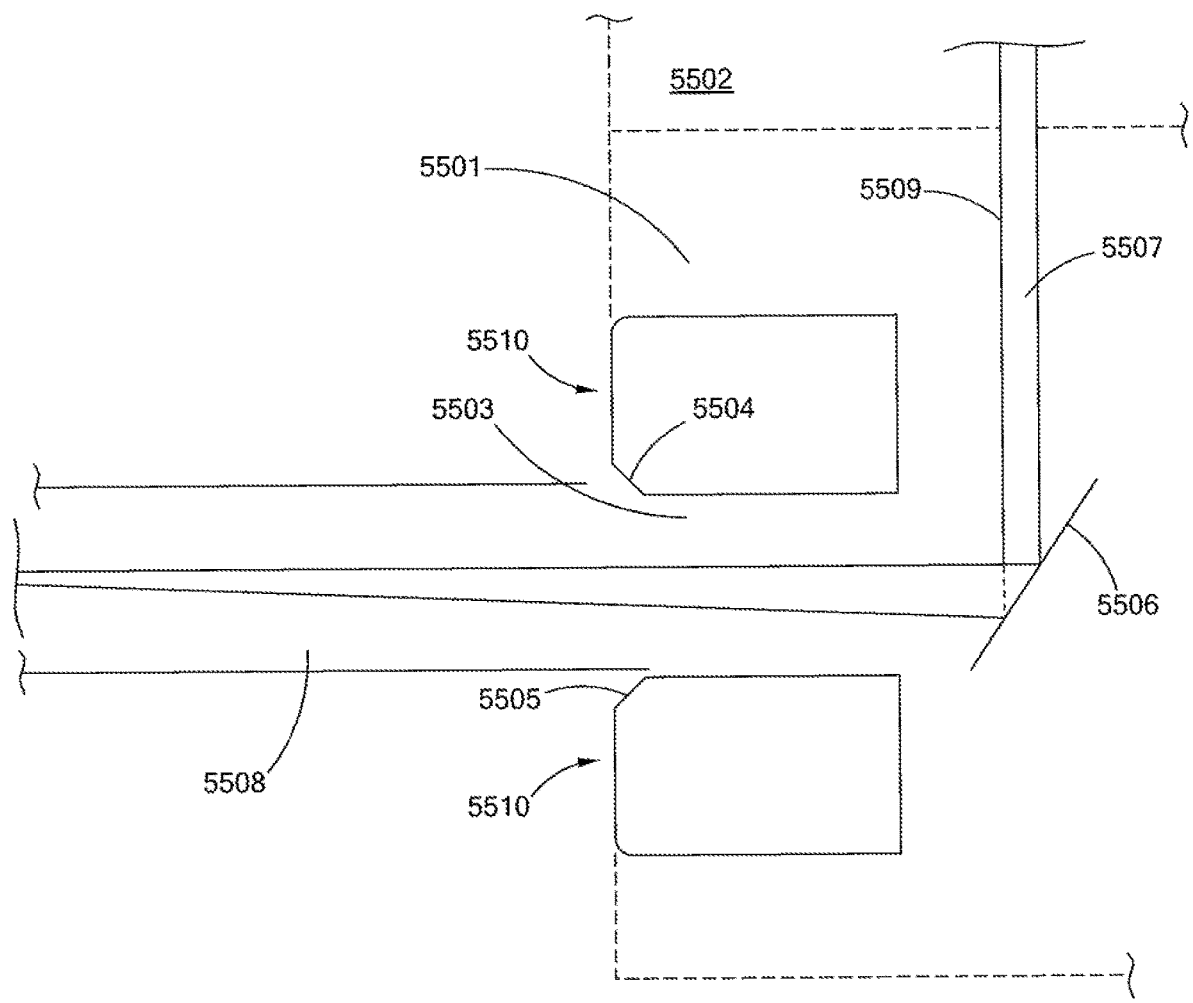
FIG. 12 is a schematic view of an embodiment of a laser cutting head in accordance with the present invention.

Turning to FIG. 12, there is provided a general schematic of an embodiment of a high power laser cutting head using a gas jet, a long focal length and having a large depth of field. Thus, the laser cutting head 5501 (shown in phantom lines) is associated with an optics assembly 5502 (partially shown and in phantom lines), which assembly takes the laser beam from a conveyance structure, focuses the laser beam (the optics assembly may also perform additional or other functions to effect beam properties) and provides the laser beam 5509 along a laser beam path 5507. The laser beam 5509 traveling along beam path 5507 is reflected by a reflective member, e.g., a mirror 5506 (at for example a right angle as shown). The beam and beam path enter into nozzle 5503 that forms a gas jet 5508. The gas jet 5508 may be, for example, air, oxygen, nitrogen, an inert gas, a cutting gas, or a super critical fluid. The face 5510 of the nozzle 5503 may be tapered outwardly, as provided by surfaces 5504, 5505.

Focal lengths may vary from about 40 mm (millimeters) to about 2,000 mm, and more preferably from about 150 mm to about 1,500 mm, depending upon the application, material type, material thickness, and other conditions that are present during the cutting. The jet velocity may be about 100 to about 10,000 f/s and from about 100 to about 5,000 cf/m, depending upon the application, material type, material thickness, and other conditions that are present during the cutting.

The mirror may be any high power laser optic that is highly reflective of the laser beam wavelength, can withstand the operational pressures, and can withstand the power densities that it will be subjected to during operation. For example, the mirror may be made from various materials. For example, metal mirrors are commonly made of copper, rhodium, polished and coated with polished gold, nickel, aluminum, or silver and sometime may have dielectric enhancement. Mirrors with glass substrates may often be made with fused silica because of its very low thermal expansion. The glass in such mirrors may be coated with a dielectric HR (highly reflective) coating. The HR stack as it is known, includes of layers of high/low index layers made of $SiO_2$, $Ta_2O_5$, $ZrO_2$, MgF, $Al_2O_3$, $HfO_2$, $Nb_2O_5$, $TiO_2$, $Ti_2O_3$, $WO_3$, SION, $Si_3N_4$, Si, or $Y_2O_3$ (All these materials would work for may wave lengths, including 1064 nm to 1550 nm). For higher powers, such as 50 kW actively cooled copper mirrors with gold enhancements may be used. It further may be water cooled, or cooled by the flow of the gas. Preferably, the mirror may also be transmissive to wavelengths other than the laser beam wavelength. In this manner an optical observation device, e.g., a photo diode, a camera, or other optical monitoring and detection device, may be placed behind it.

In the embodiment of FIG. 12, the face 5510 of the nozzle is flush with the body of the laser head 5501. The nozzle face, with respect to the body of the laser head may be recessed, slightly recessed, extend beyond, have an extension tube that extends beyond and combinations and variations of these.

Although not shown in the figure, the mirror and nozzle, or the entire head may be movable or steerable.

During operations, and in particular when the laser tool is being operated in a fluid filled or dirty environment, the air flow should be maintained into the laser head and out the nozzle with sufficient pressure and flow rate to prevent environmental contaminants or fluid from entering into the nozzle, or contaminating the mirror or optics. A shutter, or door that may be opened and closed may also be used to protect or seal the nozzle opening, for example, during tripping into and out of a borehole. A disposable cover may also be placed over the nozzle opening, which is readily destroyed either by the force of the gas jet, the laser beam or both. In this manner, the nozzle, mirror and optics can be protecting during for example a long tripping in to a borehole, but readily removed upon the commencement of downhole laser cutting operations, without the need of mechanical opening devices to remove the cover.

For performing downhole laser cutting operations, and in particular the laser cutting of tubulars within a borehole the following cutting rates may be obtained using a laser gas jet tool with an air pressure of about 125 psi above the ambient pressure, e.g., borehole pressure, at the nozzle (as borehole pressures increase high gas pressures may be used), an air flow volume of 10-300 cfm (depending upon the nozzle diameter), the focal point being about 6 inches from the nozzle face, and the surface of the tubular being about 5 inches from the nozzle face.

TABLE II

| laser power at surface of tubular | spot size diameter at surface of tubular | tubular wall thickness (inches) | cutting rate (inches/min.) |
|---|---|---|---|
| 15 kW | 5 mm | ¼ | 30+ |
| 15 kW | 5 mm | ⅜ | 25+ |
| 15 kW | 5 mm | ½ | 10+ |
| 20 kW | 5 mm | ½ | 35+ |
| 20 kW | 600 μm | ¼ | 200 |
| 20 kW | 600 μm | ½ | 100+ |
| 20 kW | 600 μm | ¾ | 75+ |

The reflective member in the embodiment FIG. 12, as well as, other embodiments for tools and laser cutting heading heads may be a prism, and preferably a prism that utilizes total internal reflection (TIR). Thus, and in general, the prism is configured within the tool such that a high power laser beam is directed toward a first face or surface of the prism. The prism may be made of fused silica, sapphire, diamond, calcium chloride, or other such materials capable of handling high power laser beams and transmitting them with little, low or essentially no absorbance of the laser beam. The plane of first face is essentially normal to the laser beam and has an antireflective (AR) coating. This angle may vary from 90 degrees, by preferably no more than 5 degrees. Large angles of variation are contemplated, but less preferred, because specific AR coatings and other means to address reflection, refraction will need to be utilized. A key advantage in this embodiment is that the AR coatings have a much lower absorption than an (highly reflective) HR coating as a consequence there is substantially less heating in the substrate when using and AR coating. The entrance and exit of the prism should have AR coating matched to the medium of transmission and the angle of incidence of the laser beam should satisfies the TIR condition to cause the beam to be deflected in a different direction. Multiple TIR reflections can be used to make the total desired angle with virtually no loss, and essentially no loss, in power at each interface.

Upon entering the prism, the laser beam travels through the prism material and strikes a second surface or face, e.g., the hypotenuse, of the prism. The material on the outside this second face has an index of refraction, which in view of the angle at which the laser beam is striking the second face, result in total internal reflection (TIR) of the laser beam within the prism. Thus, the laser beam travels from the second face to the third face of the prism and leaves the prism at an angle that is about 90 degrees to the path of the laser beam entering the prism. In this manner, the prism utilizes TIR to change the direction of the laser beam within the tool. Depending upon the position of the prism relative to the incoming laser beam and other factors, the angle of the exiting laser beam from the prism relative to the incoming laser beam into the prism may be greater than or less than 90 degrees, e.g., 89 degrees. 91 degrees, 92 degrees, and 88 degrees, with the minimum angle being dependent on the refractive index of the material and the TIR condition, etc. Further embodiments of TIR prisms in laser tools are taught and disclosed in U.S. Patent Application Ser. No. 61/605, 434, the entire disclosure of which is incorporated herein by reference.

Figure 13:
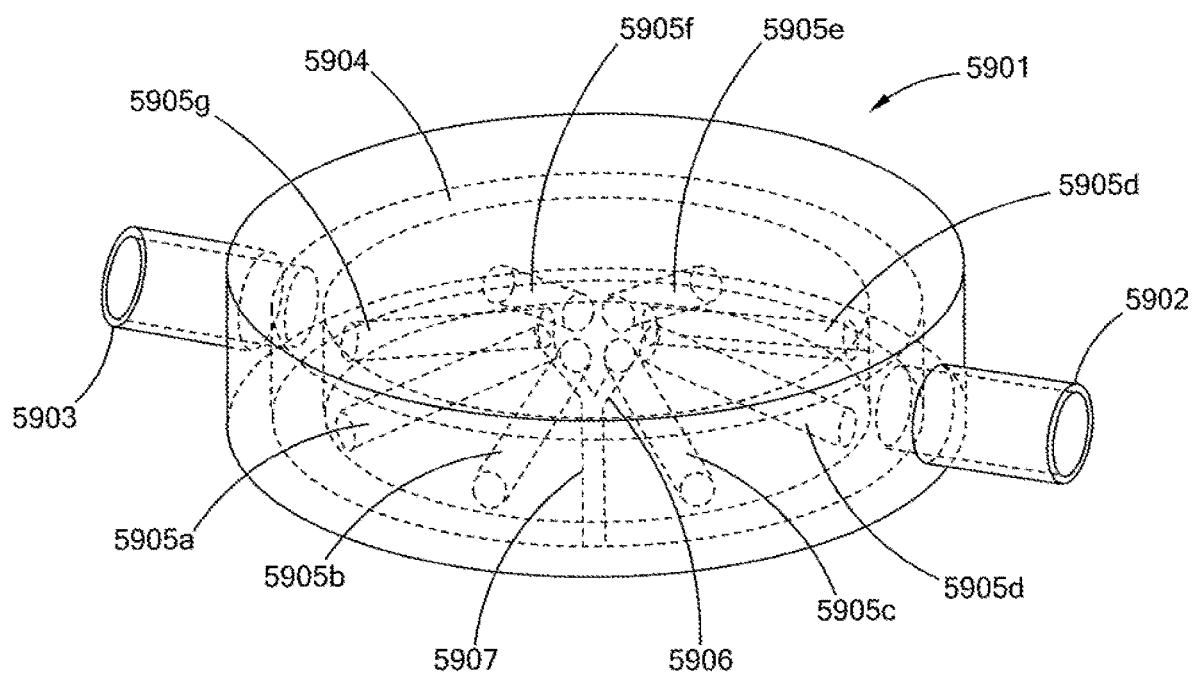
FIG. 13 is a perspective view of a laser nozzle assembly in accordance with the present invention.

Turning to FIG. 13, there is shown a perspective view of a nozzle assembly 5901. The nozzle assembly has a first fluid inlet 5902, a second fluid inlet 5903, which are in fluid communication with an annular chamber 5904. The annular chamber 5904 is in fluid communication with nozzle feed passages 5905*a*, 5905*b*, 5905*c*, 5905*d*, 5905*e*, 5950*f*, 5905*g*. These feed passages are in fluid communication with a nozzle cone 5906 having a nozzle tube 5907.

Figure 14:
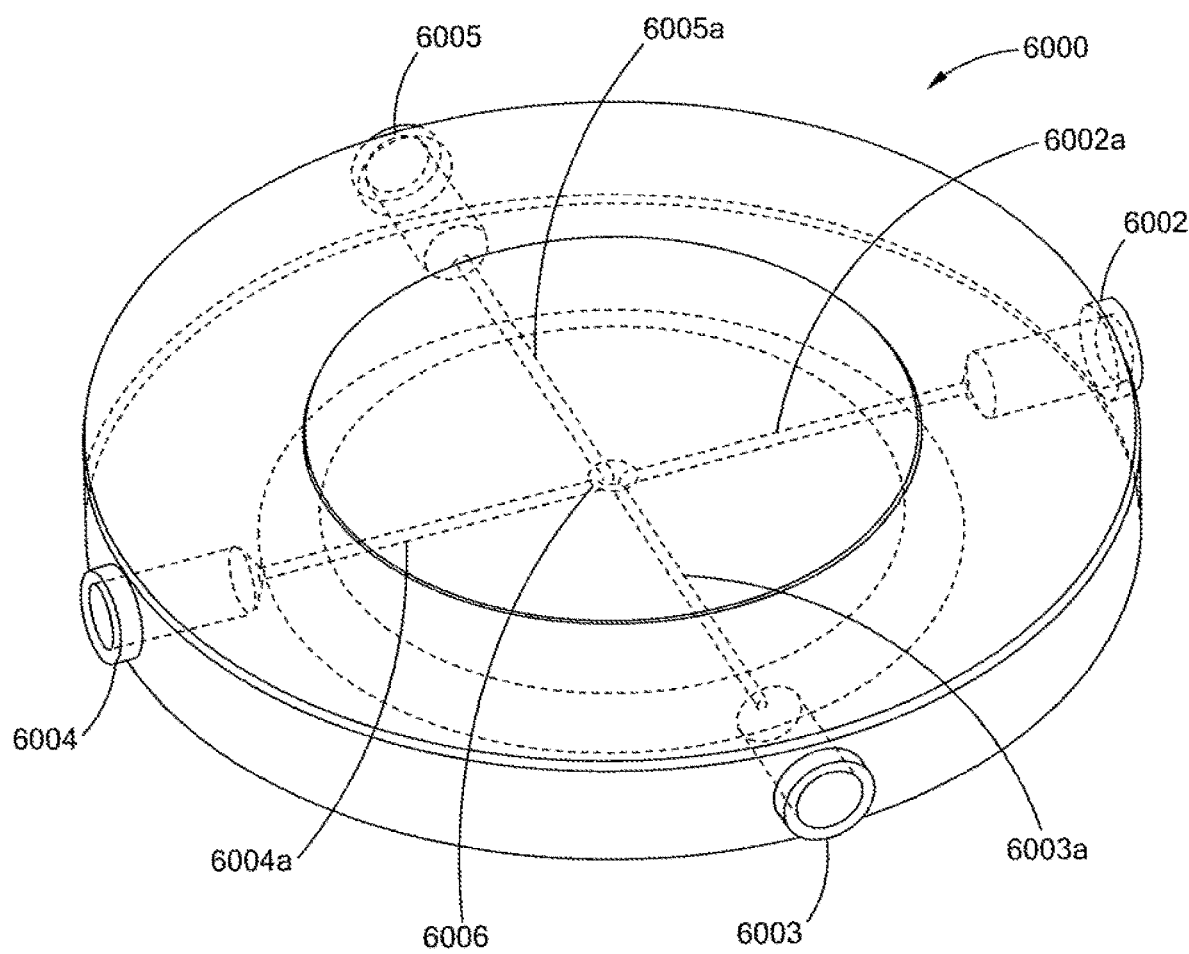
FIG. 14 is a perspective view of a laser nozzle assembly in accordance with the present invention.

Turning to FIG. 14, there is shown a perspective view of a nozzle assembly 6000. The nozzle assembly has a four fluid intakes 6002, 6003, 6004, 6005, which each feed fluid intake passages 6002a, 6003a, 6004a, 6005a. These fluid intake passage feed nozzle 6006.

Figure 15A:
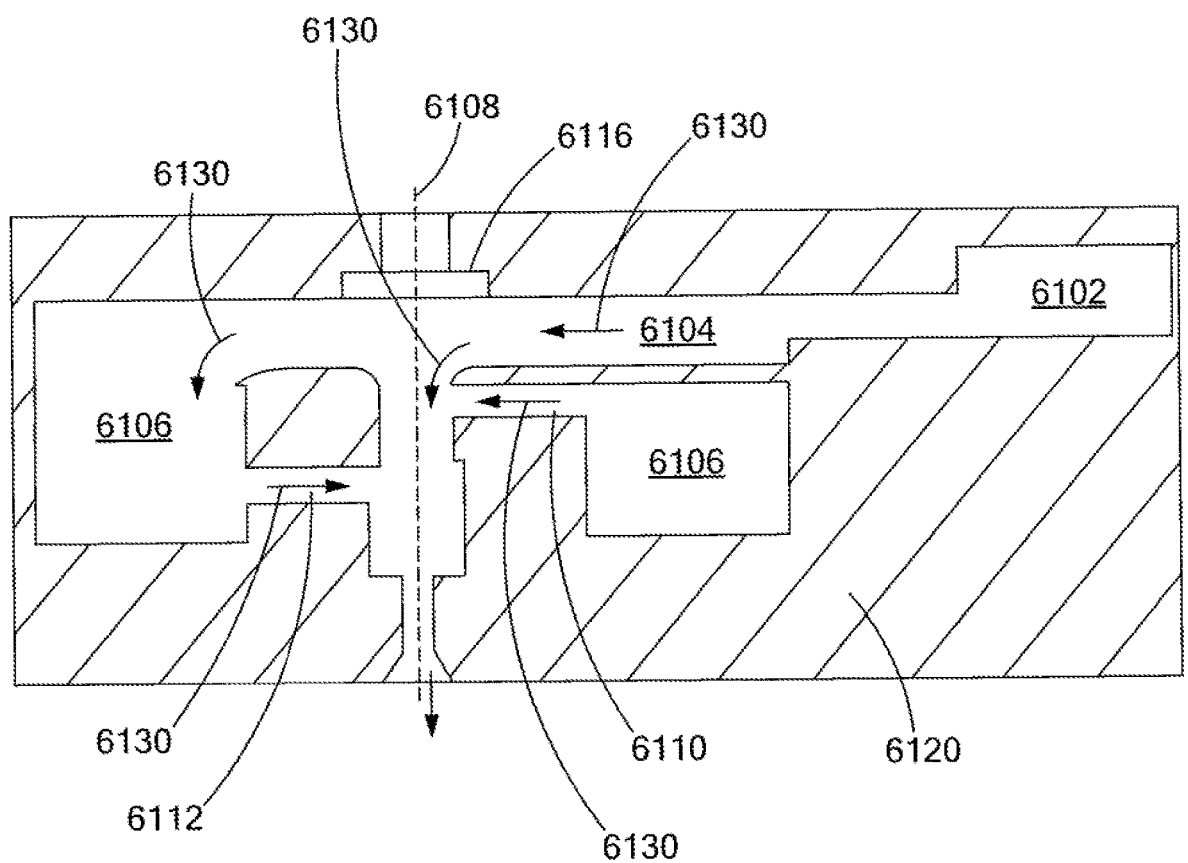
FIG. 15A is a cross sectional view of a laser nozzle assembly in accordance with the present invention.
Figure 15B:
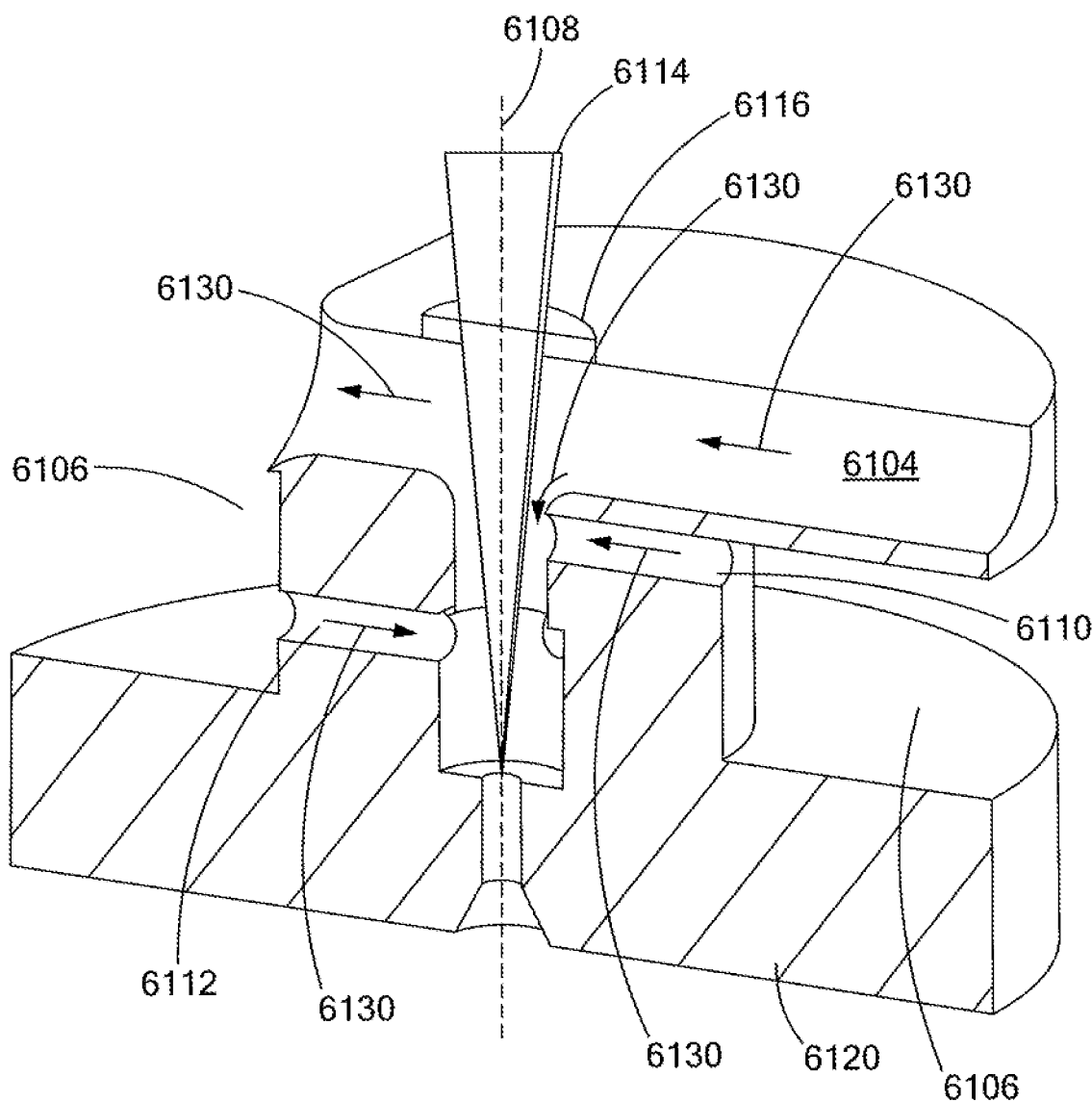
FIG. 15B is a cross sectional prospective view of a portion of the laser nozzle assembly of FIG. 15A.

FIG. 15A is a cross-sectional view of a nozzle assembly having several ancillary chambers and FIG. 15B is a perspective cross-section cutaway of some of the components of this nozzle assembly. The nozzle assembly has a body 6120 that has a fluid inlet 6102, which feeds a window flow chamber 6104 (fluid flow is shown by arrows 6130). The fluid flows past window 6116, that has a laser beam path 6108. The fluid flows into the nozzle chamber that is parallel and coincident with the beam path 6108. The fluid may also flow into annular flow access chamber 6106, which flows in passages 6112, 6110 back to the laser beam path 6108. The laser beam 6114 following beam path 6108 is shown in FIG. 15B.

Figure 16A:
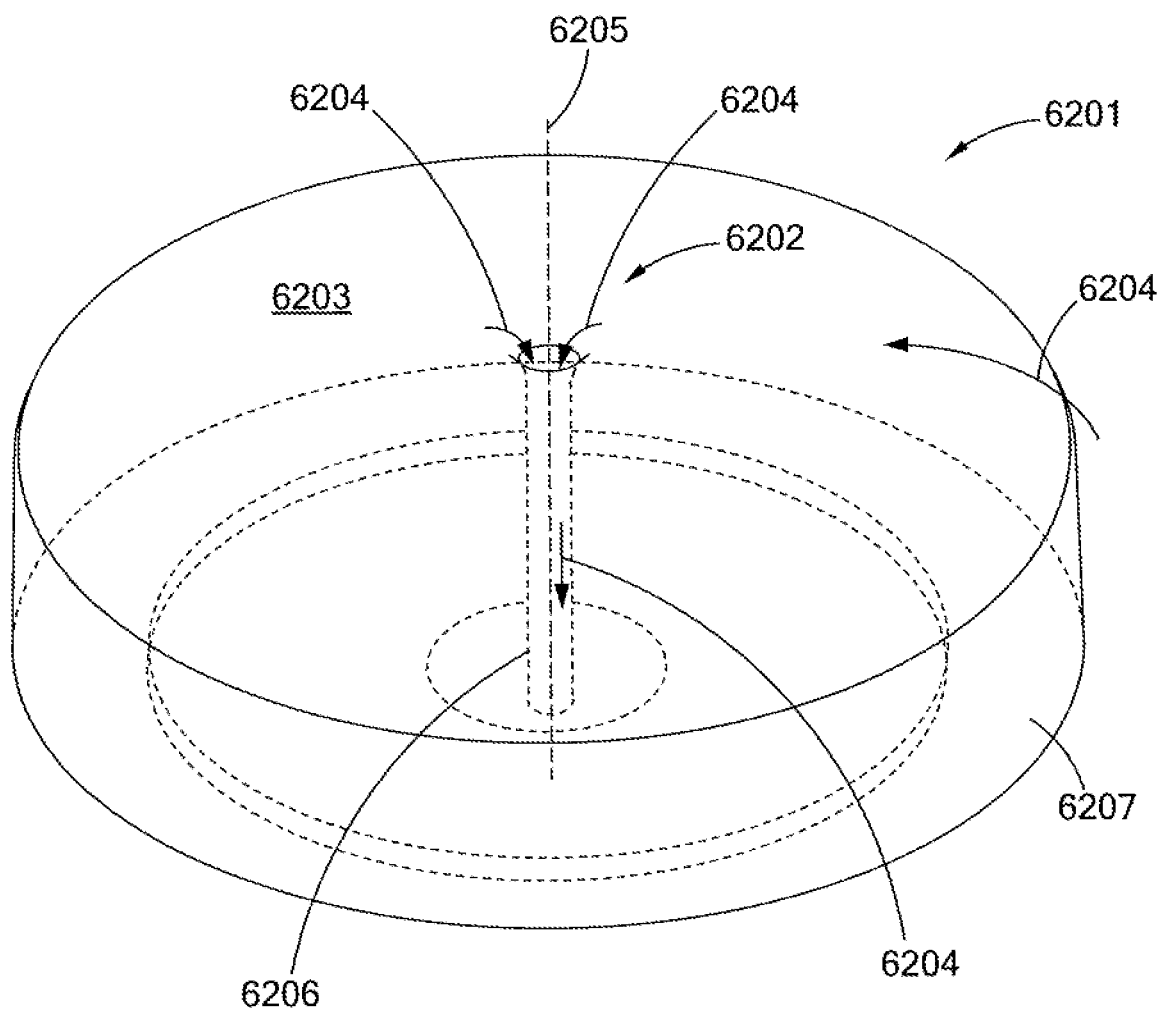
FIG. 16A is a perspective view of a laser nozzle assembly in accordance with the present invention.
Figure 16B:
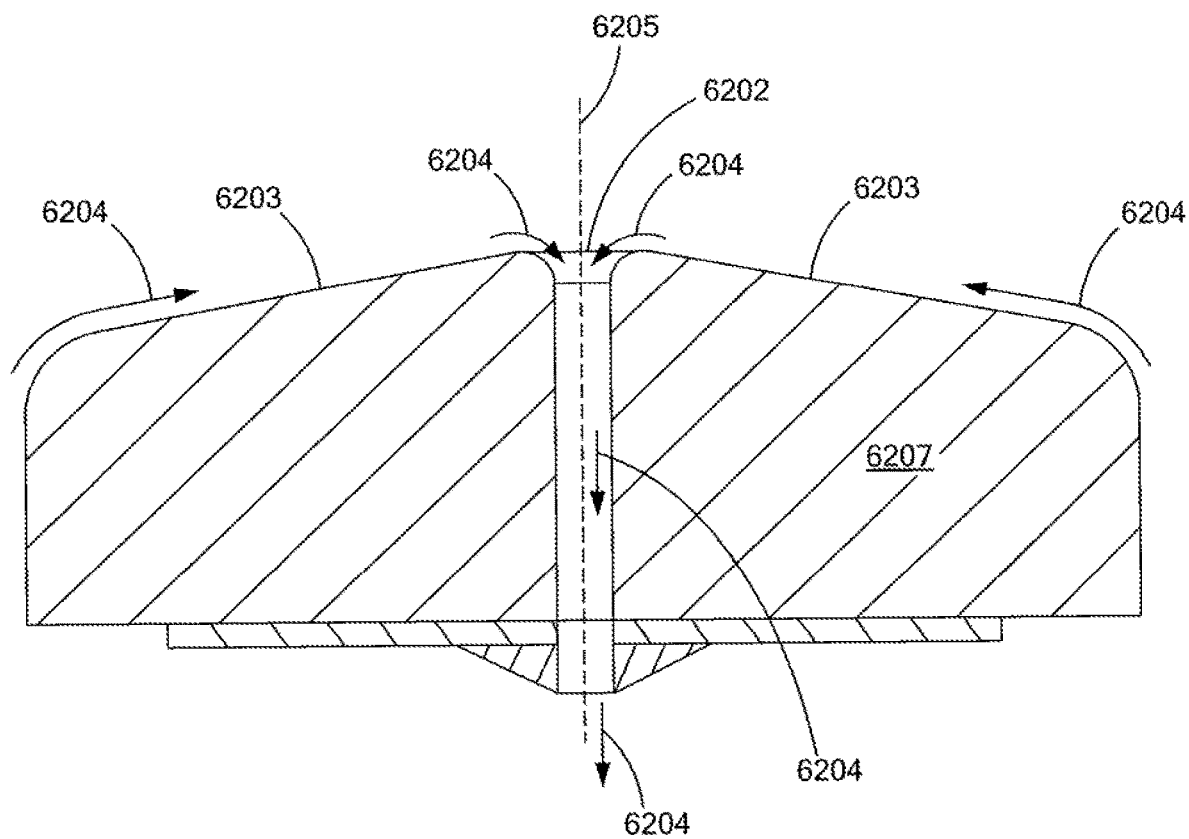
FIG. 16B is a cross sectional view of portions of the nozzle assembly of FIG. 16A.
Figure 16C:
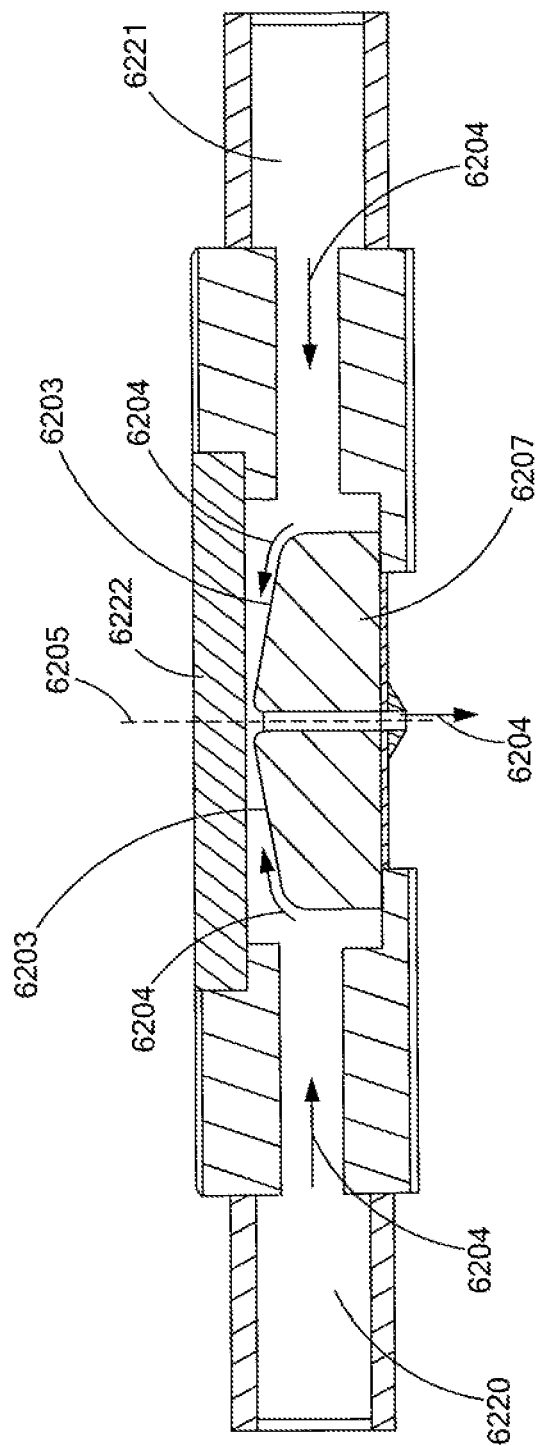
FIG. 16C is a cross sectional view of the nozzle assembly of FIG. 16C.

FIGS. 16A to 16C show a nozzle 6201 that has a body 6207 and a flow intake surface 6203. The fluid flow is shown by arrows 6204. The fluid flows along flow surface 6203 and into opening 6202 and tube 6206. The laser beam path 6205 travels through the opening 6202 and tube 6206. The nozzle 6201 is configured in a nozzle assembly having inlets 6220, 6221 and a window 6222.

Figure 17:
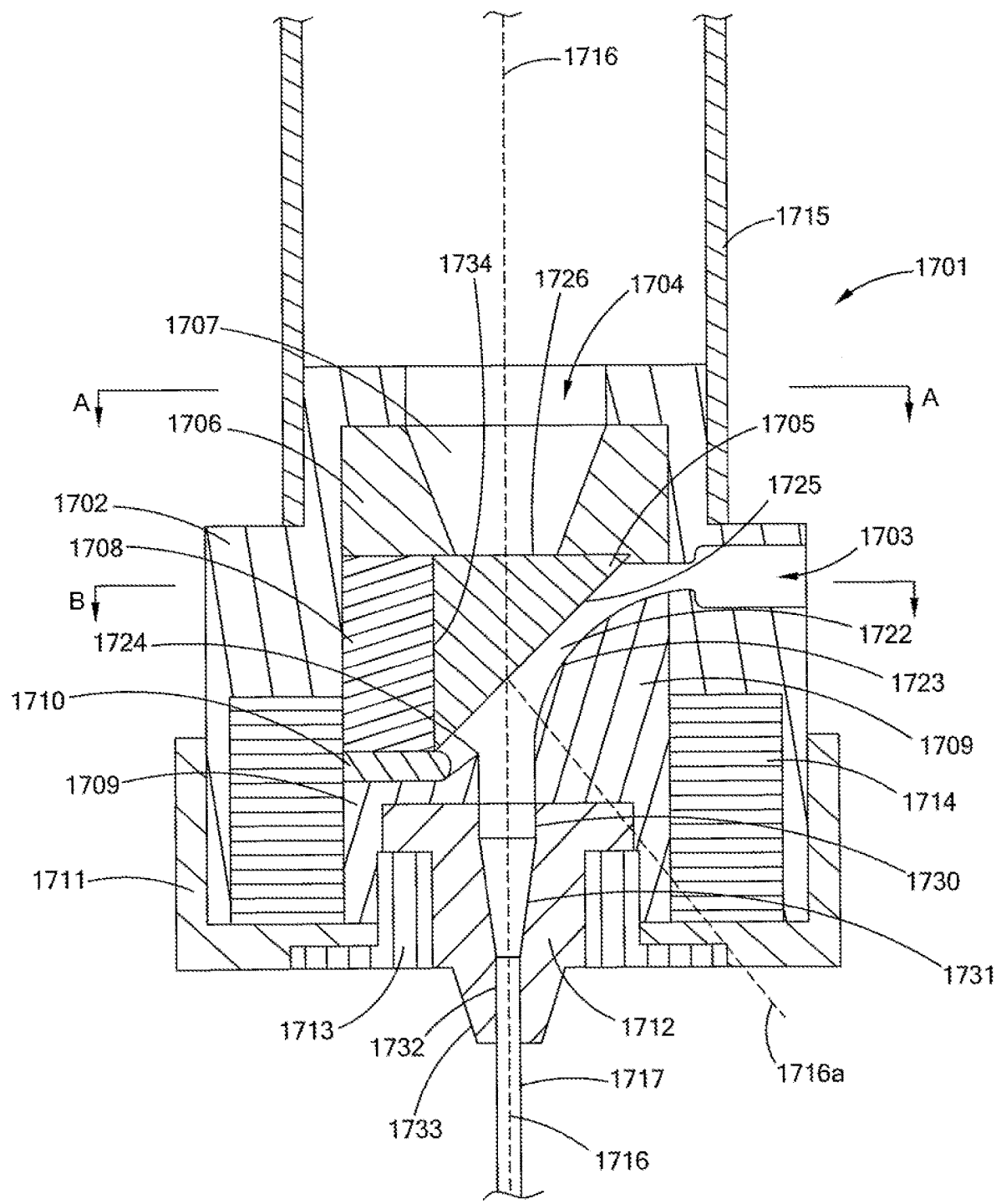
FIG. 17 is a cross sectional view of a laser cutting head in accordance with the present invention.
Figure 17A:
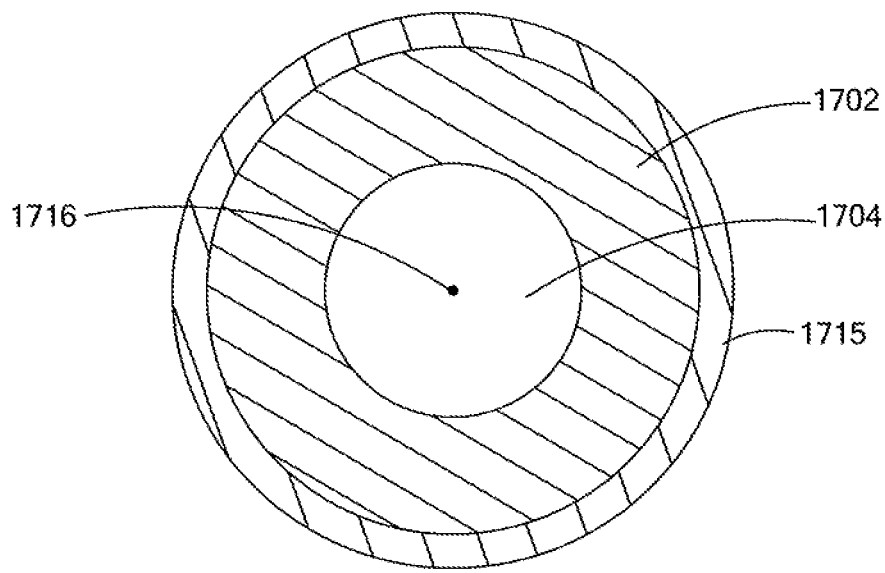
FIG. 17A is a cross sectional view of the embodiment of FIG. 17 taken along line A-A of FIG. 17.
Figure 17B:
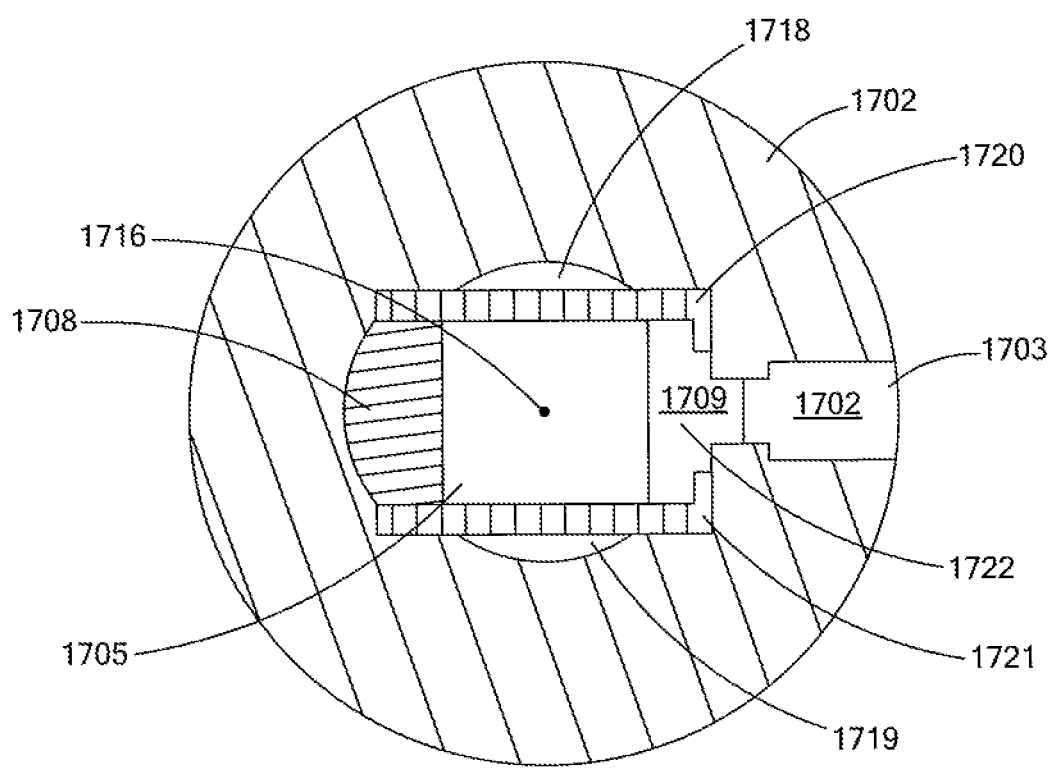
FIG. 17B is a cross sectional view of the embodiment of FIG. 17 taken along line B-B of FIG. 17.
Figure 17C:
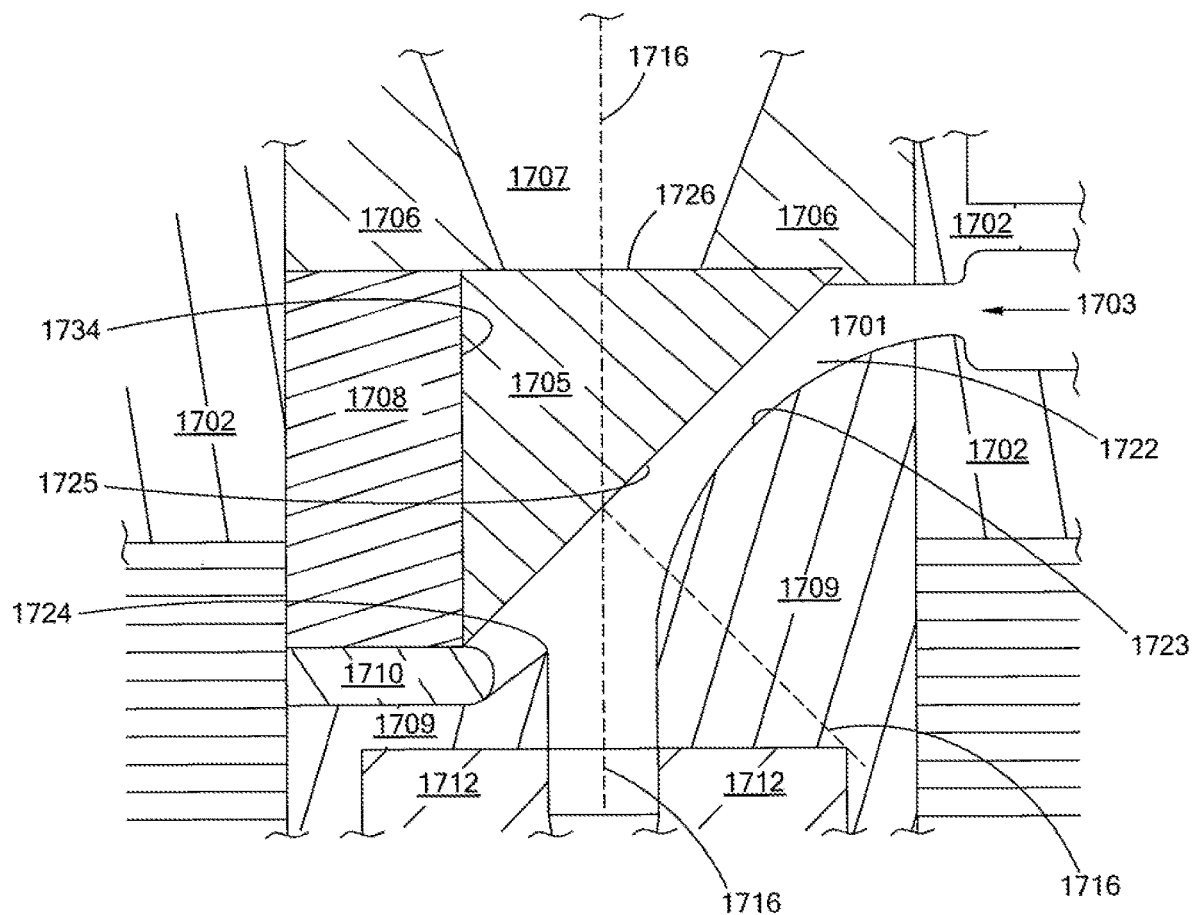
FIG. 17C is a cross sectional view of a section of the embodiment of FIG. 17.

An example of an embodiment of a nozzle configuration for providing a single liquid jet is provided in FIGS. 17, 17A, 17B, 17C and 170. FIGS. 17A and 17B are transverse cross sections of the embodiment of FIG. 17 taken along lines A-A and B-B respectively. FIG. 17C is an enlarged view of the prism and floe passage area of the laser head assembly of FIG. 17.

Turning to FIG. 17 there is shown a laser head assembly 1701 having a housing 1702. The housing 1702 has a fluid port 1703 for receiving a liquid to form the liquid jet 1717 and a laser beam path opening 1704 for receiving a laser beam. The laser beam path 1716 is shown through the laser head assembly 1701. Along the beam path 1716, within the housing 1702, there is a prism engagement member 1706, having a laser beam path opening 1707. The prism engagement member 1706 is located between the prism 1705 and an inner surface of the housing 1702. The prism 1705 is located within the laser beam path 1716 and has a beam entry face 1726 and a beam exit face 1725. A prism supporting and positioning member 1708 is located between the inner surface of the housing 1702 and the face 1734 of the prism, which face is not in the laser beam path 1716.

There is a flow path creating member 1709 that has a first curved surface 1723 and a second curved surface 1724. The exit face 1725 of the prism 1705 and the first curved surface 1723 and the second curved surface 1724 form a liquid flow chamber 1722. There is also a flow plug 1710 in the liquid flow chamber 1722. The flow plug 1710 may be removed providing for the recirculation of the liquid through recirculation ports 1718, 1719.

The laser head assembly 1701 at its bottom end has a bottom cap 1711 and a locking ring 1713. The locking ring 1713 engages the bottom cap 1711 and a nozzle 1712. The nozzle has an inner flow path having three sections, a first section 1730, a second tapered section 1713, and a third section 1732. The inner diameter of the first section 1730 may be, for example, two, three or more times larger than the inner diameter of the third section 1732. The length of the second section may be, for example from about the same as the diameter of the first section to about twice as long as the diameter of the first section, or longer. The size and shape of these sections depends upon factors such as the viscosity of the liquid and the intended pressures and flow volumes of the jet. Additionally, the profile of the laser beam is a consideration, as the beam should not contact the nozzle components or surfaces. Preferably the inner diameter third section 1732, which forms the aperture for the nozzle, is from about 400 microns to about 2000 microns, and preferably about 600 microns to about 1500 microns. The nozzle 1712 has a tip 1733 that extends beyond the bottom of the locking ring 1713.

Figure 17D:
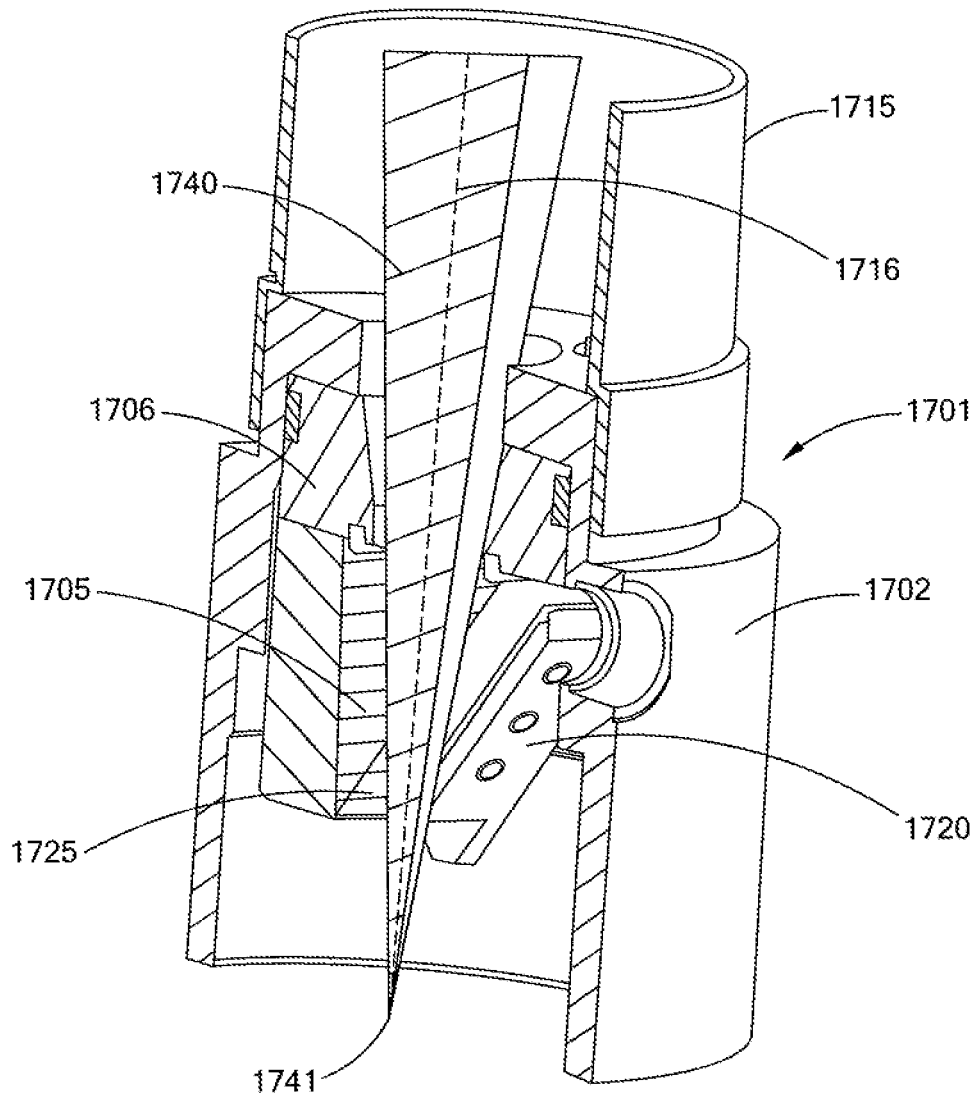
FIG. 17D is a cutaway cross sectional perspective view of the embodiment of FIG. 17.

Referring to FIG. 17D, there is provided a cross sectional perspective view of the laser head 1701, with its lower components (e.g., nozzle 1712, flow path creating member 1719, locking ring 1713 and cap 1711) removed and the laser beam 1740 traveling along beam path 1716 being shown.

In operation a liquid is pumped under pressure into flow port 1703. The liquid flows into flow chamber 1722 and from flow chamber 1722 into nozzle 1712. The liquid exits nozzle 1712 as a fluid jet. The laser beam is focused by optics not shown in the figures, and travels along beam path 1716 through opening 1704, opening 1706 and enters into prism 1705 through prism face 1726. The laser beam travels through prism 1705 and, if a liquid is not present, exits prism face 1725 along beam path 1716a. Beam path 1716a travels into and through the lower components of the laser head and if a high power laser beam traveled along that path 1716a it would damage those components. If a liquid having a predetermined index of refraction is present in the chamber 1722, the laser beam will stay on and follow beam path 1716 and enter into the liquid at face 1722 and travel into the nozzle 1712 and exit the nozzle 1712 within the liquid jet 1717.

In order for the laser beam to travel along the entirety of laser beam path 1716, and thus enter the nozzle, the indices of refraction of the liquid and of the prism must be matched. By matched it is meant that the indices are identical, essential the same, or within about + or −5% different and within about + or −10% different. Further, this difference should generally be small enough as to permit the laser beam to enter into the fluid without substantial reflections. To the extent that the indices are not identical the angle and position of the prism 1705 and in particular the angle of the face 1725 can be adjusted, such that any shifting of the beam path resulting from the index change as the beam travels from the prism to the fluid, will be compensated for; and thus, the beam path and beam will be directed into the nozzle and not contact any of the components of the laser head.

The configuration of face 1725, and surfaces 1723 and 1724 affect the flow characteristics of the liquid as it moves through the chamber 1722. Thus, it is preferable to have surfaces 1723 and 1724 curved and configured to avoid, or minimize, the formation of any vortices and stagnation zones that would be contacted by, or interact with, the laser beam as it travels through the liquid into the nozzle. Preferably, sharper corners on surfaces 1724, 1723 should be avoided. It is also preferable to configure face 1725 and surfaces 1723 and 1724 to provide the higher flow rates, and avoid stagnation zones, at the face 1725 of the prism 1705. This enables the laser beam to be at a higher power density at face 1725, without overheating, or damaging the liquid or the face 1725.

To the extent that thermal lensing issues may arise (thermal lensing in general is a phenomena where the index of refraction of a fluid, in this case the liquid, changes as its temperature changes, and thus changes the laser beam) they may be dealt with by making the internal surfaces of the chamber 1722 and the nozzle 1712 from highly reflective materials. In some instances these thermal lensing effects are desirable in that they enable the nozzle to more readily combine the laser beam and the fluid jet.

The laser beam 1740 is focused by optics not shown. The laser beam has a focal point 1741 along the beam path 1716. Preferably the focal point 1741 may be located within the second section of the nozzle 1731, or within the third section of the nozzle 1732.

The focal point, laser beam properties, laser beam power density at locations along the beam path, the configuration of the chamber 1722, the characteristics of the liquid, the flow rates and pressures of the liquid in operation, and other facts, such as the operating environmental conditions, should be considered and balanced in configuring this laser head. Thus, by way of example, for a 20 kW laser beam, being delivered to the laser tool from an optical fiber having a core diameter of about 400 to 1000 microns, for use in a borehole contain drilling mud at a pressure of 10,000 psi, the prism may be made from fused silica, Infrasil, Suprasil, sapphire, ZnS (Zinc Sulfide) and have an index of refraction of 1.45 for Suprasil, the angle of face 1725 with respect to face 1726 may be 45 degrees, the liquid may be a silicon oil having for example the properties as follows: viscosity at 25 C, cSt. from about 10 to 500; viscosity at 99 C, cSt. from about <5 to about 35; viscosity temperature coeff. from about 018 to 0.88; index of refraction from about 1.490 to 1.588; and molecular weights from about 350-2700. Commercially available silicon oils may be obtained from, for example Gelest, Inc., and would include PDM-1992, -5021, -0011, -0021, -0025, -5053, -7040, -7050.

Figure 18:
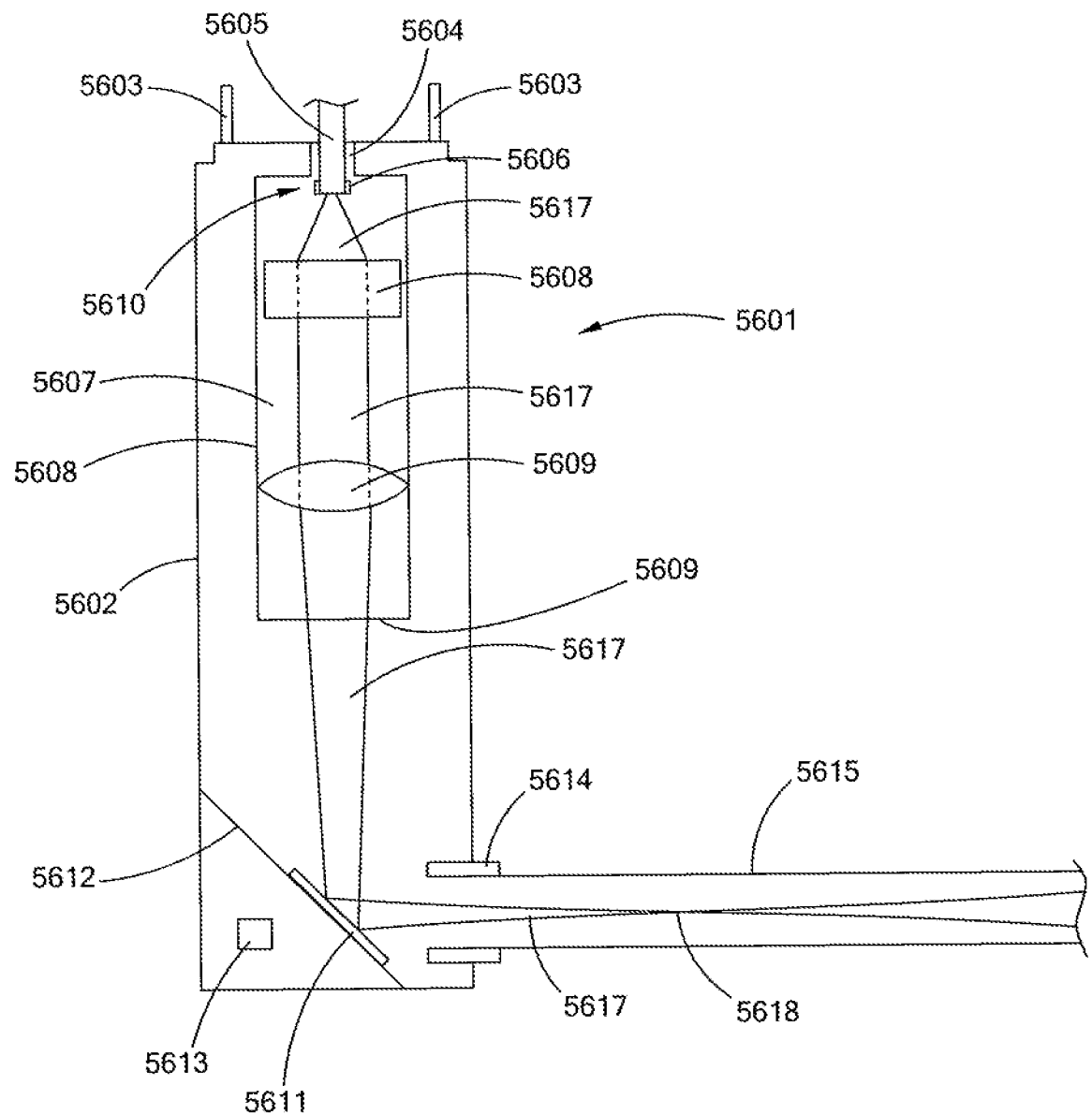
FIG. 18 is a schematic view of a laser jet assembly in accordance with the present invention.

Turning to FIG. 18, there is shown a general schematic of an embodiment of a gas jet laser tool. Thus, the laser tool 5601 having a housing 5602. The housing 5602 has a attachment structure 5603 for attaching to a conveyance structure (not shown) and an attachment structure 5604 for receiving a high power connector 5605 (or other structure for providing the high power laser beam). The connector has a back reflection protection annular cap 5606. Within the housing 5602 of the laser tool 5601 there is an optics assembly 5607. The optics assembly 5607 has a collimating lens 5608 and a focusing lens 5609. The components of the optics assembly, 5608, 5609 may be mounted to the housing 5602, by way of a mountings (not shown) that have openings or ports for permitting the gas flow to pass. The optics assembly 5607 may be contained within a housing 5608, which protects the optics and has a window 5609 and an opening 5610 for receiving the high power laser beam or the connector 5605.

The laser tool 5601 has a mirror 5611 that has a mount 5612. The mirror is reflective to the wavelength of the laser and transmissive to other wavelengths. Preferably, the mount 5612 does not have ports or openings to permit gas flow. A photoreceptor 5613 is located behind the mirror 5611 and in the line of sight through the mirror 5611 to the nozzle 5614. In this embodiment, the nozzle 5614 that extends beyond the body of the laser tool 5601.

The photoreceptor receives light that enters the nozzle 5614 and travels through the mirror 5611. The photoreceptor may transmit data, information or the received light to the surface or other location for the purpose of monitoring, observing, controlling, or analyzing the cutting process or the tool. The photoreceptor may be place on the housing 5602, so that it may recieve light without it having to pass through the nozzle and the mirror. In this way, the photoreceptor may monitor back reflections, or the absence of such reflections, from the work piece. Back reflections from the work piece may also be monitored through the mirror, provided that the mirror is sufficiently reflective of the wavelength to reflect the vast majority of the laser beam, and that the photoreceptor is able to detect the small amount of light at the laser beam wavelength that passed through the mirror.

In operation gas is flowed through the housing 5602 and out the nozzle 5614 to form a gas jet 5615. The laser beam 5617 is launched, e.g., propagated, from the connector 5606 into the components of the optics assembly 5607. The laser beam 5617 has a focal point 5618 that is removed from the tool, and may be several inches from the nozzle.

If the laser beam had a wavelength of 1070 nm and the optical fiber (not shown) in the connector 5605 has a core size of 600 μm the collimating lens 5608 may be a 150 mm lens and the focusing lens 5609 may be a 250 mm to a 1500 mm lens. The focal length may be adjustable (including downhole during cutting operations), fixed, fixedly adjustable (e.g., it can be changed and set in the field, but can not be change during cutting operations) and combinations and variations of these. In using the tool, preferably the tool is positioned a distance from the work surface (or vice versa) so that the focal point and the depth of field are located behind the surface of the work piece. For a complex work piece, such as for example, a cased borehole having cement behind the casing, the focal point and depth of field may preferably be located completely behind the casing, i.e., in the cement.

Figure 19:
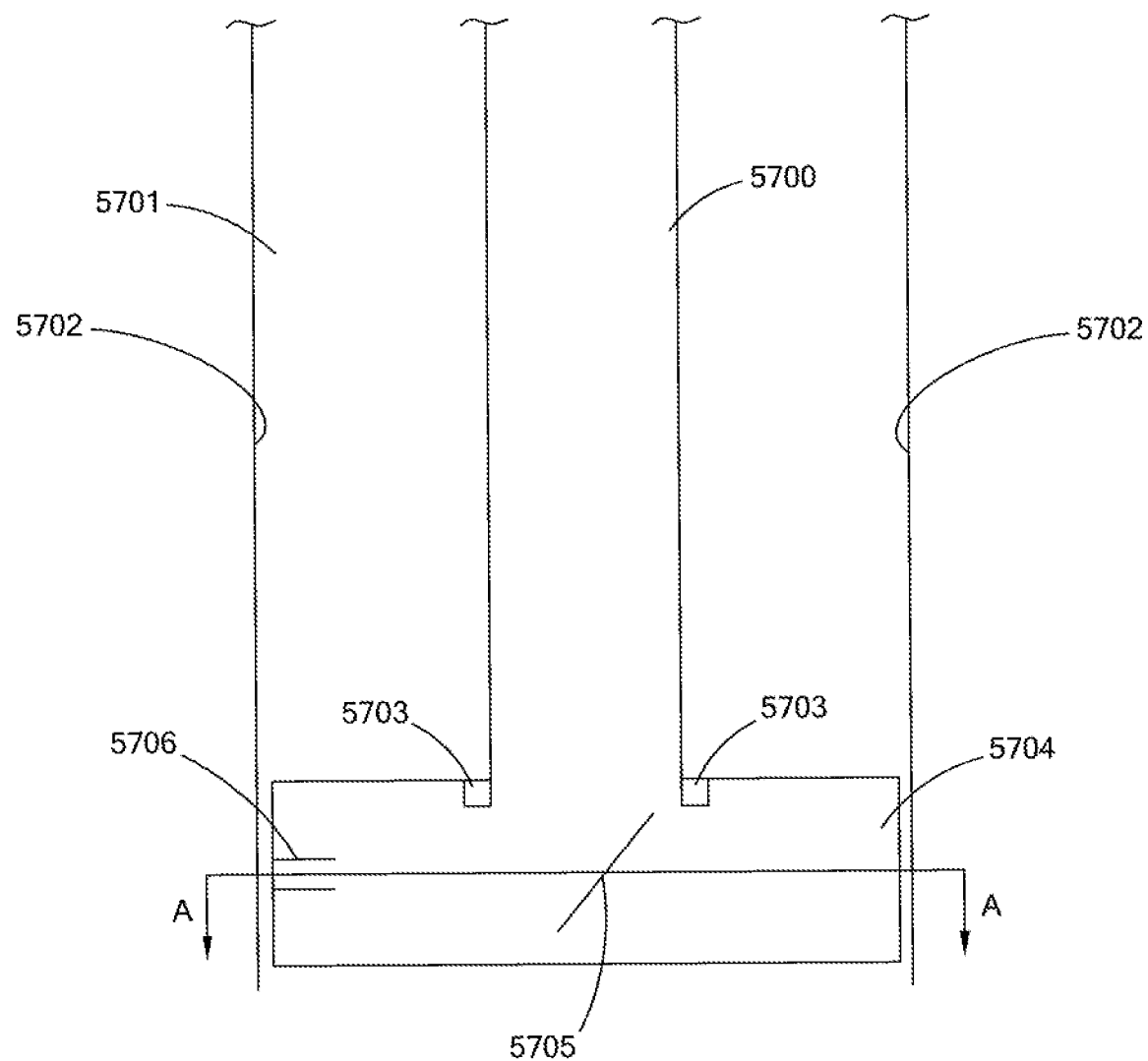
FIG. 19 is a schematic view of a laser cutting head in accordance with the present invention.
Figure 19A:
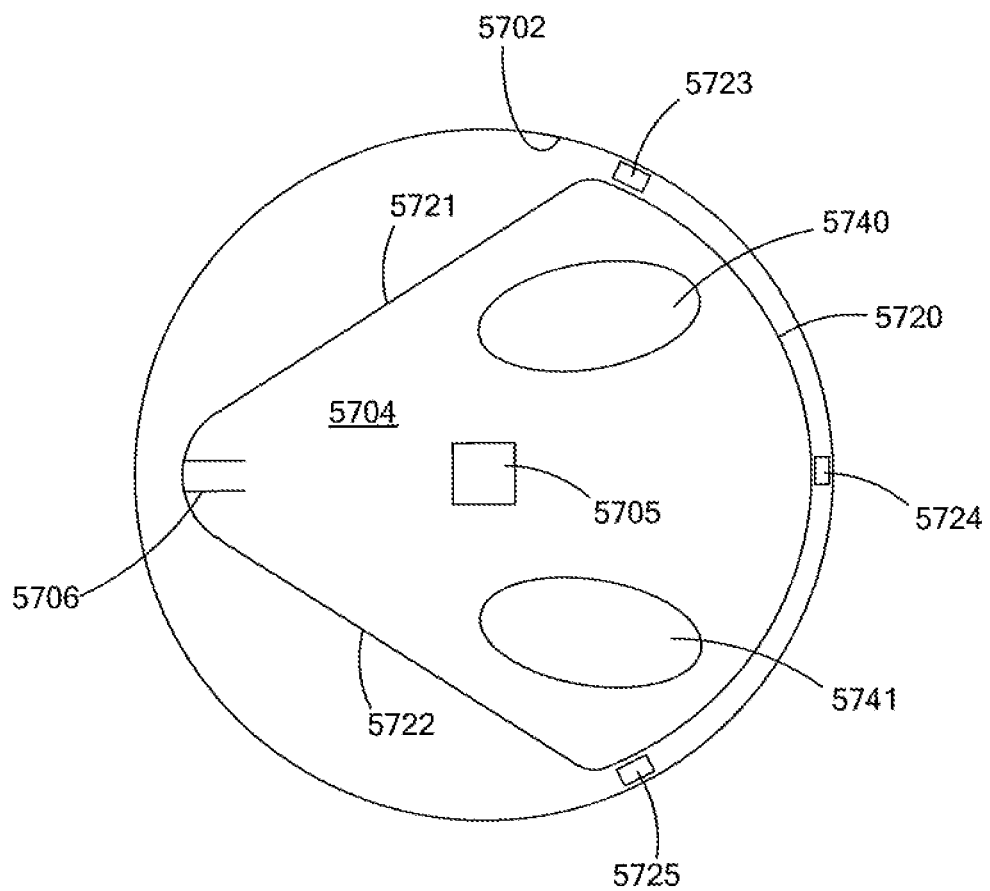
FIG. 19A is a cross sectional view of the embodiment of FIG. 19 taken along line A-A of FIG. 19.
Figure 20A:
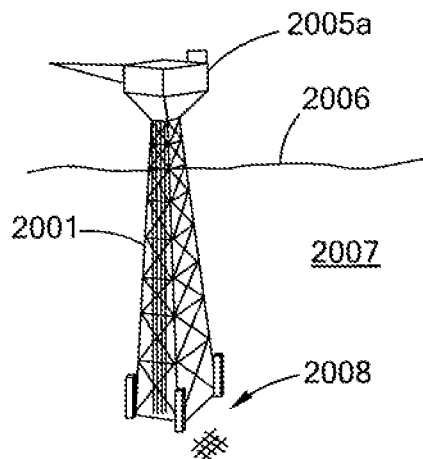
FIGS. 20A to 20C are illustrations of embodiments of offshore structures.
Figure 20B:
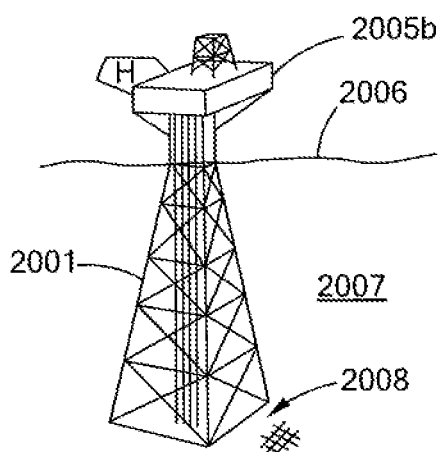
Figure 20C:
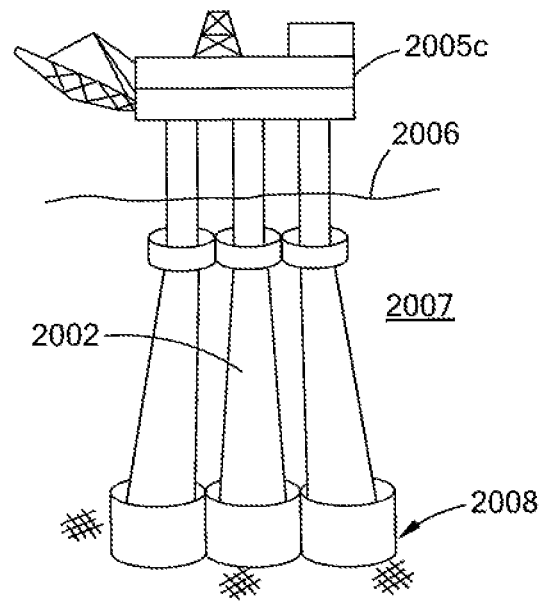

Referring now to FIGS. 19 and 19A there is provided a general schematic for an embodiment of a laser cutting head, which may be used with a laser fluid jet tool. The figures the embodiment is configured for use with a gas jet. Thus, there is a laser tool 5700 in a cased borehole 5701, having a sidewall 5702. The tool has a connection device 5703 for connecting the tool 5700 to a laser cutting head 5704. The laser cutting head has a mirror 5705, which may also be a focusing optic, and a nozzle 5706. The laser head 5704 is sized to fill substantially all of the boreholes diameter; and thus, position and maintain the nozzle in close relationship to the borehole sidewall 5702.

Turning to FIG. 19A, which is transverse cross sectional view along line A-A, of FIG. 19, the shape and position of laser head 5704 is seen with respect to the borehole sidewall 5702. The laser head is essentially triangular, with its base 5720 being arcuate, and its sides 5721, 5722 narrowing to the location of the nozzle 5706. The base 5720 has pads 5723, 5724, 5725 for engagement with the borehole sidewall 5702. In operation when the gas jet is shot from the nozzle, the reactive force will push the laser head 5704 back, such that pads 5723, 5724, and 5725 engage the borehole sidewall 5702. The laser beam would them be fired and the tool and the laser head rotated, or otherwise moved, to deliver a laser beam pattern to the sidewall. Openings 5740, 5741 are provided in the laser head 5704, if circulation was desired during the laser cutting operations.

In situations where it may be desirable to perform a radially limited complete cut, for example removal of an inner string of casing, while not cutting an outer string of cases, which outer string is cemented to the formation. If the casing is filled with brine or water, a wavelength for the laser may be selected such that the brine or water present has heavy absorption characteristics. In this manner the laser brine and water would attenuate the laser. The jet pressure may then be selected, in view of the attenuation, and other cutting conditions, e.g., pressure, to limit, or predetermine, the length of the jets travel into the casings to be cut, e.g., the reach of the jet from the tool is controlled and predetermined. The laser beam would then be dispersed at this predetermine location by the water or brine, in such a manner where the inner casing is completely severed and the outer casing is not cut or otherwise adversely effected by the laser beam. In this embodiment, it is preferable to have a centralizing device, or other apparatus to know the location of the tool within the casing and thus, have a reference point for determining the reach of the jet.

Optics and Optical Components

By way of example, the types of laser beams and sources for providing a high power laser beam may, by way of example, be the devices, systems, and beam shaping and delivery optics that are disclosed and taught in the following US patent applications and US patent application Publications: Publication No. US 2010/0044106, Publication No. US 2010/0044105, Publication No. US 2010/0044103, Publication No. US 2010/0044102, Publication No. US 2010/0215326, Publication No. 2012/0020631, Ser. No. 13/210,581; Ser. No. 13/403,132; Ser. No. 13/403,509; Ser. No. 13/486,795; and Ser. No. 61/493,174, the entire disclosures of each of which are incorporated herein by reference. The source for providing rotational movement, for example may be a string of drill pipe rotated by a top drive or rotary table, a down hole mud motor, a down hole turbine, a down hole electric motor, and, in particular, may be the systems and devices disclosed in the following US patent applications and US patent application Publications: Publication No. US 2010/0044106, Publication No. US 2010/0044104, Publication No. US 2010/0044103, Ser. No. 12/896,021, Ser. No. 61/446,042; Ser. No. 13/403,509; 13/403,287; and Ser. No. 13/211,729, the entire disclosures of each of which are incorporated herein by reference.

High Power Laser Cables, Umbilicals & Deployment Systems

By way of example, umbilicals, high powered optical cables, and deployment and retrieval systems for umbilical and cables, such as spools, optical slip rings, creels, and reels, as well as, related systems for deployment, use and retrieval, are disclosed and taught in the following US patent applications and patent application Publications: Publication No. 2010/0044104; Publication No. 2010/0044106; Publication No. 2010/0044103; Publication No. 2010/0215326; Publication No. 2012/0020631; Publication No, 2012/0074110; Ser. No. 61/605,401; Ser. No. 13/403,692; Ser. No. 13/403,723; and, Ser. No. 13/437,445, the entire disclosure of each of which is incorporated herein by reference, and which may preferably be used as in conjunction with, or as a part of, the present tools, devices, systems and methods and for laser removal of an offshore or other structure. Thus, the laser cable may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have conduits for the return of cut or waste materials; it may have other optical or metal fiber for the transmission of data and control information and signals; it may be any of the combinations set forth in the forgoing patents and combinations thereof.

In general, the optical cable, e.g., structure for transmitting high power laser energy from the system to a location where high power laser activity is to be performed by a high power laser tool, may, and preferably in some applications does, also serve as a conveyance device for the high power laser tool. The optical cable, e.g., conveyance device can range from a single optical fiber to a complex arrangement of fibers, support cables, armoring, shielding on other structures, depending upon such factors as the environmental conditions of use, tool requirements, tool function(s), power requirements, information and data gathering and transmitting requirements, etc.

Generally, the optical cable may be any type of line structure that has a high power optical fiber associated with it. As used herein the term line structure should be given its broadest construction, unless specifically stated otherwise, and would include without limitation, wireline, coiled tubing, logging cable, umbilical, cable structures used for completion, workover, drilling, seismic, sensing logging and subsea completion and other subsea activities, scale removal, wax removal, pipe cleaning, casing cleaning, cleaning of other tubulars, cables used for ROV control power and data transmission, lines structures made from steel, wire and composite materials such as carbon fiber, wire and mesh, line structures used for monitoring and evaluating pipeline and boreholes, and would include without limitation such structures as Power & Data Composite Coiled Tubing (PDT-COIL) and structures such as Smart Pipe®. The optical fiber configurations can be used in conjunction with, in association with, or as part of a line structure.

Generally, these optical cables may be very light. For example an optical fiber with a Teflon shield may weigh about ⅔ lb per 1000 ft, an optical fiber in a metal tube may weight about 2 lbs per 1000 ft, and other similar, yet more robust configurations may way as little as about 5 lbs or less, about 10 lbs or less, and about 100 lbs or less per 1,000 ft. Should weight not be a factor, and for very harsh, demanding and difficult uses or applications, the optical cables could weight substantially more.

By way of example, the conveyance device or umbilical for the laser tools transmits or conveys the laser energy and other materials that are needed to perform the operations. It may also be used to handle any waste or returns, by for example having a passage, conduit, or tube incorporated therein or associated therewith, for carrying or transporting the waste or returns to a predetermined location, such as for example to the surface, to a location within the structure, tubular or borehole, to a holding tank on the surface, to a system for further processing, and combinations and variations of these. Although shown as a single cable multiple cables could be used. Thus, for example, in the case of a laser tool employing a compound fluid laser jet the conveyance device could include a high power optical fiber, a first line for the core jet fluid and a second line for the annular jet fluid. These lines could be combined into a single cable or they may be kept separate. Additionally, for example, if a laser cutter employing an oxygen jet is utilized, the cutter would need a high power optical fiber and an oxygen, air or nitrogen line. These lines could be combined into a single tether or they may be kept separate as multiple tethers. The lines and optical fibers should be covered in flexible protective coverings or outer sheaths to protect them from fluids, the work environment, and the movement of the laser tool to a specific work location, for example through a pipeline or down an oil, gas or geothermal well, while at the same time remaining flexible enough to accommodate turns, bends, or other structures and configurations that may be encountered during such travel.

By way of example, one or more high power optical fibers, as well as, lower power optical fibers may be used or contained in a single cable that connects the tool to the laser system, this connecting cable could also be referred to herein as a tether, an umbilical, wire line, or a line structure. The optical fibers may be very thin on the order of hundreds e.g., about greater than 100, of µm (microns). These high power optical fibers have the capability to transmit high power laser energy having many kW of power (e.g., 5 kW, 10 kW, 20 kW, 50 kW or more) over many thousands of feet. The high power optical fiber further provides the ability, in a single fiber, although multiple fibers may also be employed, to convey high power laser energy to the tool, convey control signals to the tool, and convey back from the tool control information and data (including video data) and cut verification, e.g., that the cut is complete. In this manner the high power optical fiber has the ability to perform, in a single very thin, less than for example 1000 µM diameter fiber, the functions of transmitting high power laser energy for activities to the tool, transmitting and receiving control information with the tool and transmitting from the tool data and other information (data could also be transmitted down the optical cable to the tool). As used herein the term "control information" is to be given its broadest meaning possible and would include all types of communication to and from the laser tool, system or equipment.

Generally, it is preferred that when cutting and removing large structures, such as, e.g., multi-string caissons, jackets, piles, and multi-string conductors, requires that after the cut is performed, that the completeness of cut be verified before a heavy lift ship is positioned and attached for the lift, e.g., hooked up, to remove the sectioned portion. If the cut is not complete, and thus, the sectioned portion is still attached to the rest of the structure, the lift ship will not be able to lift and remove the sectioned portion from the structure. Heavy lifting vessels, e.g., heavy lift ships, can have day rates of hundreds-of-thousands of dollars. Thus, if a cut is not complete, the heavy lift ship will have to be unhooked and kept on station while the cutting tool is repositioned to complete the cut and then the heavy lift ship is moved back in and re-hooked up to remove the sectioned portion. During the addition time period for unhooking, completing the cut and re-hooking, the high day rate is being incurred. Additionally, there are safety issues that may arise if a lift cannot be made because of an incomplete cut. Therefore, with a laser cut, as well as with conventional cutting technology it is important to verify the completeness of the cut. Preferably, this verification can be done passively, e.g., not requiring a mechanical probing, or a test lift. More preferably the passive verification is done in real-time, as the cut is being made.

In the laser cutting process, a high power laser beam is directed at and through the material to be cut with a high pressure fluid, e.g., gas, jet for, among other things, clearing debris from the laser beam path. The laser beam may generally be propagated by a long focal length optical system, with the focus either midway through the material or structure to be cut, or at the exit of the outer surface of that material or structure. When the focus is located midway through the material or structure, there is a waist in the hole that the laser forms in that material or structure, which replicates the focal point of the laser. This waist may make it difficult to observe the cut beyond this point because the waist can be quite small. The waist may also be located in addition to midway through, at other positions or points along the cut line, or cut through the material.

A laser radar system using a near diffraction limited diode laser source or q-switched laser can be aligned to be co-linear with the high energy laser beam and it can be used to probe the cut zone and provide passive, real-time monitoring and cut verification. A near-diffraction limited sourced for the laser radar system is preferred, but not essential, because it can create a laser beam that is significantly smaller in diameter than the high power laser beam and as a consequence can probe the entire length of the cut without interference. Although the laser radar laser beam is preferably coaxial with the cutting laser beam, it may also be scanned or delivered on a separate beam path. The laser radar laser beam may also be bigger in diameter than the high energy laser beam to, for example, image the entire cut. The signal that is reflected from the cut zone is analyzed with a multi-channel analyzer, which tracks how many hits are obtained at a specific range and velocity. Any signal returns that indicate a near zero velocity, or a velocity consistent with the penetration rate of the high power laser, will be either the grout or steel surface to be cut. High velocity returns will correspond to the debris being stirred up by the high pressure jet and negative velocities will be the inflow of fluid from the penetration zone.

The laser radar will have a laser source, a very narrow-band filter, a high speed pulse power supply, a high speed detector, a timer, a counter and a multi-channel analyzer system. A multi-channel analyzer system is not essential, but is preferred and provides a convenient means to sort the data into useful information. The laser radar can be a laser source that is a significantly different wavelength than the high power laser ranging from the visible to the infrared wavelengths. As long as the radar laser wavelength is sufficiently outside of the high power laser spectrum band, then the laser radar signal can be isolated with a high quality narrow band-pass filter of 1 nm in width or less. If a laser diode is used as the source, the laser diode will be stabilized in wavelength by an external grating, etalon or dispersive element in the cavity. Bragg Gratings have shown that ability to stabilize a laser diode to 1 pico-meter, significantly more stable than needed for this application.

The laser radar can operate in, for example, two modes: 1) time of flight and 2) phase delay in a pseudo-random continuous modulation format. The laser radar can determine the velocity of the return using, for example, one of two methods: 1) the difference between two consecutive distance measurements divided by the time delay between the two measurements, or 2) a Doppler frequency shift caused by the particle moving either away or toward the observer. The post processing of the raw data can be used to determine if the laser radar is measuring the advancement of the laser cutting zone, the inflow of external mud or the outflow of debris and gas.

The laser radar could also be employed in a liquid jet based design. However, the time of flight is now a strong function of the refractive index of the fluid, which changes with pressure and temperature. Therefore, these characteristics of the liquid media being used during the cutting process should be understood and addressed in the design of the laser radar system for a liquid laser jet cut.

It may also be possible to use cameras and spectrometers to image the exit of the cut once the laser has penetrated the outer casing. Similarly, X-ray Fluorescence, eddy current detectors, Optical Coherence Tomography, and ultra sound as potential solutions, may also be used for real-time and real-time passive cut verification, however, for these approaches the solid angle represents a more significant issue than for the laser radar system, making that system preferable. Further, these systems are, or may be, more complex than the laser radar system, which may make them more difficult to integrate and harden for down-hole deployment and use.

Although not specifically shown in the embodiment of the figures and examples, break detection and back reflection monitory devices and systems may be utilized with, or integrated into the present tools, umbilicals, optical cables, deployment and retrieval systems and combinations and variation so these. Examples of such break detection and variation and monitoring devices, systems and methods are taught and disclosed in the following US patent application: Ser. No. 13/486,795, Publication No. 2012/00074110; Ser. No. 61/446,407; and Ser. No. 13/403,723, and US Patent Application Publication No. 2010/0044106, the entire disclosures of each of which are incorporated herein by reference.

By way of example, the flexible support cables for the laser cutters, heads and tools provide the laser energy and other materials that are needed to perform the cutting operation. Although shown as a single cable for each laser cutter, multiple cables could be used. Thus, for example, in the case of a laser cutter employing a compound fluid laser jet the flexible support cable would include a high power optical fiber, a first line for the core jet fluid and a second line for the annular jet fluid. These lines could be combined into a single cable or they may be kept separate. Additionally, for example, if a laser cutter employing a nitrogen jet is utilized, the cutter would need a high power optical fiber and a nitrogen line. These lines could be combined into a single cable or they may be kept separate as multiple cables. The lines and optical fibers should be covered in flexible protective coverings or outer sheaths to protect them from riser fluids, the subsea environment, and the movement of the laser cutters, while at the same time remaining flexible enough to accommodate the orbital movement of the laser cutters. As the support cables near the feed-through assembly their flexibility may decrease and more rigid means to protect them can be employed. For example, the optical fiber may be placed in a metal tube. The conduit that leaves the feet through assembly adds additional protection to the support cables, during assembly of the laser module and the riser, handling of the riser or module, deployment of the riser, and from the subsea environmental conditions.

High Power Lasers

By way of example, the laser systems of the present invention may utilize a single high power laser, or they may have two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 5 kW, 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1083 nm, about 1360 nm, about 1455 nm, 1490 nm, or about 1550 nm, or about 1900 nm (wavelengths in the range of 1900 nm may be provided by Thulium lasers). Thus, by way of example, the present tools, systems and procedures may be utilized in a system that is contemplated to use four, five, or six, 20 kW lasers to provide a laser beam in a laser tool assembly having a power greater than about 60 kW, greater than about 70 kW, greater than about 80 kW, greater than about 90 kW and greater than about 100 kW. One laser may also be envisioned to provide these higher laser powers. Examples of preferred lasers, and in particular solid-state lasers, such as fibers lasers, are disclosed and taught in the following US patent applications and US patent application Publications: Publication No. US 2010/0044106, Publication No. US 2010/0044105, Publication No. US 2010/0044103, Publication No. US 2010/0044102, Publication No. US 2010/0215326, Publication No. 2012/0020631, Ser. No. 13/210,581, and Ser. No. 61/493,174, the entire disclosures of each of which are incorporated herein by reference. Additionally, a self-contained battery operated laser system may be used. This system may further have its own compressed gas tanks, and be submergible, and may also be a part of, associated with, or incorporation with, an ROV, or other sub-sea tethered or free operating device.

EXAMPLES

The following examples are provide to illustrate various devices, tools, configurations and activities that may be performed using the high power laser tools, devices and system of the present inventions. These example are for illustrative purposes, and should not be view as, and do not otherwise limit the scope of the present inventions.

Example 1

Biologic growth on a subsea structure can add considerable weight to that structure making it more difficult and costly to remove. Thus, a high power pulsed laser may be used to remove such biological growth from the structure before it is cut, or before it is lifted above the surface of the water. For example, a laser tool may be moved along the members of the structure by for example an ROV, or the laser tool may be positioned just below the surface of the water so that the biological material can be removed as the member is lifted from the water. In this manner, the hoisting device will have buoyancy of the water to assist in the lifting of the member below the surface of the body of water (which could a considerable distance) but not be burdened with this extra weight when as the member is removed from the water. Additionally, the cleaning of the sub-sea removed objects in many cases is a regulatory requirement. For example, in the California, there may be a requirement to utilize divers with high pressure washer to clean the legs to ~100 feet, with the remainder of the removed components cleaned above water before disposal. Using a laser system provides the ability to clean the structure top to bottom, complying with all requirements, providing an enhanced environmentally safe removal, as well as, potentially lessening the weight which in turn provides for the use of scaled down or smaller surface equipment. Additionally, the laser cleaning of structures may be used for structures, vessels, and equipment in active use not scheduled or intended to be removed or decommissioned, And, may do so in a manner that does not appreciably weaken, or adversely effect the underlying metal, or other structural materials being cleaned.

For example, a typical pulsed laser may be a semiconductor laser or a fiber laser operating in a pulsed mode. A typical pulse characteristic, for example, may be a 5 kHz modulation rate with a 10%-50% duty cycle.

Example 2

Figure 11:
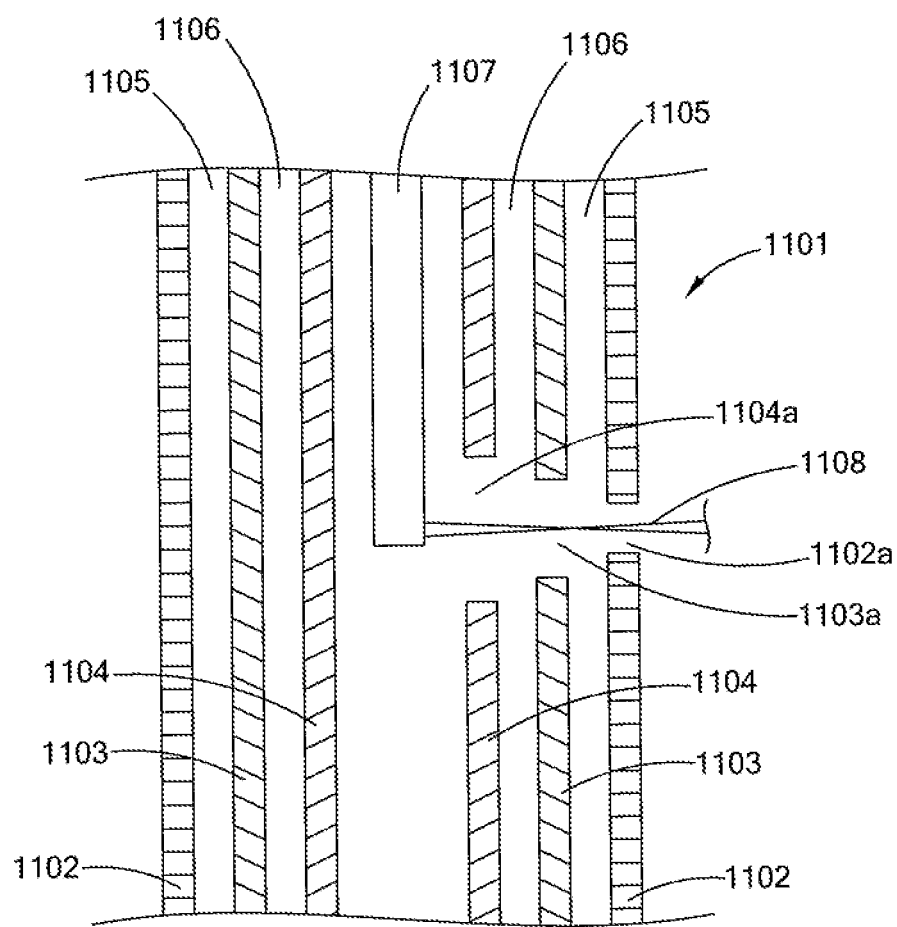
FIG. 11 is a cross sectional view of a laser cutting tool and process in accordance with the present invention.

In this example, there is provided a method of cutting through a conductor having multiple tubulars and annular areas. Thus, turning to FIG. 11 there is shown a configuration of tubulars 1101, having a conductor 1102, a first annulus 1105, an inner casing 1103, a second annulus 1106 and an internal casing 1104. The annuli 1105, 1106 may be open space, contain cement, a drilling fluid, or combinations and variations of these. The laser cutting tool 1107, has a gas jet laser cutting head of the type for example of the embodiment shown in FIG. 12, which directs a laser beam and gas jet along path 1108. The internal casing 1104 is cut using two, three, four or more passes of the laser to create an area of removed material 1104a. (Only the beginning of the cuts are shown in FIG. 11, it being understood that each of these cuts would preferably extend around the circumference of the casing and thus the removed material would be a ring) The inner casing 1103 is cut using fewer passes of the laser to create a smaller area of removal 1103a, The conductor is then cut using fewer passes, or preferably a single pass, to create a smaller area of removal 1102a. In this manner, the surface effects, which may be detrimental to the integrity of the jet, that are caused by the edges of the tubular boarding an area of removal will be avoided, because each successive tubular has a narrow cut. This stepped method of cutting may preferably be utilized for a gas jet when the annular areas are open space, and may also be utilized when the annular areas are filled, e.g., contain other materials, such as cement.

Example 3

In this example a laser removal system may be used to assist in the plugging abandonment and decommission of a subsea field. The field is associated with a floating spar platform. Two mobile containers are transported to the spar platform, containing a laser module, and a work container have laser cutting tools, devices, umbilicals and other support materials. The laser module obtains its power from the spar platform's power generators or supplied power generation. The laser cutting tools are lowered by the spars hoisting equipment, to the seafloor, where they are lowered into a first well that has been plugged, the laser tool directs a high power laser beam, having about 10 kW of power, in an air jet, around the interior of the well. The laser beam and jet in a single pass severs all of the tubulars in the well at about 15 feet below the mud line. This process is repeated for the remaining wells in the field that are to be abandoned.

Example 4

In this example a laser system may be used to repair conductors in an offshore platform. The platform is a fixed jacket-pile type structure located in 500 feet of water. The platform has 50 conductors extending from the platform deck to, and into the seafloor. 20 of those conductors are damaged by a storm. The laser cutting tool is positioned around the exterior of each conductor and the damaged sections is cut and removed. In may be severed and pulled, or may be severed at the top and bottom and axially cut (e.g., split along its side). The angle of the beam path may be such that a predetermined edge is made on the end of the remaining connector section to facilitate the placement and securing of a new section of connector. The high power laser may also be used to weld these sections in place.

Example 5

A laser removal system may be used to recover 15,000 feet of 3½" and 4½" tubing from a total of six wells. The laser removal system is used in conjunction with and interfaces with the existing platform and hoisting equipment. As the tubing is pulled it is quickly cut in to lengths of 30 to 35 feet, by a laser cutting device on the platform's floor. This avoids the use and associated cost of a separate rig and could allow for the reuse of tubulars in future projects.

Example 6

A laser decommissioning vessel may be used to remove a subsea 30" multi-string casing stub that is covered with debris (sand bags) and is wedged and bent against an operating pipeline and is located at a depth of 350 feet. The inner casing string, 13¾", in the multi-string stub is jammed with an unknown material starting at about 1 foot below the sea floor that could not be removed by jetting. All strings of casing in the multi-string stub are fully cemented. A laser removal system and tool is used to remove this stub without the need for dredging. A laser tool having two beam paths, a boring beam path and a severing beam path, is used to first bore through the jammed material in the inner casing string. This provides access for the tool down to 18 feet below the sea floor. The tool then severs the multi-string stub in 3-foot sections, until the stub is removed to 15 feet below the sea floor. The smaller, 3 foot sections are used to accommodate the use of a smaller and less expensive hoisting equipment. Additionally, because the structural integrity of the stub is unknown multiple smaller sections are lifted instead of a single 15-foot section.

Example 7

A laser decommissioning vessel may be used to assist in the removal of a jacket and deck platform structure in 130 feet of water, having four vertical support members. Two of the vertical support members are large diameter caisson legs, which functioned as floatation devices for transport of the jacket to the offshore location. The other two vertical support members have smaller caisson at their base. Piles are driven through sleeves in all four caissons anchoring the structure to the sea floor. Horizontal and tie members are also present between the vertical support members. After the decks are removed, and while the structure is being supported by a crane, a laser cutting tool is lowered into a large casing and the casing is cut at a predetermined point using an inside-to-outside laser cutting method. This step is then repeated for the other large casing. The smaller vertical members are then cut using a tool for example of the type shown in the embodiment of FIG. 7 and with an outside-to-inside laser cut. Any interfering tie or horizontal members are also cut. The section is then lifted from the sea and placed on the deck of the decommissioning vessel. The removed section is then cut into smaller sections and feed into the laser shop where is it reduced to sections that are no more than 4 feet in length. In the laser shop, or before lifting from the sea, biologic growth may also be removed. This process is repeated until the entire structure above the sea floor is removed, and reduced to 4-foot sections of clean scrap. (Depending upon the capabilities of and price being offered by scrap dealers different lengths of the scrap may be utilized) The earth around the piles is then dredge to a depth of 6 feet and the piles are severed at 5 feet below the sea floor using the tool of FIG. 7.

Example 8

A laser removal system may be used to remove support cables and pipelines that are positioned along the sea floor from the shoreline to an offshore platform. These support structures could include electrical lines, water lines and lines for transporting hydrocarbons to shore. Because of the rapid and reliable manner in which the laser cutting tools can cut these structures, they can be cut into smaller sections that are more readily, easily and economically removed from the sea floor.

Example 9

A heavy lifting vessel having for example a crane with a lifting capacity in excess of 500 tons is stationed by a fixed platform in 1,000 feet of water. The heavy lifting vessel is used to remove the deck and top structures of the platform. Upon removal of these structures the heavy lifting vessel is no longer needed and leaves the site. As the heavy lifting vessel leaves the site, a smaller laser cutting system is stationed at the site. The laser cutting system provides the ability to make safe, easy, predetermined cuts, and thus to cut the jacket into small, manageable pieces, which can be removed without the need for the heavy lifting vessel. In this manner the laser removal system and method allows for systematic removal of the jacket in smaller, easily handled pieced, starting from the top, and moving down.

Example 10

Figure 21:
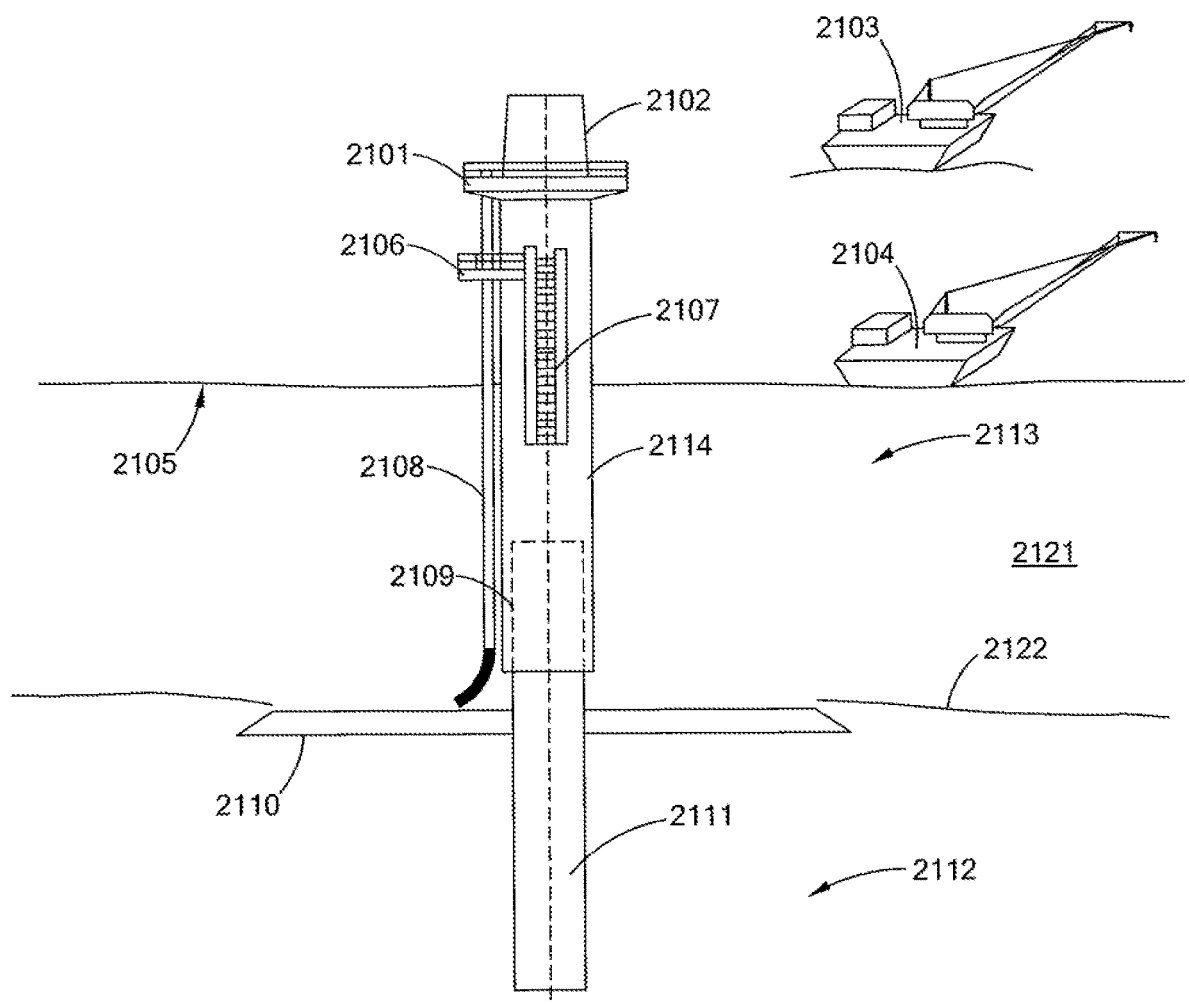
FIG. 21 is a schematic of an embodiment of a monopile structure and associated laser decommissioning system in accordance with the present invention.

Turning to FIG. 21, there is shown a schematic of an example of a monopile structure and associated foundation with a laser decommissioning vessel and a support vessel on station. Thus, the monopole has a tower 2102, having a work platform 2101, an intermediate platform 2106 and a boat landing 2107 are above the surface 2105 of a body of water 2121. The tower 2102 extends over a monopile 2111, which extends through a scour protection member 2110, into and below the seabed 2112. Thus, the tower 2102 extends from within the body of water 2121 to above the surface 2105 of the body of water 2121. The structure may be viewed as having several sections or areas: a substructure area shown by arrow 2113, a foundation area shown by arrow 2112, and a transition area 2114. There is also a grout area 2109 where the tower 2102 is grouted to the monopile 2111. The structure also has an external J tube 2108. Although one support vessel 2103 and one laser decommission vessel 2104 are shown, it should be understood that they may be a single vessel or other vessels or types of vessels, in addition to the two that are shown in the figure. The wells are first plugged as required by regulations for the particular area. The conductors, production pipe and other tubulars within the monopile 2111 and tower 2102 are cut with a laser tool. For example the laser tool of the embodiment of FIG. 34 would cut the conductors internal to external at 15 feet below the mudline. Following the removal of the all internal and external components of the monopile, the topside of the work platform 2101, and the tower 2102, down to below the subsea transition 2114 would be removed via a laser tool of for example the embodiment of FIG. 18 or FIG. 30. The upper section now being removed allows for clear diver access to remove the subsea internal centralizer (not shown) as well as clear access to have the mud plug jetted from the pile down to 15 to 20 feet below the seafloor. Upon clear access down to 15 feet below the seafloor a laser tool of the embodiment of FIG. 18 or FIG. 30 would cut the monopile internal to external. Outside in laser cutting may also be performed, for example if obstructions prevented a tool from accessing the monopile internally and it was determined for some reason that this obstruction would not be removed with a differently configured laser tool, for example having a forward propagating beam path as shown in the embodiment of FIG. 3. For the internal cut a fluid, and preferable one that is transmissive to, or substantially transmissive to the laser, such as water, salt water, mineral oil, or diesel, may be jetted and pumped from the inside of the monopile to a sufficient amount, level to provide access to the intended laser cut area. For the external cut the material around the monopile may be dredge out to provide access for the laser cutting tool, or a tool that is capable of being forced through the mud may be used. The transition section may also be cut with the laser tool and removed in one or more sections, or if the transition piece is grouted or otherwise affixed to the monopile the assembly may be removed with one lift. One of the advantages of the laser plugging and abandonment procedure is the ability to have predetermined and precise and efficient sectioning of large sections of these structures to smaller more easily, and cost effectively, handled sections.

Example 11

Figure 22:
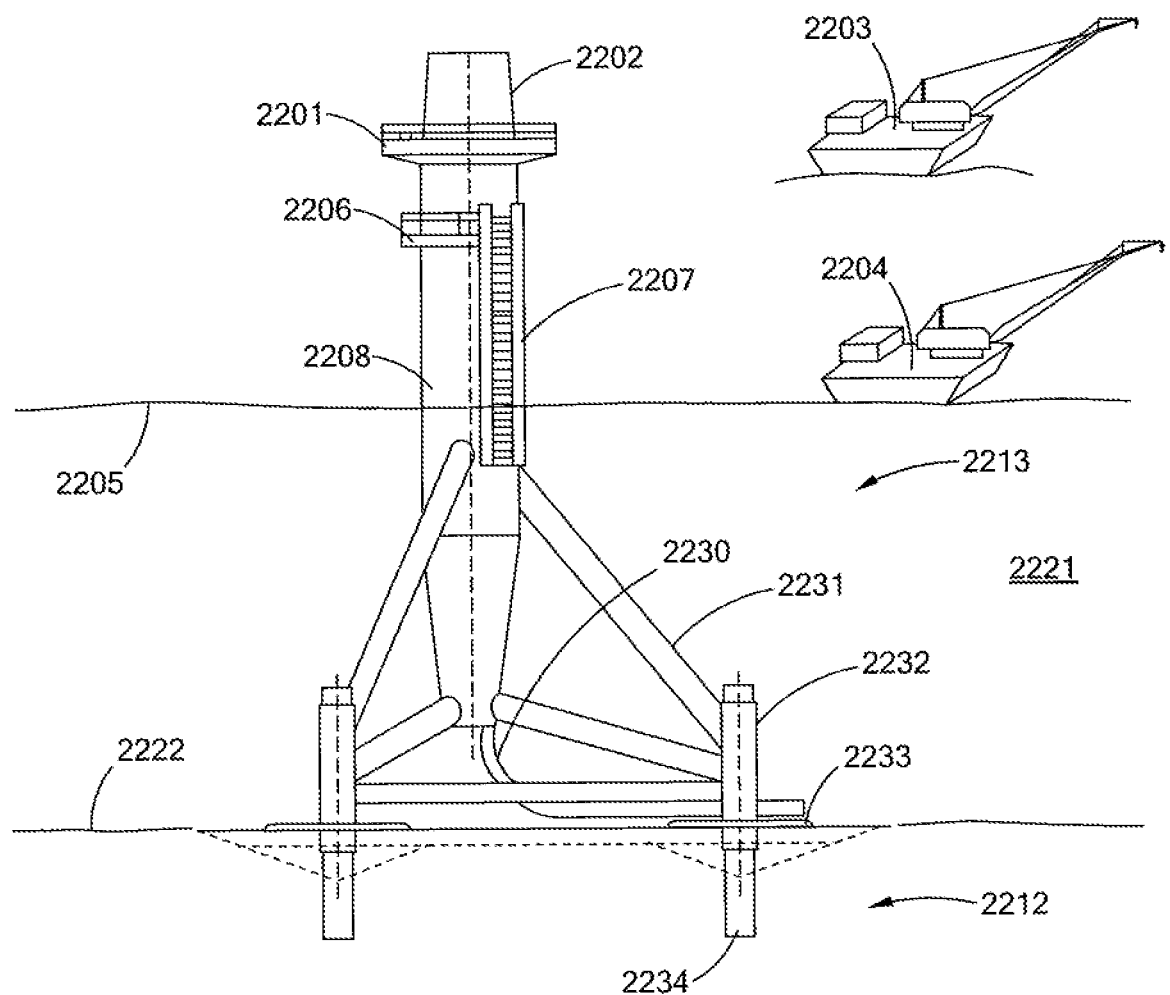
FIG. 22 is a schematic of an embodiment of a tripod structure and associated laser decommissioning system in accordance with the present invention.

Turning to FIG. 22, there is shown a schematic of an example of a tripod structure and associated foundation with a laser decommissioning vessel 2204 and a support vessel 2203 an station. Thus, there is provided a tower 2202 formed from a central column 2250, having a work platform 2201, an intermediate platform 2206, and a boat landing 2207, which are located above the surface 2205 of a body of water 2221. The central column 2250 has internal j tubes 2208 associated with it. Below the surface 2205 there are emerging internal j tubes 2230, diagonal braces, e.g., 2231, pile sleeve, e.g., 2232, and piles, e.g., 2234. The piles 2234 may be for example piles that are mechanically driven into the seabed 2222 or they may be suction caissons. Only two of three pile and sleeves are shown in the Figure. The piles 2234 are positioned through a mudmate 2233 and into the seabed 2222. The structure may also be viewed as having sections or areas: a substructure as shown by arrow 2213 and a foundation area as shown by arrow 2212. Although a support vessel and a laser decommission vessel are shown, it should be understood that in this and the other examples, unless specifically stated otherwise, that these vessels may be a single vessel or other vessels in addition to those shown in the figure may be used and that these vessels in the figures of the examples, are only illustrative and thus the vessels may have other shapes, configurations, lifting devices, no lifting devices, and capabilities, etc. The wells are first plugged as required by regulations for the particular area. The conductors, production pipe and other tubulars within the tower 2202 are cut with a laser tool. For example the laser tool of the embodiment of FIG. 34 would cut the conductors internal to external at 15 feet below the mudline. Following the removal of the all internal and external components of the tower, the topside work platform 2101 and tower 2202 would be removed to just above the seabed 2222 via a laser tool of for example the embodiment of FIG. 29. The upper sectioned now removed allows for clear diver access to remove the subsea internal centralizer (not shown). Upon unobstructed access down to 15 feet below the seafloor a laser tool of the embodiment of FIG. 29 would be lowered down the main tower and braced piles. Once at a point of resistance in each pile, due to mud plug, the tool would then release the upper anchors 2902 and secure to the interior of the pile wall, once securely fastened to the pile, the lower actuator 2903 will activate and drive the tools lower section 2905 down to the cutting depth of 15 feet and actuate the lower laser rotating arms 2906, 2907, 2908. The laser package can be placed in one, two or all of the arms for better cut efficiency. Once the arms have reached the interior pile wall, the lower tool section 2905 will begin to rotate, gas will flow thru the tool, down thru the arm or arms, thru the nozzle(s) and the laser will be initiated and rotated until the radial cut is complete. Upon completion of the cut the tool will be pulled back up to the laser vessel 2204 and the structure will be removed from the seafloor.

The foundations are cut by an inside out laser cut at 20 feet below the sea floor (mud line). Outside in laser cutting may also be performed. For the internal cut a fluid, and preferable one that is transmissive to, or substantially transmissive to the laser, such as water, mineral oil, or diesel, may be jetted and pumped from the inside of the piles to a sufficient amount, level, to provide access to the intended laser cut area. For the external cut the material around the piles will be dredge out to provide access for the laser cutting tool. The central column 2250 may also be cut with the laser tool and removed in one or more sections, or if grouted or otherwise affixed to the piles the assembly may be removed with one lift. One of the advantages of the laser plugging and abandonment procedure is the ability to precise and efficient section of large sections of these structures to smaller more easily, and cost effectively, handled sections.

Example 12

Figure 23:
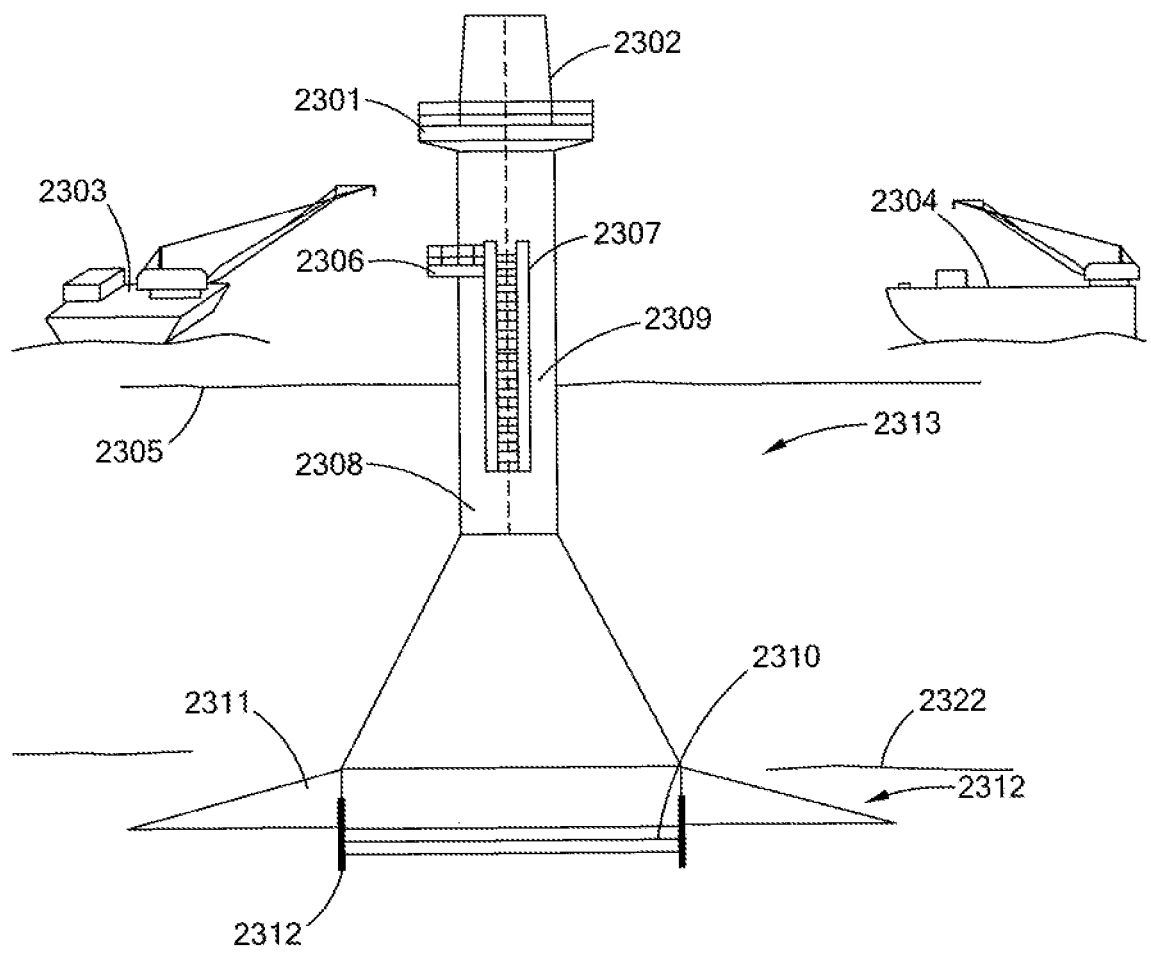
FIG. 23 is a schematic of an embodiment of a gravity structure and associated laser decommissioning system in accordance with the present invention.

Turning to FIG. 23, there is shown a schematic of an example of a gravity structure and associated foundation with a laser decommissioning vessel 2304 and a support vessel 2303 on station. Thus, there is provided a tower 2302 formed by a shaft 2309, having a boat landing 2307, an intermediate platform 2306, and a work platform 2301, positioned above the surface 2305 of a body of water. These are associated with the shaft 2309 internal. J tubes 2308. There is also provided scour protection 2311 and an underbase grout 2310, that is located below the mudline 2322. The structure may also be viewed as having sections or areas: a substructure as shown by arrow 2313 and a foundation area as shown by arrow 2312.

In order to decommission the structure and existing internal and external components, for example, the laser tool of the embodiment of FIG. 34 would be used to remove the internal conductors and/or wells, and an external to internal laser cutting tool would be used to remove the J-tubes just above or below the seabed. Once the wells and J tubes 2308 are removed, the upper tower 2302 down to the transition piece just above the scour protection area 2311 would be removed via an internal to external laser cutting tool such as for example shown in FIG. 18 or FIG. 30 or if internal obstructions exist, an external to internal cut could be performed, or the obstruction could be removed with a laser tool having for example a forward propagating laser beam path. Due to excessive scour 2311 and under base grouting 2310, external dredging or seabed excavation may occur to allow for proper laser tool placement similar to laser tool of shown in FIG. 7. Once cut has been confirmed by laser cutting tool verification system the support vessel crane would attach to the severed gravity based structure and remove from the seabed. Although two vessels are shown, it should be understood that they may be a single vessel or other vessel in addition to the three that are shown in the figure. The various section of the shaft, j-tubes, and under ground base may be laser cut to form specific section or part for lifting and removal. One of the advantages of the laser plugging and abandonment procedure is the ability to cut precise and efficient large sections of these structures into smaller more easily, and cost effectively, handled sections.

Example 13

A larger nuclear facility is in the process of being turned around through a refurbishing process. The laser cutting systems and tools are used to remotely cut and section various structures that are in hazardous areas, to provide greater ease for removal of those sectioned components. The use of laser cutting remotely, further provides the ability to perform these cuts in contained environments, utilizing existing containment structures, and to produce substantially less waste, e.g., cutting dust, etc. that may come from mechanical cutting processes or equipment, or partial and/or water jet cutters.

Example 14

A chemical facility is in the process of being shut down and removed from its location. The laser cutting systems and tools are used to remotely cut and section various structures that are in hazardous areas, to provide greater ease for removal of those sectioned components. The use of laser cutting remotely, further provides the ability to perform these cuts in contained environments, utilizing existing containment structures, and to produce substantially less waste, e.g., cutting dust, etc. that may come from mechanical cutting processes or equipment, or partial and/or water jet cutters.

Example 15

The laser cutting systems and tools are used to remove a subsea system, including subsea pipeline end manifolds (PLEMs) and subsea pipeline end terminals (PLETs), and/or subsea production equipment, e.g., controls, templates, skids, separators and other such types of equipment that may be located on the sea floor. Laser PIGs, of the type disclosed in U.S. patent application Ser. No. 13/366,882 may also be used in this process.

Example 16

The laser cutting systems and tools are used to cut and section portions of a platform deck that are located above the surface of a body of water. The laser cutters may split the deck in half, or in smaller sections, to provide for lighter sections to be lifted. These cuts may be either inside, outside in, or combinations of these depending upon the type of structures, e.g., I-beams, tubular members, deck legs to pile tops, etc., that the deck and above water line structure is made up of.

Example 17

Figure 24:
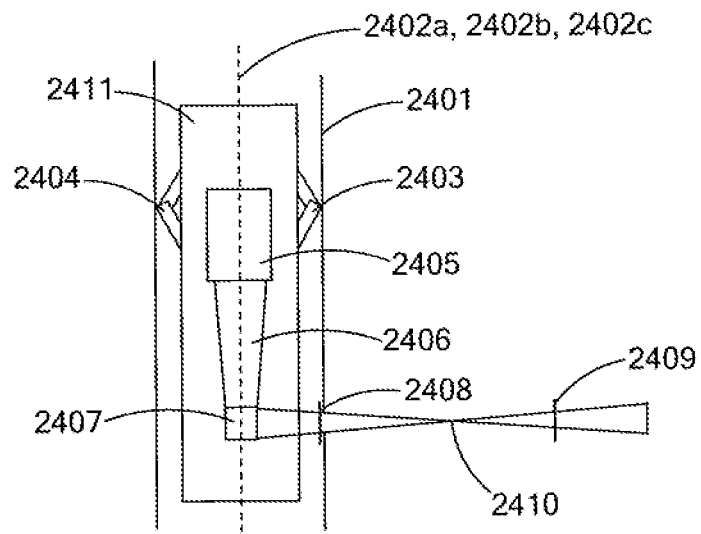
FIG. 24 is a schematic of an embodiment of a laser tool in accordance with the present invention.

In FIG. 24 there is provided an embodiment of a laser cutting tool that may be used to perform laser removal operations, such as those set forth in Examples 1 to 16 and other removal, abandonment, decommissioning, repair and refurbishment operations. Thus there is provided a laser tool having a body 2411, which is positioned inside of an inner surface 2401 of a tubular, e.g., a pile, a pile and conductor, a multi-string conductor, and combinations and variations of these, to be cut. The laser tool body 2411 has an optic package 2405, that focuses and directs the laser beam along beam path 2406 to a reflective device, 2407, for example a TIR reflective prism. The laser beam traveling along the beam path leaves the reflective device 2407 and travels toward the target, e.g., the intended area of laser illumination.

To obtain deep cuts, the beam has a long depth of field, and thus has a first spot size at 2408, which is in the area of the inner surface of the tubular 2401, a focus point 2410 which is removed from the inner surface of tubular 2401 and a second spot size 2409, which is removed from the focal point 2410. In this manner the tool, thus configured, would have an effective cut distance between spots 2408 and 2409, for a predetermined laser fluence, which is established to meet the material and cutting speed requirements for the operation.

The embodiment of this Example 17, would be a completely on-axis embodiment, i.e., three axis are aligned. Thus, there is an axis for the tubular to be cut 2402c, an axis for the tool body 2402b, and an axis for the optics package (including the beam path exiting the optics package) 2402a. In this embodiment, the axes are substantially co-axial, and preferable co-axial, i.e., on a same axis as shown in FIG. 24.

The tool has fixation devices 2404, 2403, which may serve to anchor, centralize, fix the tool at a predetermined stand-off distance, and which may also serve as a packer. Any fixation device known to the art may be used. Preferably, the fixation device will have the ability to be used across a wide range of tubular inner diameters.

Example 18

Figure 25:
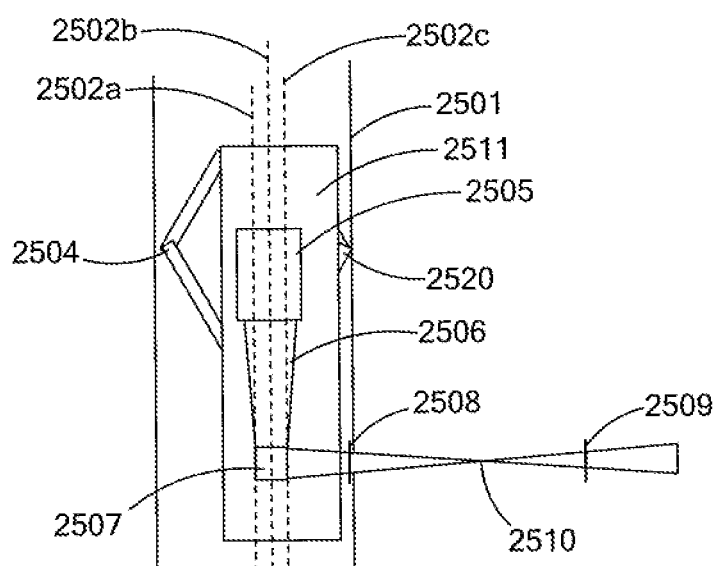
FIG. 25 is a schematic of an embodiment of a laser tool in accordance with the present invention.

In FIG. 25, there is provided an embodiment of a laser cutting tool that may be used to perform laser removal operations, such as those set forth in Examples 1 to 16 and other removal, abandonment, decommission, repair and refurbishment operations. Thus, there is provided a laser tool having a body 2511, which is positioned inside of an inner surface 2501 of a tubular, e.g., a pile, a pile and conductor, a multi-string conductor, and combinations and variations of these, to be cut. The laser tool body 2511 has an optic package 2505, that focuses and directs the laser beam along beam path 2506 to a reflective device 2507, for example a TIR reflective prism. The laser beam traveling along the beam path leaves the reflective device 2507 and travels toward the target, e.g., the intended area of laser illumination.

To obtain deep cuts, the beam has a long depth of field, and thus, has a first spot size at 2508, which is in the area of the inner surface of the tubular 2501, a focus point 2510 which is removed from the inner surface of tubular 2501 and a second spot size 2509, which is removed from the focal point 2510. In this manner the tool, thus configured, would have an effective cut distance between spots 2508 and 2509, for a predetermined laser fluence, which is established to meet the material and cutting speed requirements for the operation.

The embodiment of this Example 18, would be a three off-axis embodiment, i.e., three axis are not aligned. Thus, there is an axis for the tubular to be cut 2502c, an axis for the tool body 2502b, and an axis for the optics package (including the beam path exiting the optics package) 2502a. In this embodiments these three axis are not co-axial, with each axis, as shown in the Figure, having a separate position.

The tool has fixation devices 2504, which may serve to anchor, and fix the tool at a predetermined stand-off distance, and which may also serve as a packer. There is also provided a roller, bumper, or stand-off device 2520, which engages the inner surface 2520. Any fixation device and stand-off device known to the art may be used. Preferably, the fixation device will have the ability to be used across a wide range of tubular inner diameters.

Example 19

Figure 26:
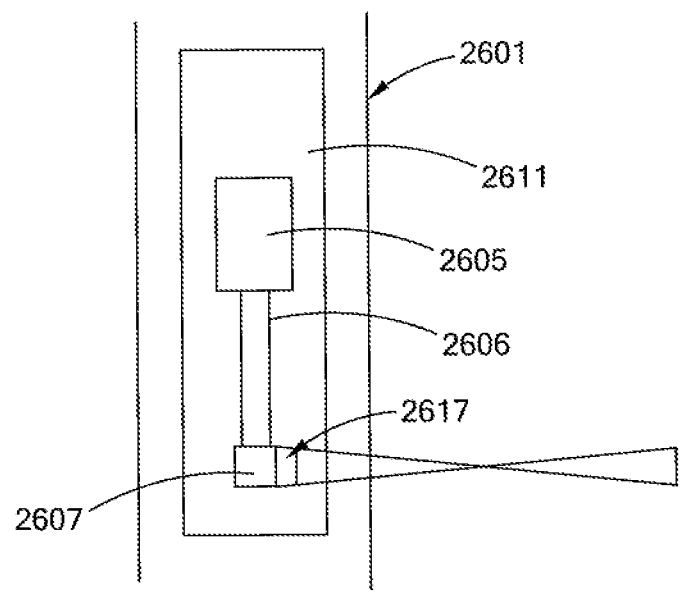
FIG. 26 is a schematic of an embodiment of a laser tool in accordance with the present invention.

In FIG. 26 there is provided an embodiment of a cutting tool 2611 positioned in a tubular structure 2601. The tool 2611 has an optics package 2605, which provides a collimated laser beam along beam path 2606 to a reflective device 2607, which may be a TIR prism. The collimated laser beam then leaves traveling along the beam path to focusing optic 2617 which focuses the laser beam. This embodiment may be an on-axis or off-axis configuration.

Example 20

Figure 27A:
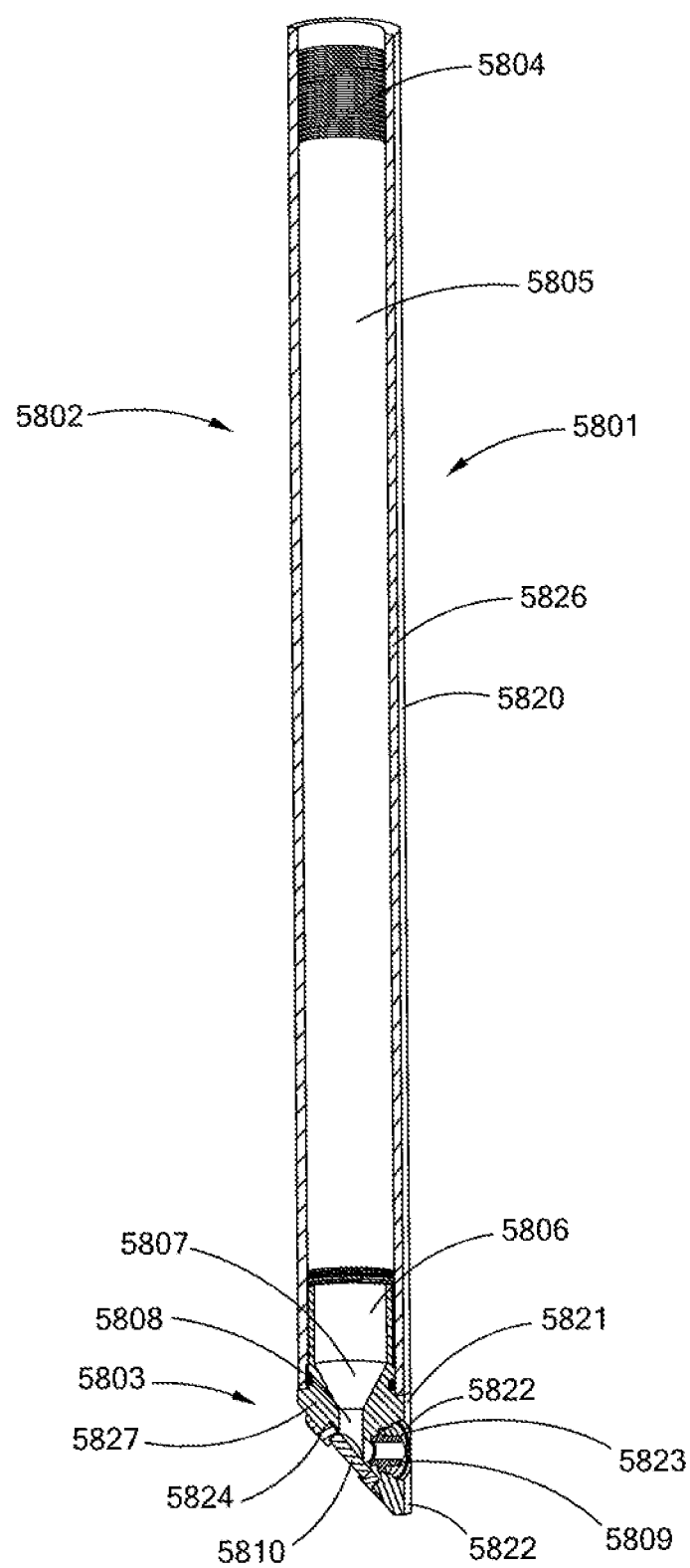
FIG. 27A is a cross sectional view of an embodiment of a laser head in accordance with the present invention.
Figure 27B:
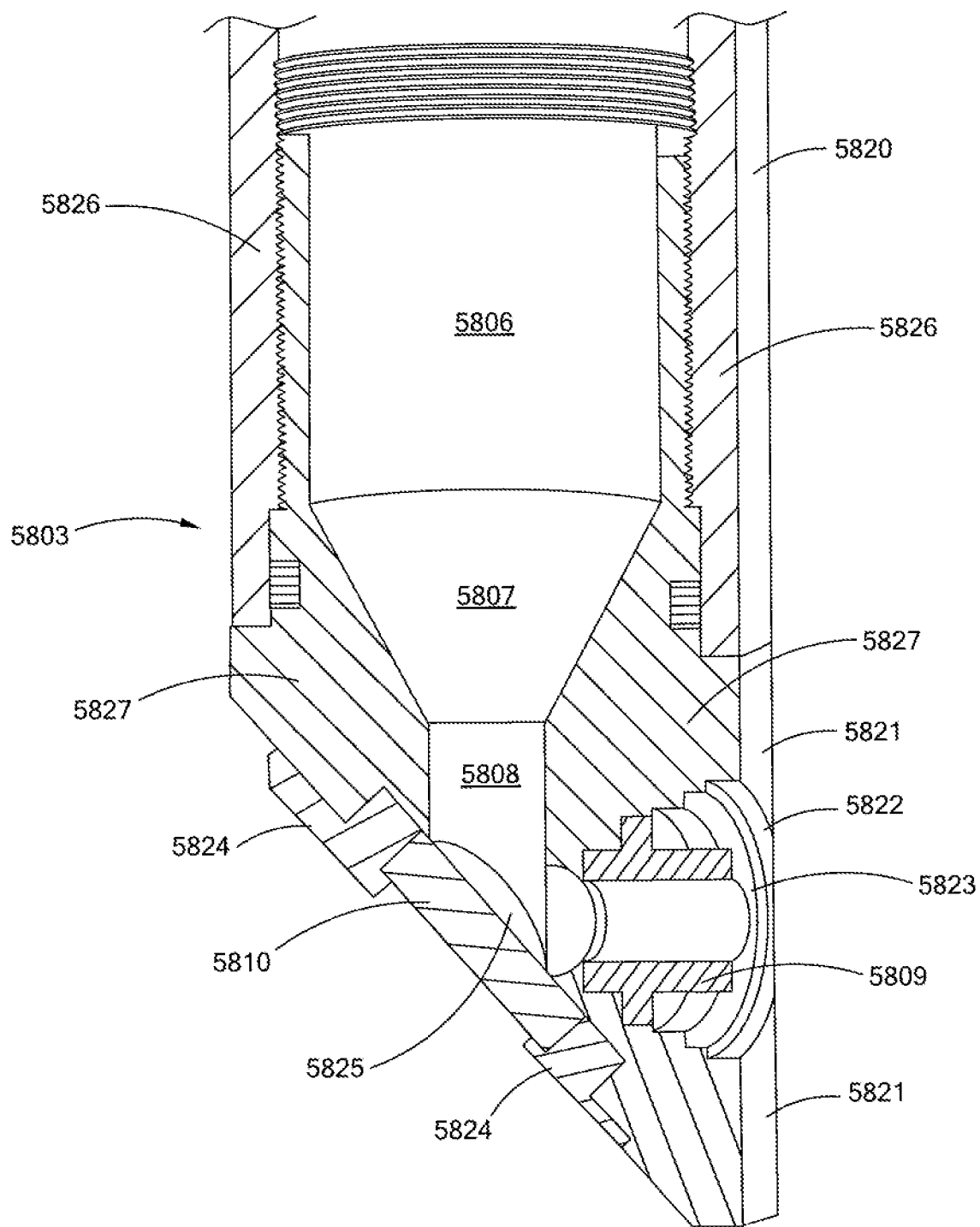
FIG. 27B is a cross sectional view of a section of the laser head of the embodiment of FIG. 27A.
Figure 27C:
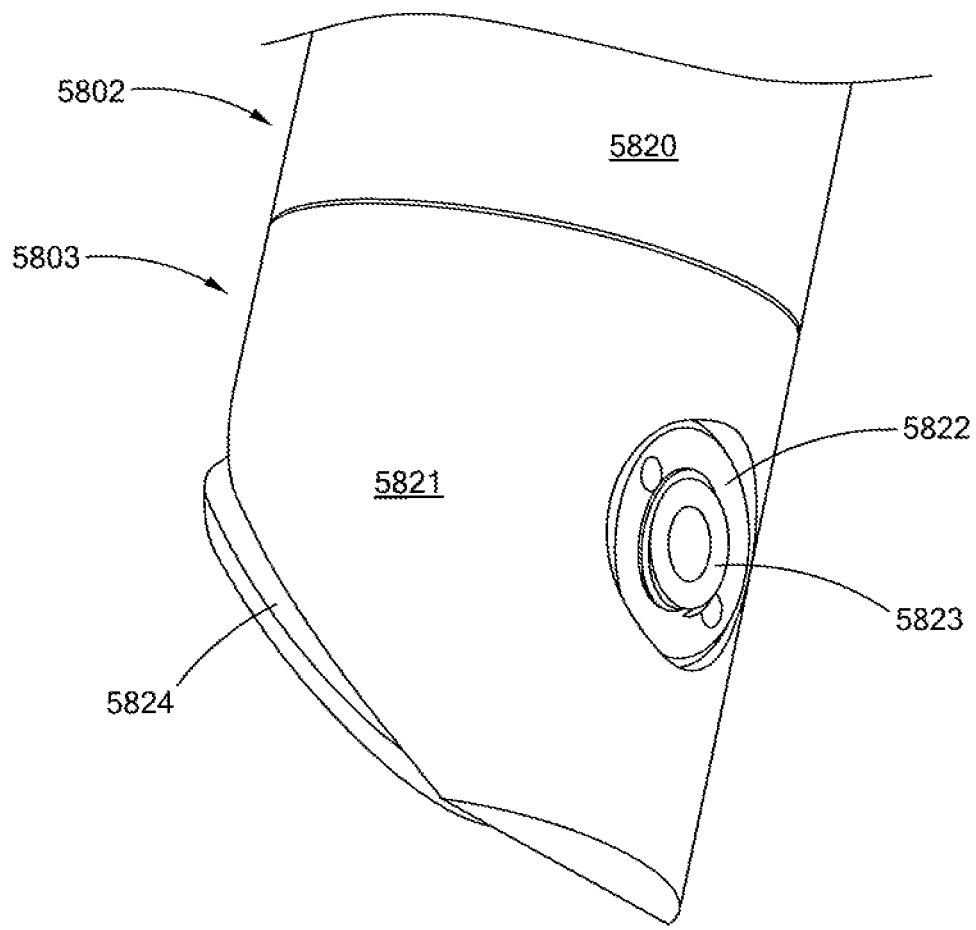
FIG. 27C is a perspective view of a section of the laser head of the embodiment of FIG. 27A.

In FIGS. 27A to 27C, there is provided an embodiment of a laser cutting head assembly 5801, which may be used in conjunction with a laser cutting tool or assembly, a motor section, an optics package or other similar assembly (all not shown in the figure). The laser cutting head assembly 5801 has a beam path tube 5802 that has an outer surface 5820, a side wall 5826 and an inner surface 5805. At the distal end (closest to the laser beam source) there is provided a treaded section 5804 for attachment to a tool, motor section, or optics package. At the proximal end there is a nozzle section 5803 that is threaded into the beam path tube 5802. The nozzle section 5803 has a hollow body 5827, which has a first cylindrical chamber 5806, a frustro conical chamber 5807, which connects chamber 5806 to a second conical chamber 5808. The nozzle section 5803 has an outer surface 5821, which is aligned with outer surface 5820. There is provided a member 5810, that has a face 5825 that forms an interior surface of the nozzle 5803. Retaining member 5824 fixes the member 5810 to the nozzle 5803. The member 5810 may be a reflective device, as described herein, or as is otherwise know to those of skill in the art for reflecting high power laser beams. It also may be a selectively reflective and selectively transmissive device, thus providing for certain predetermined types, e.g., wavelengths, or amounts, e.g. powers of light to pass through the member to a detection, analysis or monitoring device, or to be launched into a fiber for transmission to a detection, analysis or monitoring device. There is provided a nozzle throat member 5809, which has a nozzle face 5823, and which is held in place by locking member 5822.

Example 21

Figure 35A:
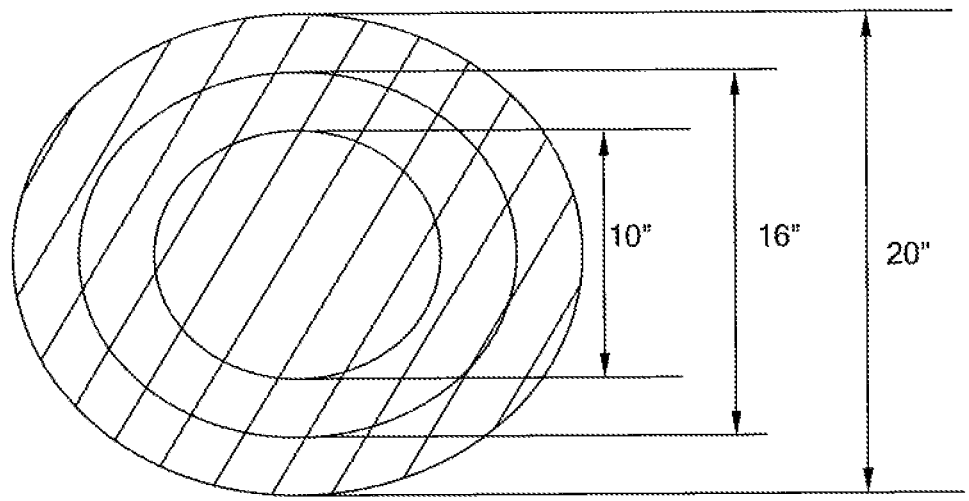
FIG. 35A to 35M are cross sectional schematic views of material configurations cut in the embodiments of Example 21 in accordance with the present invention.
Figure 35B:
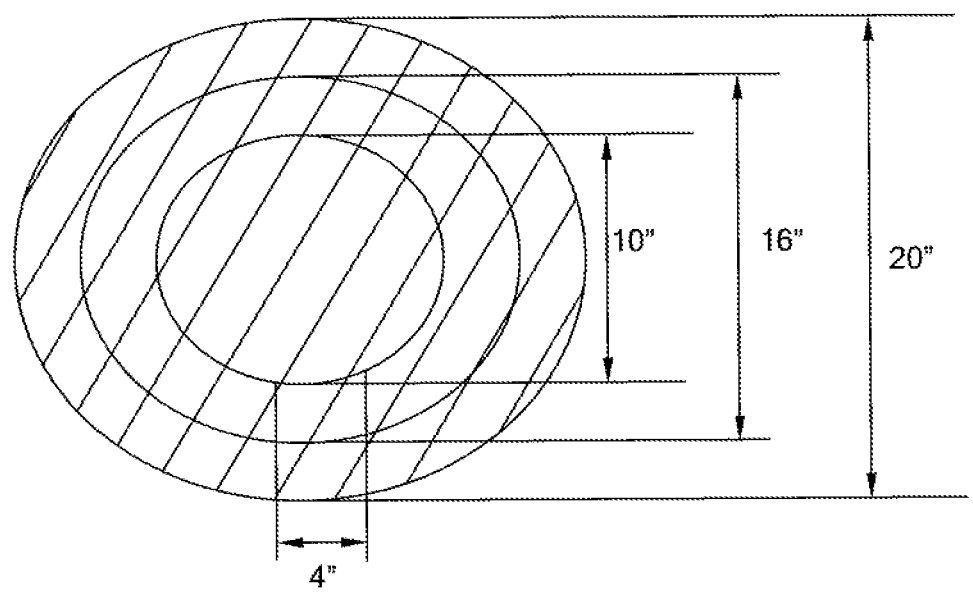
Figure 35C:
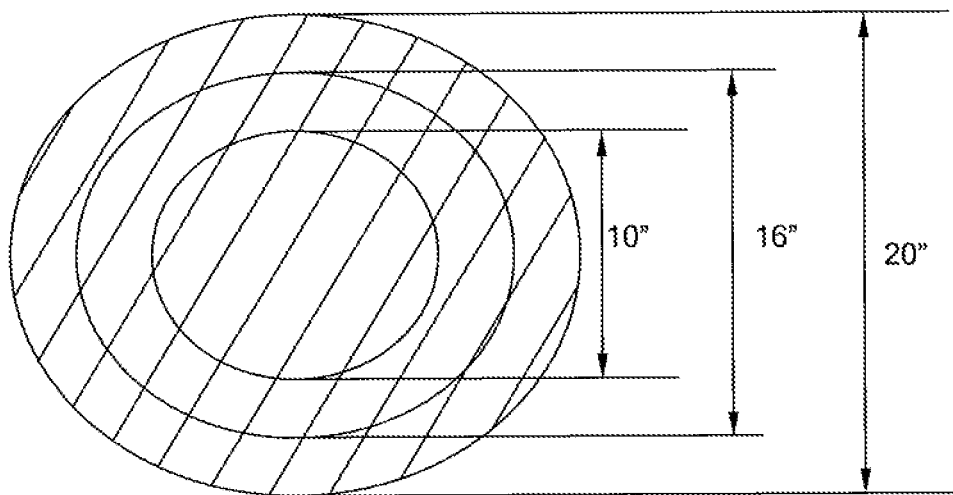
Figure 35D:
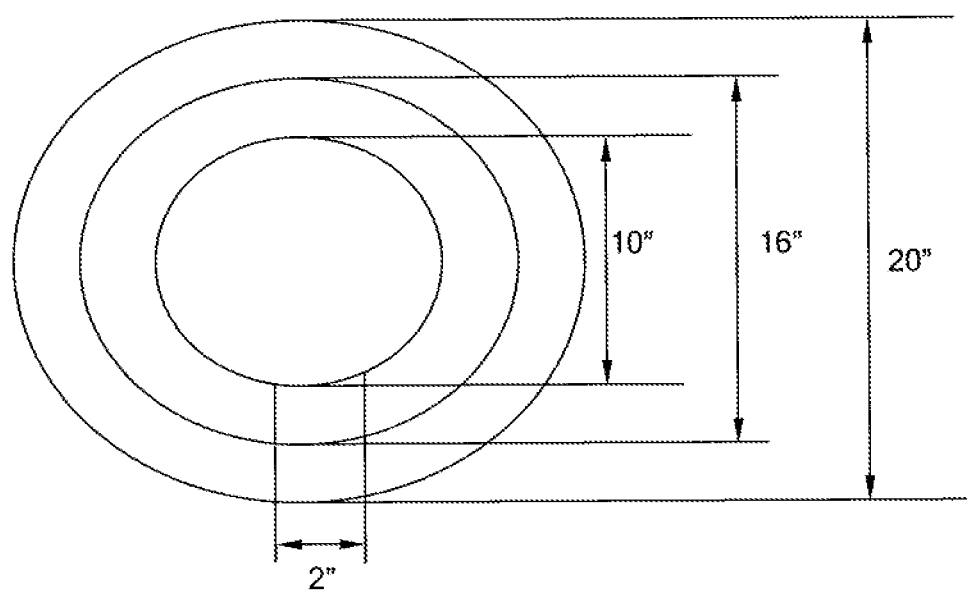
Figure 35E:
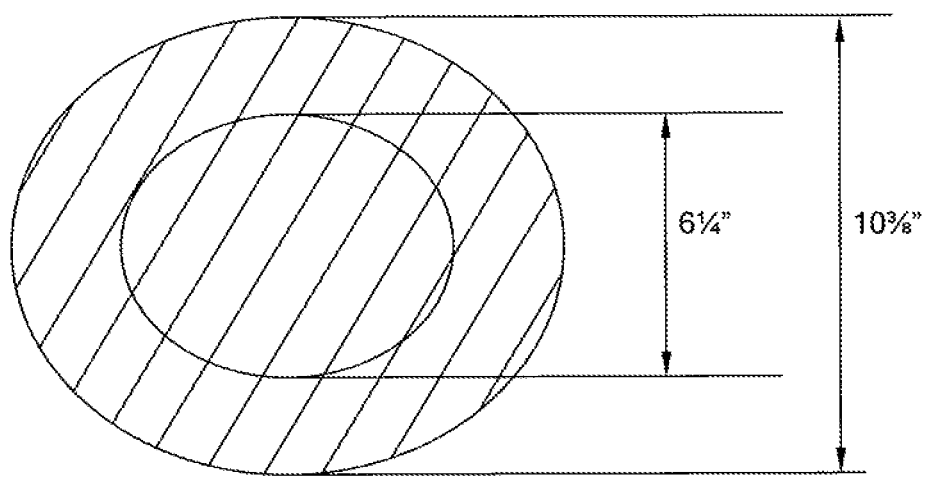
Figure 35F:
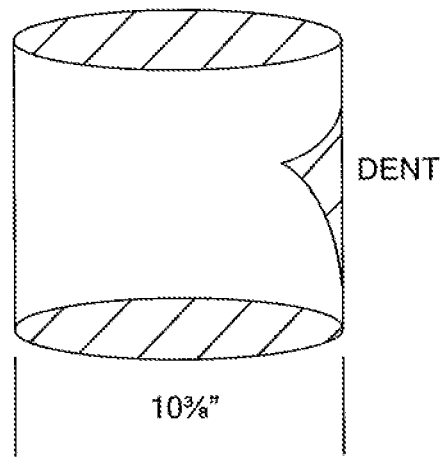
Figure 35G:
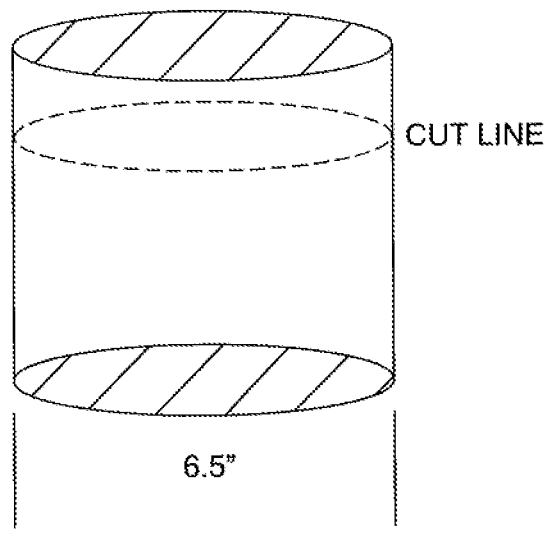
Figure 35H:
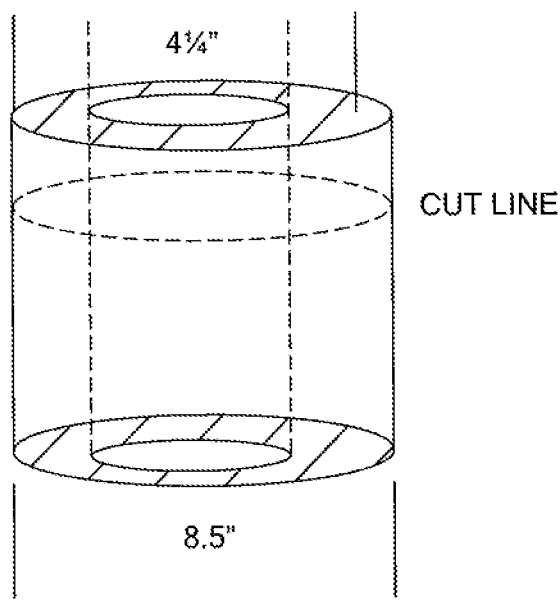
Figure 35I:
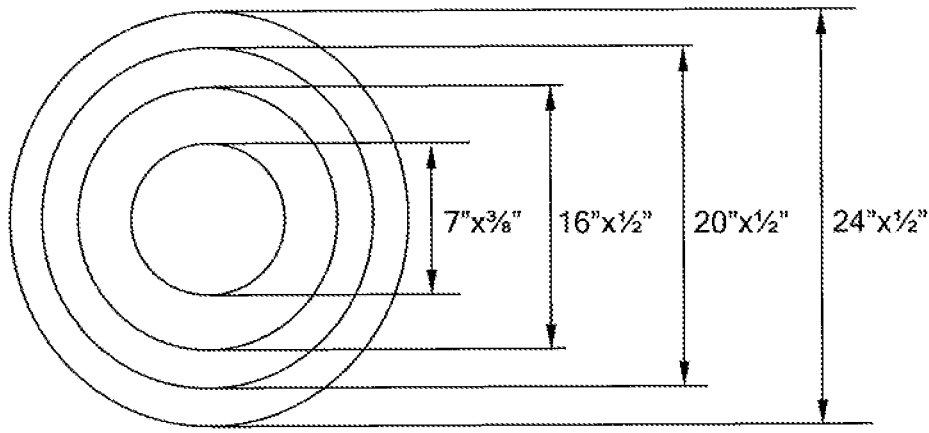
Figure 35J:
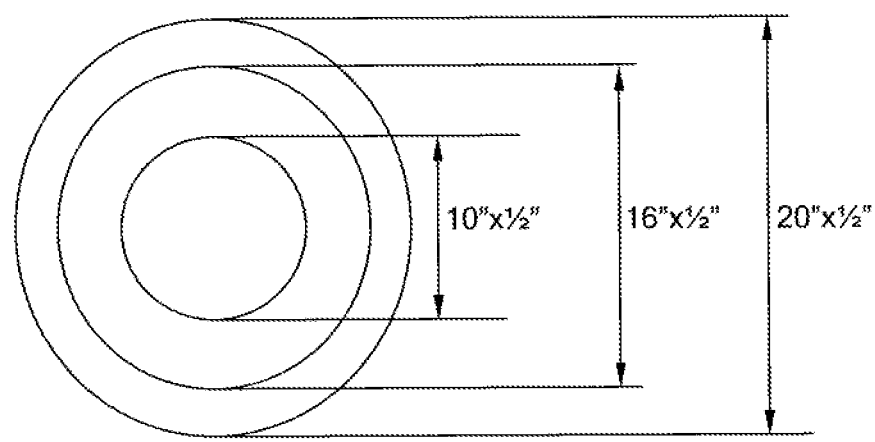
Figure 35K:
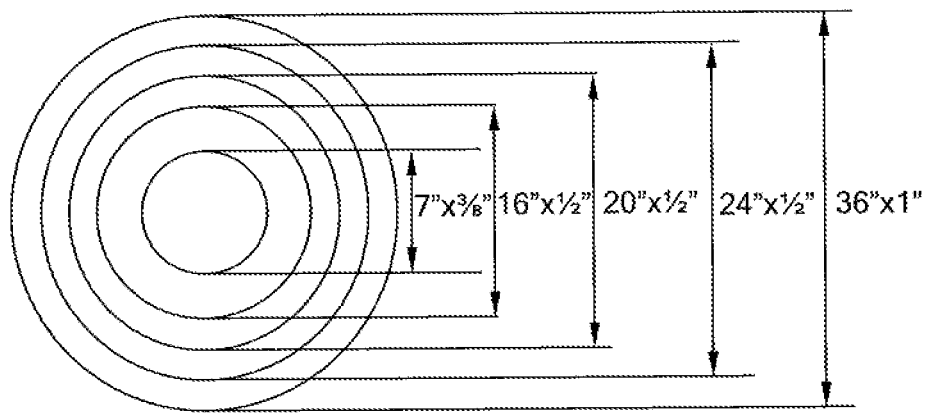
Figure 35L:
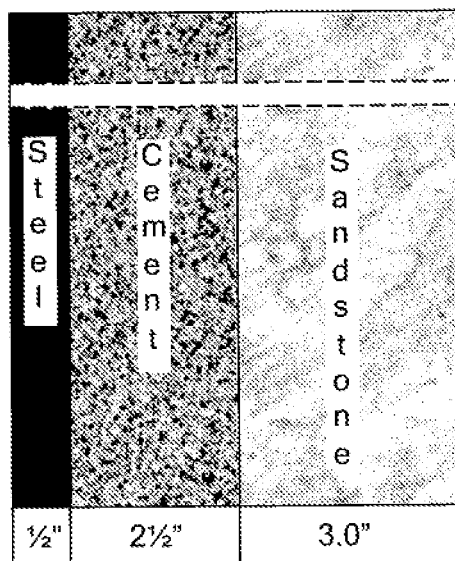
Figure 35M:
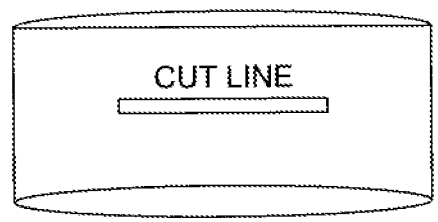

Using a laser head in a laboratory testing apparatus, similar to the laser head of the embodiment of Example 20 the following laser complete cuts were made on and in combinations and configurations of tubulars and materials as illustrated in FIG. 35A to 35N, and set forth in Table lit

TABLE III

| Material | Figure illustrating configuration of material cut | Configuration | Process | Stand Off | Nozzle Diameter | Focal Length | Process Power | CFM | PSI | Speed IPM |
|---|---|---|---|---|---|---|---|---|---|---|
| Steel and Cement | 35A | 10" × 3/8" 20" × 3/8" | Cut Off Complete from | 1/2" | .425" | 1000 mm | 15.8 KW | 280 | 125 | 5 |

TABLE III-continued

| Material | Figure illustrating configuration of material cut | Configuration | Process | Stand Off | Nozzle Diameter | Focal Length | Process Power | CFM | PSI | Speed IPM |
|---|---|---|---|---|---|---|---|---|---|---|
| Steel and Cement | 35B | 16" × ¾" Fully Grouted 10" × ⅜" 20" × ⅜" | ID in Air Cut 4" Diameter Hole Through Fully Grouted in Air | ¾" | 0.325 | 500 mm | 15.1 KW | 165 | 125 | 1 |
| Steel and Cement | 35C | 16" × ¾" Fully Grouted 10" × ⅜" 20" × ⅜" | Cut Off Complete from ID in Water | ½" | .425" | 1000 mm | 15.8 KW | 280 | 125 | 5 |
| Steel and Cement | 35D | 16" × 34" Fully Grouted 10" × ⅜" 20" × ⅜" | Cut 2" Diameter Hole in water ungrouted | ¾" | .425" | 1000 mm | 15.8 KW | 280 | 125 | 3 |
| Steel and Cement | 35E | 16" × 34" No Grout 6¼" × 3/8" 10" × ⅜" Grouted | Cut off complete from ID in Water | 1"" | .270" | 1000 mm | 16.2 KW | 185 | 125 | 6 |
| Steel | 35F | 10" × ⅜" Diameter Tube with Dent | Cut out Dent From ID in 3 Sections | up to 2" | .270" | 1000 mm | 16.2 KW | 185 | 125 | 10 |
| Steel | 35G | 6.5" Diameter by ⅜" Thick Tube | Cut from OD around part | .100" | .060" | 250 mm | 17.3 KW | 14 | 125 | 170 |
| Steel | 35H | 8.5" OD × 4.25 ID Tool Joint | Cut from OD around part | .100" | .225" | 500 mm | 17.3 KW | 120 | 125 | 10.5 |
| Steel and Cement | 35I | 24" × ½"- 20" × ½"- 16" × ½"- 7" × ⅜" Cemented Between 16" and 20" | Cut from ID Under Water with Sealed Center | .500" | .300" | 1000 mm | 18.0 KW | 195 | 125 | 43 Minutes to Cut |
| Steel | 35J | 10½" × ⅜"- 16" × ½"- 20" × ½" Ungrouted | Cut from ID Under Water with Sealed Center | .500" | .300" | 1000 mm | 18.0 KW | 175 | 125 | 43 Minutes to Cut |
| Steel | 35K | 7" × ⅜"- 16" × ½"- 20" × ½"- 36" × 1" Ungrouted | Cut from ID Under Water with Sealed Center | .500" | .300" | 1000 mm | 18.0 KW | 175 | 125 | Only 59 seconds |
| Steel, Cement and Sandstone | 35L | ½" Steel- 2½" Cement and 3" Sandstone | Perforation 2" Diameter Through Hole in Air | .500" | .300" | 500 mm | 16.5 KW | 200 | 125 | 5 |
| Steel | 35M | 1" Casing Steel | Optimizes Cutting Speed for ½" Diameter Beam | .500" | .750" | 1000 mm | 18.5 KW | 295 | 125 | 10 to 12 |

Example 22

Figure 28:
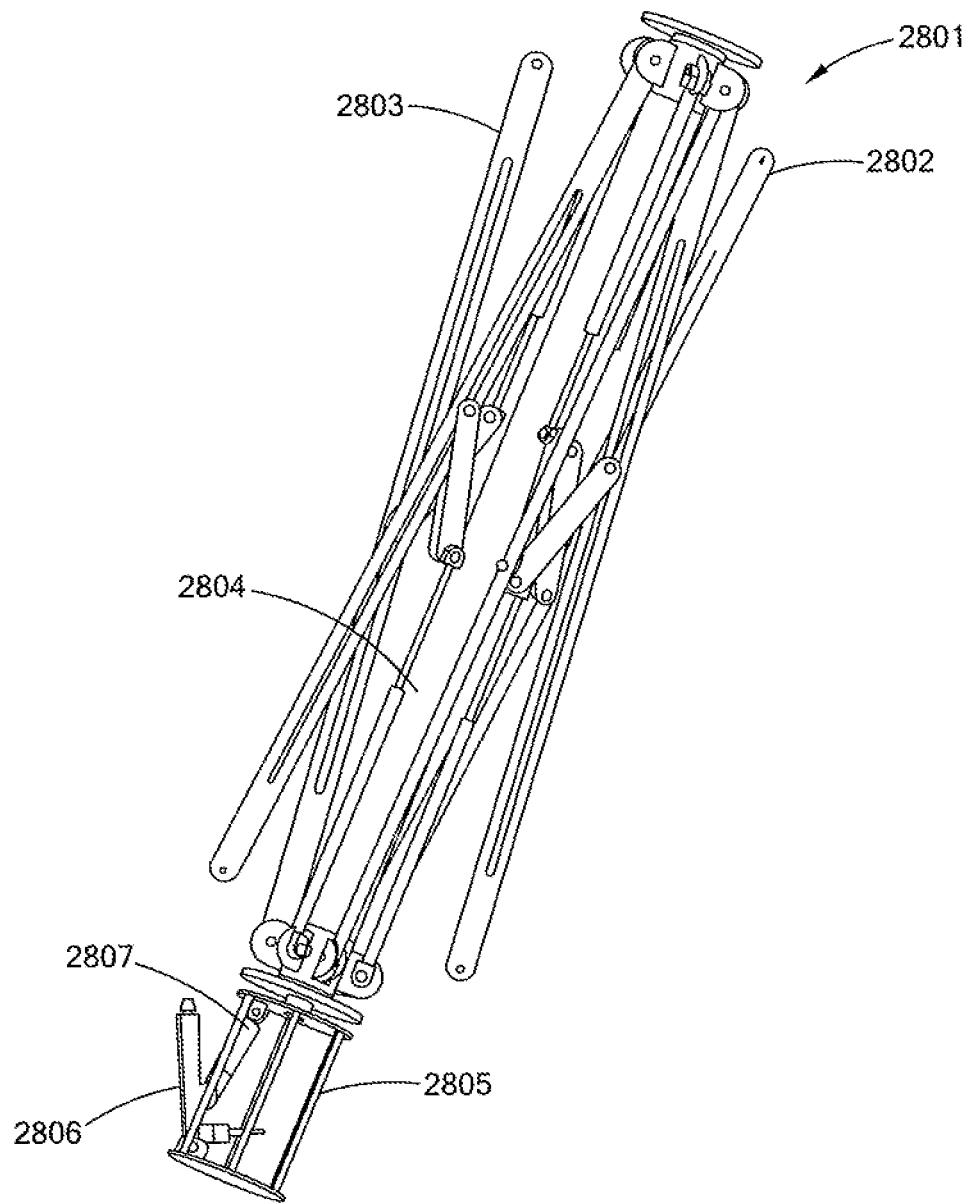
FIG. 28 is a perspective view of an embodiment of a laser cutting tool in accordance with the present invention.

In FIG. 28 there is provided an embodiment of a laser-decommissioning tool, which may be used for example to perform an inside-to-outside cut on a pile. Thus, there is provided a tool 2801 having a first section 2804 that has associated therewith anchoring devices 2802, 2803 and a third anchoring device (not shown). The first section 2804 is hollow and contains the high power laser fiber, control cables or wires, and passages for transmitting the laser cutting fluid. The first section is rotationally coupled to a second section 2805 that contains an extension mechanism 2807 such as a piston, or mechanical jack, that moves the laser head arm 2806 into a cutting position. The laser head arm contains an optics package for focusing and direction the laser beam and also a nozzle package for forming the laser-fluid jet. Although one laser head arm is shown in this embodiment, two, three or more may be used. Thus, in use the laser head arm is in a retracted position, within the outer cage 2812, as the tool is lowered into position within the pile. The outer cage 2812 protects the laser head. Thus, time and equipment costs may be saved, by avoiding the step of removing, e.g., dredging out the mud that may otherwise typically be located within the pile at and above the area to be cut. In this manner the tool may be pushed through the mud, for example by using coiled tubing and an injector system, to the position of the cut, e.g., 15 feet below the sea bed. The laser head arms may then be opened, by forcing them through the mud with the pistons. The lower section may then be rotated (by internal motor section not shown) to perform the cut, by moving the laser head arms through the mud. The shape of the laser head arms may be such as to more easily move through the mud, such as a partial or complete diamond shape, e.g., a knife-edge on the leading face for outward movement, and a knife-edge on the leading face for rotational movement. It being noted that this tool may also be advanced to the cut location after any mud or debris has been removed from the pile or tubular to be severed.

Example 23

Figure 29:
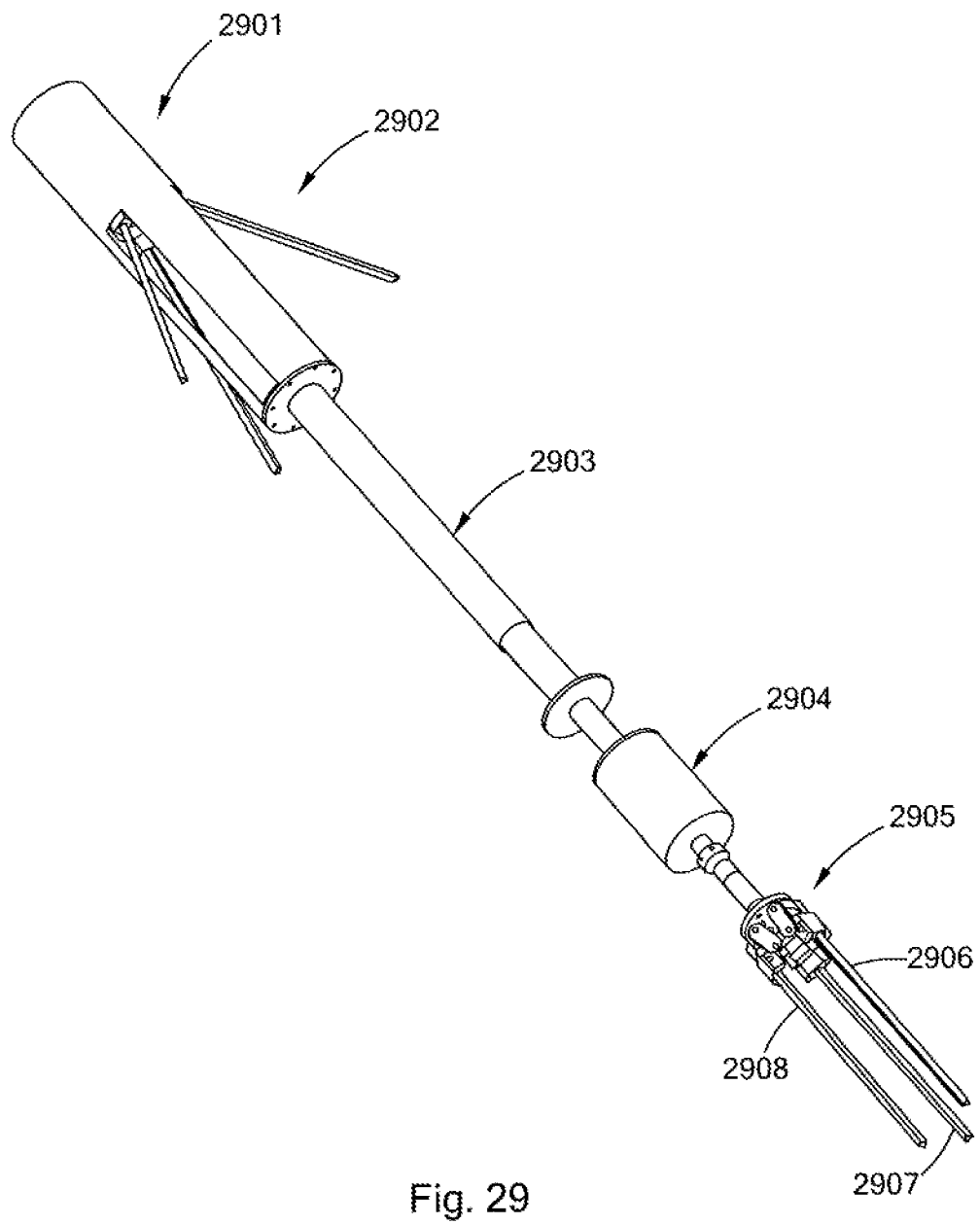
FIG. 29 is a perspective view of an embodiment of a laser cutting tool in accordance with the present invention.

Turning to FIG. 29, there is provided an embodiment of a laser tool that eliminates the need for dredging the work site before performing a laser cut. Thus, there is provided a laser tool 2901 having an anchoring section 2902, a pushing or extension section 2903, a motor section 2904 and a lower rotation section 2905 that in this embodiment has three laser head arms 2906, 2907, 2908. The arms are shown in their retracted positions in the figure. The anchoring section 2902, the pushing section 2903, and the motor section 2904 may have passages for the laser fiber, data and control lines and for conveying any fluids used for the fluid laser jet. (It should be understood that the optical fibers, data and control lines, and passages for fluids, e.g., conduit forming the passage(s) may be located outside of the tool and attached to or otherwise associated with the laser arm heads 2906, 2907, 2908. In operation the tool is lowered into the tubular to be cut, unit sufficient resistant is encounter that it can no longer be advance, by gravity or by force from for example an injector. At this point the anchors are set, fixing the tool in position. The pushing section is the activated and elongates, pushing the motor section 2904 and the rotating section 2905 down into the mud to the location where the cut is to be performed. Extending device then move the laser head arms 2906, 2907, 2908 out to engage, or be adjacent to, near to, or within reach of the laser jet under the particular mud conditions and environment, the inner surface of the tubular. The laser head arms 2906, 2907, 2908 each contain an optics package for focusing and direction the laser beam and also a nozzle assembly for forming the laser-fluid jet. Thus, time and equipment costs may be saved, by avoiding the step of removing, e.g., dredging out the mud that may otherwise typically be located within the tubular at and above the area to be cut. In this manner the tool may be pushed through the mud to the position of the cut, e.g., 15-20 feet below the sea bed. The laser head arms may then be opened, by forcing them through the mud with the pistons. The lower section 2905 may then be rotated by motor section 2904 to perform the cut, by moving the laser head arms through the mud. The shape of the laser head arms may be such as to more easily move through the mud, such as a partial or complete diamond shape, e.g., a knife-edge on the leading face for outward movement, and a knife-edge on the leading face for rotational movement. It being noted that this tool may also be advanced to the cut location after any mud or debris has been removed from the tubular to be severed.

Example 24

Figure 30:
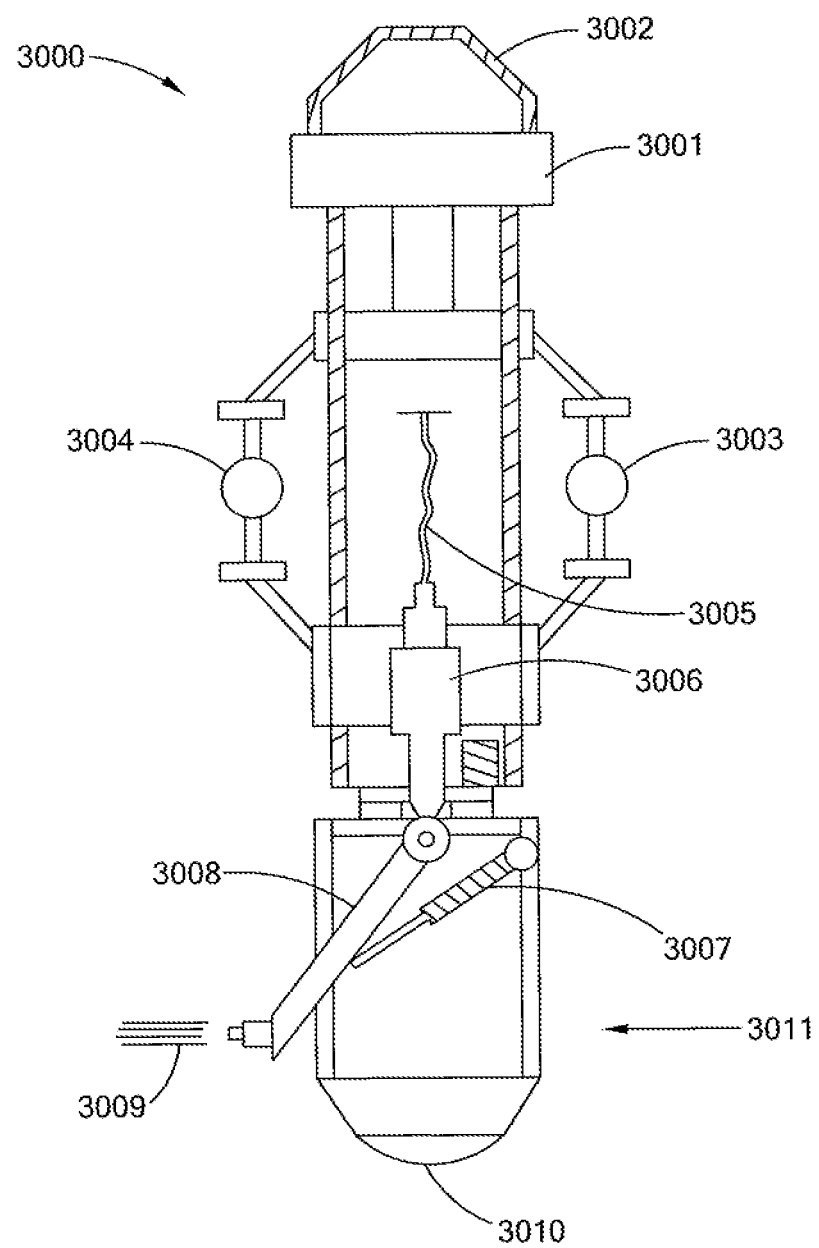
FIG. 30 is a cross sectional view of an embodiment of a laser cutting tool in accordance with the present invention.

Turning to FIG. 30 there is provided a laser tool 3000 having an upper attachment section 3002 for attachment to a line structure (not shown). Below attachment section 3002 is a first section 3001 having a first motor, e.g., and electric motor. The motor section 3001 is used to rotate the tool to extend and retract fixation devices 3004 and 3003 so that they engage the inner surface of the tubular to be cut. The optical fiber 3005 is located within the tool and is in optical communication with an optics package 3006 that directs the laser beam (and may also shape and focus the beam). The laser beam path then leaves the optics package and is directed, by beam directing devices, into arm 3008, where it exist the arm as laser-jet 3009. There an arm opening device 3007, that moves the arm outwardly from a retracted position to an operating position. There is provided a second motor 3020 that rotates the lower section and thus rotates the arm 3008. There is also provided a protective housing or noise cone 3010. The second motor 3020 can, preferably rotate the arm in both directions, e.g., clockwise and counter-clock wise. Although not shown, the tool may have passages and conduits for conveying data lines, and fluids for forming the laser-fluid jet. Further, the tool may have cut verification devices, which enable the completeness of the cut made by the laser to be verified, either real-time during the cut, or on a separate rotation after the cut. The tool may have an effective cutting range of from about 24 inches to about 96 inches.

Example 25

Figure 31:
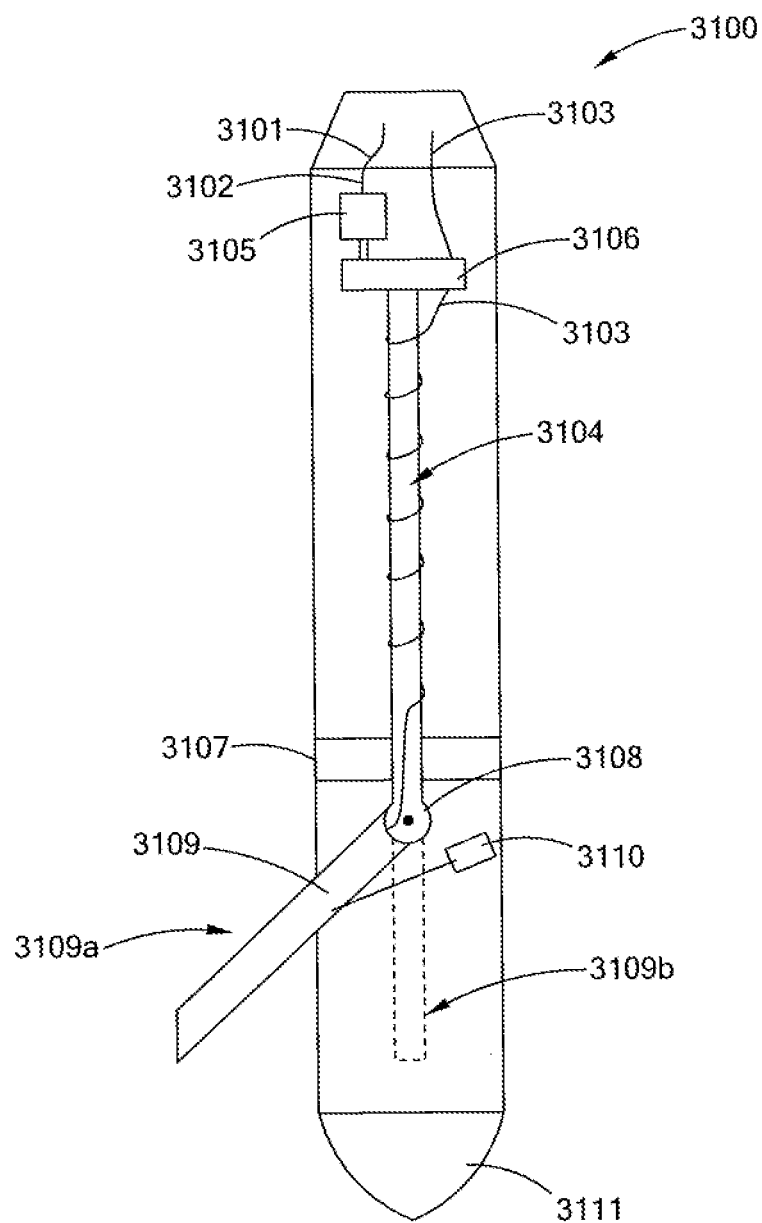
FIG. 31 is a schematic view of an embodiment of a laser cutting tool in accordance with the present invention.

Turning to FIG. 31, there is provided a laser tool 3100. The tool has a top attachment section 3101 for attaching to a line structure (not shown). There is provided an electric power line 3012 that is associated with an electric motor 3105 that is associated with a gear box 3106 for rotating a shaft 3104. There is further provided an optical fiber cable 3103 that is wrapped around the shaft 3104, e.g., spiral wrapped around the shaft 3104. There is a bearing and rotational sealing section 3107 that the shaft and fiber pass through to a rotating section 3130, that has a laser arm 3109, and protective noise piece 3111. There is a device 3110 to push the laser arm 3109 from a retracted position 3109b to and extended position 3109a. In this embodiment, the fiber is wrapped such that as the lower section is rotated to perform the cut, the fiber is unwound. In this manner, in this embodiment there is no beam path that travels in free space across a rotating mechanical juncture, e.g., a junction where one section is rotating and the other is not, or where the sections are rotating in different directions or at different rates.

Example 26

Figure 32:
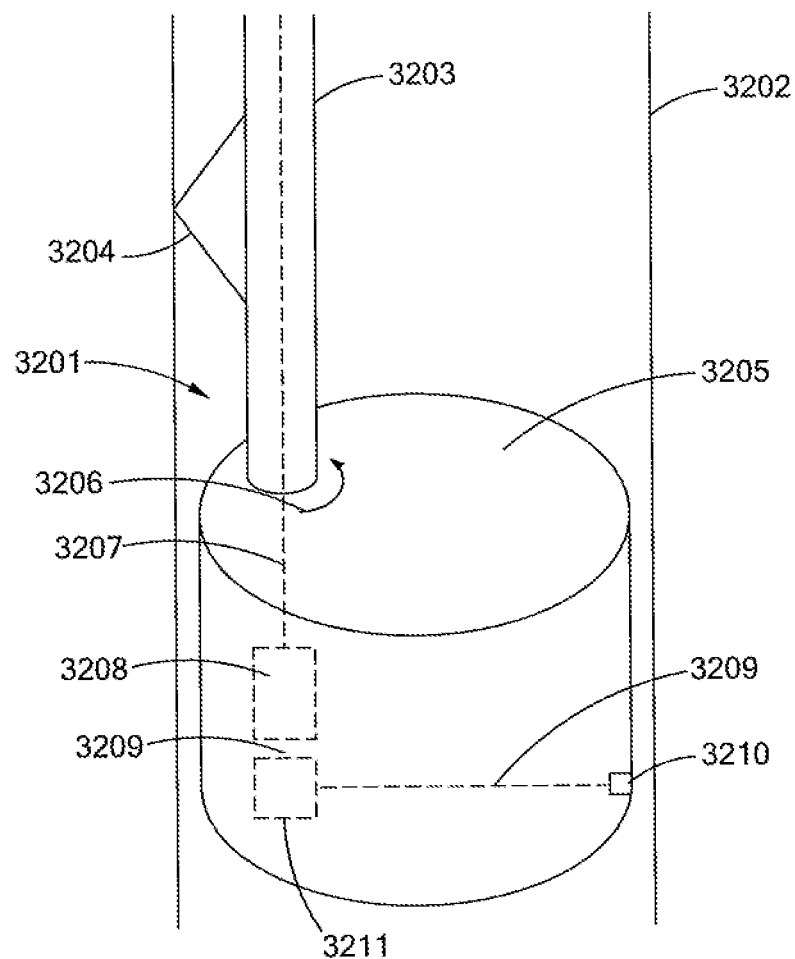
FIG. 32 is a perspective view of an embodiment of a laser cutting tool in accordance with the present invention.

Turning to FIG. 32, there is provided an embodiment of a laser tool assembly 3201 located within a tubular 3202. The laser tool assembly 3201 has a shaft section 3203 that has an anchoring device 3204, which is expandable, e.g., a spring loaded, to provide a force to push the shoe against the tubular. The shaft section is connected to a shoe section 3205. There is provided a motor section that rotates the shoe section 3205 in the direction of arrow 3206, relative to the tubular and the shaft section 3203 which do not rotate. The optical fiber 3207 extends through the shaft 3203 into the shoe and is optically associated with an optics package 3208, the laser beam leaves the optics package 3208 and travels along beam path 3209 to a reflective member 3211, where it leaves the reflective member 3211 and travels along beam path 3209, to exit the shoe at nozzle 3210, striking the tubular 3202. In this manner, a constant distance between the beam exit and the inner surface of the tubular and be maintained essentially constant, even when irregularities, or eccentricities are present in the tubular.

Example 27

Muitistring Laser Cutting Operational Procedure.

| Step | Operation |
|---|---|
| 1. | All wells must be clean of debris in order for internal laser cutting tools to function properly. Contractor is to use API sized drifts and properly drift the innerstring of the multistring well prior to the arrival of the laser cutting system. |
| 2. | Lift equipment from the support vessel onboard the work vessel and sea fasten. Equipment will be rigged up according to deck spot plan and procedure for rigging. All lifting operations require a good communication between crew, deck foreman and crane operator to avoid any hazardous situation (hanging load, correct rigging, etc.) Sea fastening and verification of the sea fastening (NDT) will be provided by the client. |
| 3. | Hook-up of umbilical's and hoses. Hook-up of equipment shall commence as soon as the placement and sea fastening of the equipment is confirmed and approved by the client. Escape routes shall be identified and marked. Hook up fiber optics, hydraulics, water and air hoses. Focus on routing of hoses to minimize trip hazards. Route fiber optic lines in a manner that minimizes exposure to personnel. Focus on isolation of equipment to prevent release of stored energy. |
| 4. | Client has filled out and reported the correct cutting depth from top of the multistring to 15' BML NOTE: Depth is to include an additional distance from mean sea level to well work deck. |
| 5. | Before running the Internal Laser Cutting Tool down hole, as shown in FIG. 34, follow deployment checklist and operation procedures for pre-deployment |
| 6. | Clear as much deck space as possible. Place and secure tool umbilical winch (deployment winch) in-line with the platform multistring/well to be cut. |
| 7. | Check that the laser internal multistring cutting surface system is ready for operation |
| 8. | Connect laser cutting tool to the laser cutting umbilical (includes fiber optic line, hydraulic lines, pneumatic hoses, and electrical cables). Once connected perform full laser tool function test. |
| 9. | Connect the Foro gooseneck and injector assembly above and in-line with the well. Assembly may connect to a operator supplied I-beam or casing jack platform. Utilizing the vessel crane, hoist the laser tool and umbilical over to the gooseneck and injector assembly. Slower lowering the tool down into the top of the well innerstring. Clamp the injector head assembly to the umbilical for deployment of the tool to the cut depth. |
| 10. | Once the top of the tool is safely below the top of the multistring and umbilical secured, proceed to operate the injector head to slowly lower the umbilical and laser multistring cutting tool down to 15 feet below mudline. |
| 11. | At cut depth, actuate the tools anchors to the firmly secure the tool to the interior of the multistring. |
| 12. | Initiate gas flow thru the umbilical from the laser surface spread compressor, this will allow for gas to open the cutting nozzle orifice and flow evenly over the optic components as well as provide a proper laser waveguide for efficient internal to external multistring cutting. NOTE: Do not allow for the gas to shutdown on the surface at anytime as this will cause debris and sediment to enter into the optic assembly of the tool and cause failure. |
| 13. | Check surface gas manifold to ensure the umbilical return is open, once open actuate the cutting tool packers. The gas pressure pumped down the gas feed line of the umbilical and thru the nozzle beneath the packers will create a downhole environment conducive to laser cutting. This will also allow for the innerstring return to be taken back up thru the umbilical and up the surface for monitoring cement, mud, seawater and gas returns. |
| 14. | Start the laser from the laser control container located on the vessel deck, monitor the returns as penetration occurs to check for liquid mud and/or liquid cement annuli. If voided annulus or fully grouted annulus are monitored move to step 14 once penetration to seabed occurs If any of the heavy solids are taken thru the returns, shutdown the laser but keep air flowing to take the heavy solid return up to surface and voided annulus occur. Start the laser again and continue with penetration thru seabed. |
| 15. | Confirm laser penetration thru the wall of the multistring into the seafloor by means of optic verification |
| 16. | Start laser cutting tool head rotation at pre-specified speed (based on shorebase engineer supplied cutting times versus multistring outer diameter, number of strings and wall thickness) |
| 17. | Shut the topside valve that controls the return line in the umbilical |
| 18. | Open the secondary air line on the surface manifold to allow gas flow down thru the return line. This will allow for additional gas to flow out and thru the cut zone, keeping a proper cutting atmosphere. |
| 19. | Complete 360 degree rotation and confirm the cut by means of optic verification thru a counter-clockwise rotation across the previously cut zone. IF not fully severed continue cutting with laser power at full levels until full severance occurs. Once multistring has been verified fully severed, stop the rotation of the tool and release the tools anchor and packer. |
| 20. | Utilizing the injector head slowly retrieve the laser cutting tool until it reaches the top of the multistring. Gas flow should still be flowing out of the cutting head nozzle orifice in order to ensure proper optic cleanliness. Connect the vessel crane to the tool and umbilical. Securely hoist back to the vessel or platform working area for maintenance and down-rigging or if additional wells move the gooseneck and injector assembly to the next location and repeat Steps 4-19 |

Example 28

Single Pile Cutting Operational Procedure.

| Step | Operation |
|---|---|
| 1. | All piles must be clean of debris in order for internal laser cutting tools to function properly. Contractor is to properly jet or dredge pile internally before arrival of the laser cutting tools and systems and remove any internal centralizers. |
| 2. | Lift equipment onboard and sea fasten. Equipment will be rigged up according to deck spot plan and procedure for rigging. All lifting operations require a good communication between crew, Deck Forman and Crane Operator to avoid any hazardous situation (hanging load, correct rigging, etc.) Sea fastening and verification of the sea fastening (NDT) will be provided by the client. |
| 3. | Hook-up of umbilical's and hoses. Hook-up of equipment shall commence as soon as the placement and sea fastening of the equipment is confirmed and approved by the client. Escape routes shall be identified and marked. Hook up fiber optics, hydraulics, water and air hoses. Focus on routing of hoses to minimize trip hazards. Route fiber optic lines in a manner that minimizes exposure to personnel. Focus on isolation of equipment to prevent release of stored energy. |
| 4. | Client has filled out and reported the correct cutting depth from top of the pile to 15' BML NOTE: Depth is to include an additional distance due to pile batter angle. |
| 5. | Before running the Internal Laser Cutting Tool down hole, follow deployment checklist and operation procedures for pre-deployment |
| 6. | Clear as much deck space as possible. Place and secure tool umbilical winch (deployment winch) in front of vessel railing, closest to the structure and in-line with the platform piles |
| 7. | Check that the laser internal pile cutting surface system is ready for operation |
| 8. | Connect laser cutting tool to the laser cutting umbilical (includes fiber optic line, hydraulic lines, pneumatic hoses, and electrical cables). Once connected perform full laser tool function test. |
| 9. | Utilizing the vessel crane, hoist the laser tool to the pile top deployment frame and secure to the umbilical to the gooseneck and injector assembly before hoisting the entire pile top assembly over to the pile. Once the tool and umbilical are secure, hoist the deployment frame over to the platform and slowly lower the tool into the top of the pile. Actuate the deployment frame clamps to secure the frame to pile top. |
| 10. | Once the top of the tool is safely below the top of the pile proceed to operate the injector head to slowly lower the umbilical and laser pile cutting tool down to 15 feet below mudline. |
| 11. | At cut depth, actuate the tools stabilizers and/or anchors to the firmly secure the tool to the interior of the pile. |
| 12. | Initiate gas flow thru the umbilical from the laser surface spread compressor, this will allow for gas to open the cutting nozzle orifice and flow evenly over the optic components as well as provide a proper laser waveguide for efficient internal to external pile cutting. NOTE: Do not allow for the gas to shutdown on the surface at anytime as this will cause debris and sediment to enter into the optic assembly of the tool and cause failure. |
| 13. | Start the laser from the laser control container located on the vessel deck |
| 14. | Confirm laser penetration thru the wall of the pile into the seafloor by means of optic verification |
| 15. | Start laser cutting tool head rotation at pre-specified speed (based on shorebase engineer supplied cutting times versus pile outer diameter and wall thickness) |
| 16. | Complete 360 degree rotation and confirm the cut by means of optic verification thru a counter-clockwise or clockwise rotation across the previously cut zone. Once pile has been verified fully severed, stop the rotation of the tool and release the tools stabilizers and anchors. |
| 17. | Utilizing the deployment frame injector head slowly retrieve the laser cutting tool until it reaches the top of the pile. Gas flow should still be flowing out of the cutting head nozzle orifice in order to ensure proper optic cleanliness. Connect the vessel crane to the deployment frame and securely hoist back to the vessel working area for maintenance and down-rigging. |

Example 29

Figure 33:
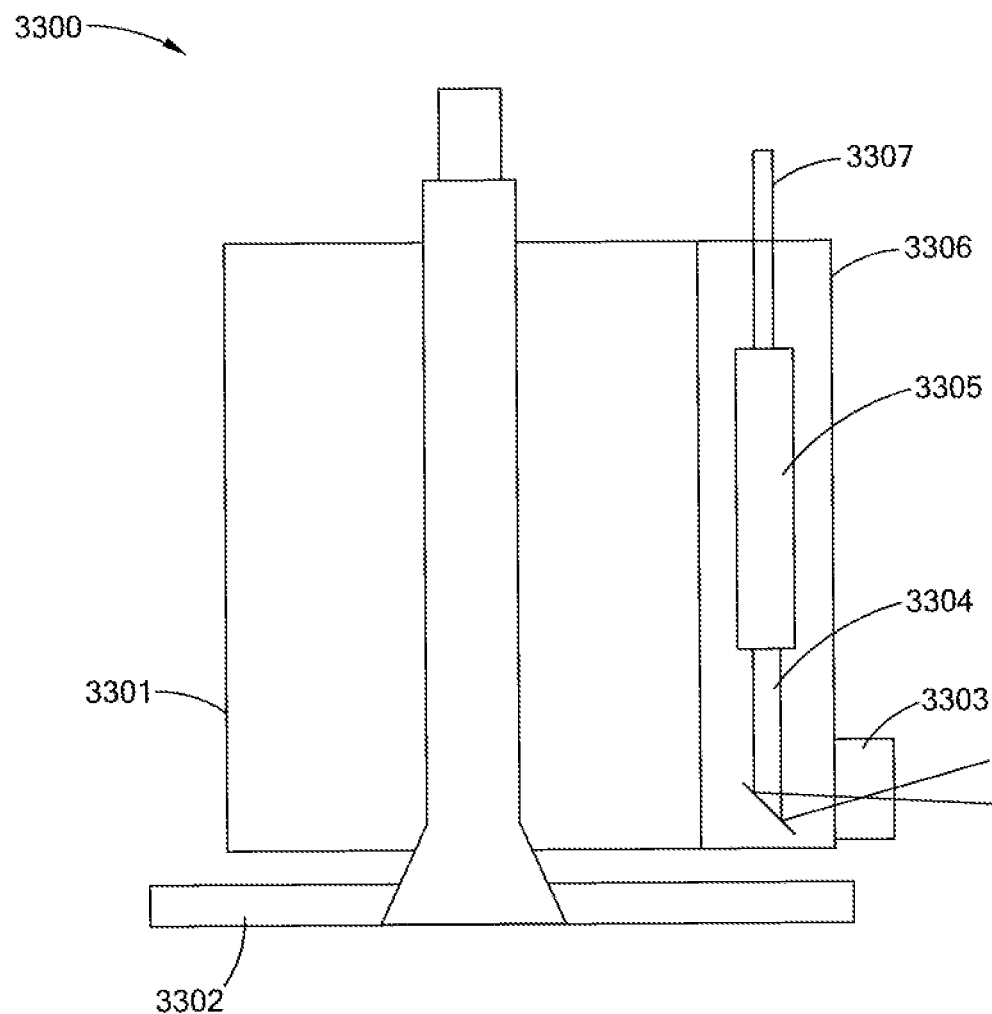
FIG. 33 is a schematic view of an embodiment of a laser cutting tool in accordance with the present invention.

Turning to FIG. 33 there is provided a laser cutting tool assembly having a removable external laser component. Thus, the laser cutting tool assembly 3300 has a drum 3301 having a side section for receiving the external laser component 3306, The external laser component 3306 has a high power laser umbilical 3307, an optics package 3305, a laser beam on a laser beam path 3304 and a nozzle 3303 for forming a fluid laser jet. There is provided a locking member 3302 that can be rotatably expanded to engage the inner walls of a tubular to be cut. In this manner a motor (not shown) rotates the drum, which rotates the external laser component 3306. External laser components may be specified or configured for specific diameter tubulars. Thus, the embodiment of FIG. 33 provides the ability to quickly and easily change the tool for different size, e.g., diameter tubulars.

Example 30

Figure 34:
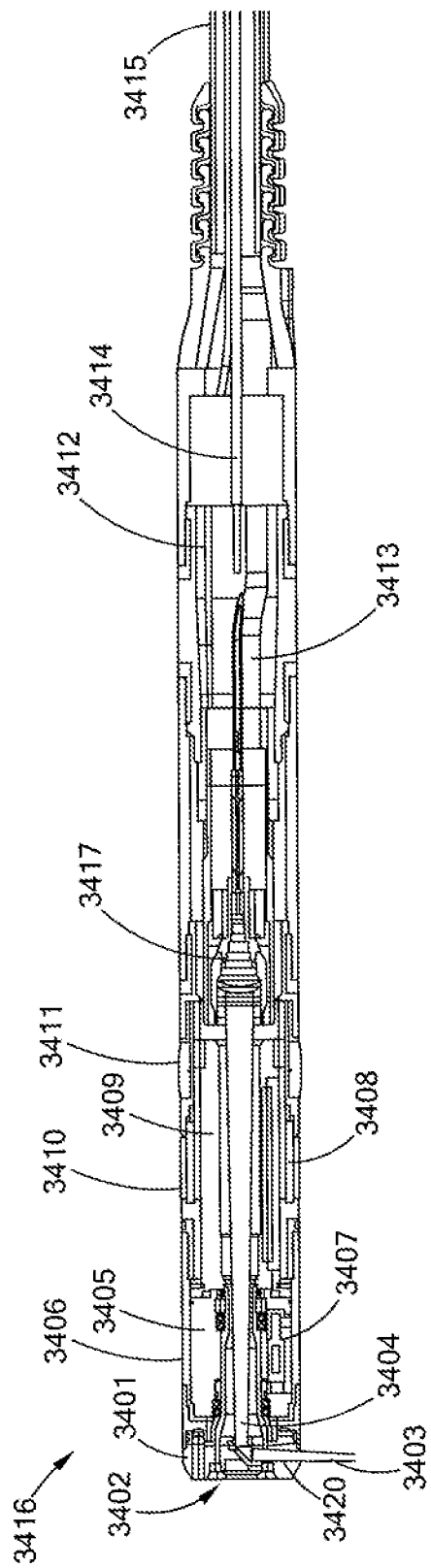
FIG. 34 is a cross sectional view of a laser cutting tool in accordance with the present invention.

Thus, turning to FIGS. 34 and 34A to 34C there is provided an embodiment of a laser tool. The laser tool has a lower or bottom section 3416 that rotates. The bottom section 3416 has a returns intake 3402, a nozzle 3420, that discharges a fluid laser jet 3403, which is rotated around by the bottom section 3416. The laser tool has a drive chassis 3405 within an outer chassis housing 3406. The drive chassis 3404 has a laser beam tube 3441 for transmitting the laser beam 3404. The drive chassis 3404 has a motor section 3407 for rotating the bottom section 3416. Connected to the drive chassis 3404 is an electronics chassis 3409, which has an electronics package 3408 (e.g., motor control, sensor). There is also provided a pressure sensor 3401. There is a packer 3411 and an anchor 3410. The tool 3400 has an optics package 3417, a channel 3413 for providing a fluid supply for the fluid laser jet, a channel 3412 for providing hydraulic fluid to the packer and anchor, a wireline 3414 for supporting the weight of the tool, and an umbilical 3415. Turning to FIG. 34B there is provided a prospective view of the bottom section 3416, and the motor section 3407 showing the motor 3440 and the beam tube 3441. Within the bottom section 3416 is a prism assembly 3430.

Figure 34C:
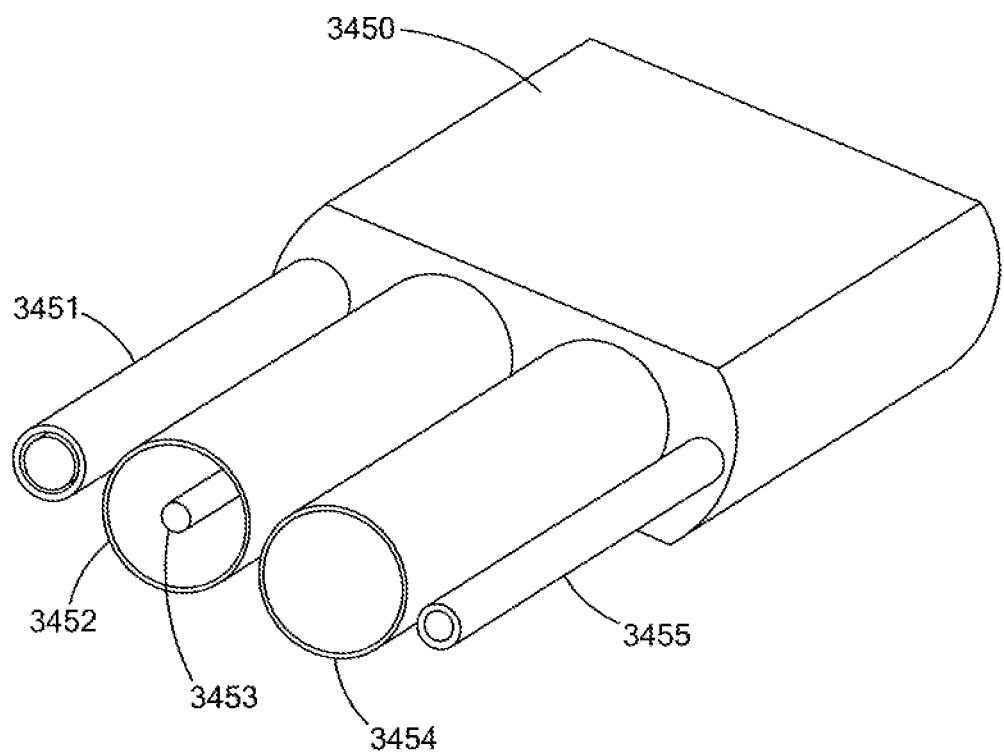
FIG. 34C is a perspective and schematic view of an embodiment of an integrated umbilical of the embodiment of FIG. 34.

FIG. 34C is a schematic view of an embodiment of an integrated umbilical, having an outer member 3450, incorporating a hydraulics line 3451, a line 3452 for conveying the fluid for the fluid laser jet as well as acting as a possible strength 313 member, the line 3452 containing a high power optical fiber in a metal tube 3453, a line 3454 for bringing returns (e.g., waste, cut material) away from the cut area, e.g., to the surface, and a line 3455 for providing electric power.

In addition to these, examples, the high power laser removal systems, tools, devices and methods of the present inventions may find other uses and applications in activities such as subsea beveling; decommissioning other types of offshore installations and structures; emergency pipeline repairs; cutting and removal of structures in refineries; civil engineering projects and construction and demolitions; removal of piles and jetties; removal of moorings and dolphins; concrete repair and removal; cutting of effluent and discharge pipes; maintenance, cleaning and repair of intake pipes; making small diameter bores; cutting below the mud line; precise, in-place milling and machining; heat treating; cutting elliptical man ways; and cutting deck plate cutting.

The various embodiments of systems, tools, laser heads, cutting heads, nozzles, fluid jets and devices set forth in this specification may be used with various high power laser systems and conveyance structures, in addition to those embodiments of the Figures in this specification. The various embodiments of systems, tools, laser heads, cutting heads, nozzles, fluid jets and devices set forth in this specification may be used with other high power laser systems that may be developed in the future, or with existing non-high power laser systems, which may be modified, in-part, based on the teachings of this specification, to create a laser system. Further the various embodiments of systems, tools, laser heads, cutting heads, nozzles, fluid jets and devices set forth in the present specification may be used with each other in different and various combinations. Thus, for example, the laser heads, nozzles and tool configurations provided in the various embodiments of this specification may be used with each other; and the scope of protection afforded the present inventions should not be limited to a particular embodiment, configuration or arrangement that is set forth in a particular embodiment, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A mobile laser system, placed on or in a vehicle, a skid, a container, a vessel, a platform, or an offshore structure, the system comprising:
    a high power laser having at least 5 kW of power;
    a high power laser cutting, tool;
    an umbilical for optically associating the high power laser with the high power laser cutting tool; and,
    a means for handling returns.

2. The mobile laser system of claim 1, wherein the high power laser cutting tool comprises a means for providing a laser beam path between the laser cutting tool and a tubular for making an inside-to-outside cut.

3. The laser system of claim 1, wherein the laser cutting tool comprises a means for providing a laser beam path between the laser cutting tool and a tubular for making an outside-to-inside cut.

4. An laser cutting tool for decommissioning activities, comprising:
    a) a laser tool body comprising: a conveyance termination section; a motor section; a laser cutting head section;
    b) the laser tool body defining a tool axis;
    the laser cutting head section comprising a laser beam exit; and a laser optics defining a beam axis; and,
    c) the laser tool body comprising a positioning means for positioning the laser tool body axis at a predetermined location relative to a tubular to be cut;
    d) wherein, the means for positioning comprising at least one of an anchoring section, a stand-off distance setting device or both.

5. The laser cutting tool of claim 4, wherein the tool and the beam axis are coaxial.

6. The laser cutting tool of claim 4, wherein the tool and the beam axis form an angle.

* * * * *